US012762186B1

(12) United States Patent
Thompson et al.

(10) Patent No.: US 12,762,186 B1

(45) Date of Patent: Oct. 13, 2026

(54) SYSTEMS AND METHODS FOR REAL-TIME GRAPH BASED COMPLIANCE VERIFICATION

(71) Applicant: AS0001, Inc., Carmel, IN (US)

(72) Inventors: Jonathan J. Thompson, Carmel, IN (US); Joshua Brown, Carmel, IN (US); Simon Mullaney, Dublin (IE); Timothy Butler, Carmel, IN (US)

(73) Assignee: AS0001, Inc., Carmel, IN (US)

( * ) Notice: Subject to any disclaimer, the term of this patent is extended or adjusted under 35 U.S.C. 154(b) by 0 days.

(21) Appl. No.: 19/557,094

(22) Filed: Mar. 4, 2026

(51) Int. Cl.
*G06F 16/901* (2019.01)
*H04L 9/00* (2022.01)

(52) U.S. Cl.
CPC ............ *G06F 16/9024* (2019.01); *H04L 9/50* (2022.05)

(58) Field of Classification Search
CPC ............................... G06F 16/9024; H04L 9/50
See application file for complete search history.

(56) References Cited

U.S. PATENT DOCUMENTS

| | | | | |
|---|---|---|---|---|
| 2012/0303355 | A1 | 11/2012 | Liu et al. | |
| 2013/0232245 | A1 | 9/2013 | Antosz et al. | |
| 2020/0327225 | A1 | 10/2020 | Nguyen et al. | |
| 2025/0063054 | A1 * | 2/2025 | Vipat | H04L 63/0245 |
| 2025/0265365 | A1 * | 8/2025 | Ramesh | G06F 21/6218 |
| 2026/0019380 | A1 * | 1/2026 | Bhat | G06F 9/44505 |

* cited by examiner

*Primary Examiner* — El Hadji M Sall
(74) *Attorney, Agent, or Firm* — Foley & Lardner LLP

(57) ABSTRACT

Systems, methods, and computer-readable storage media for graph-based security modeling. A system can include one or more processing circuits to store, in a graph structure, at least one primitive node representing a security control deployed in a network infrastructure of an entity. The one or more processors can store, in the graph structure, at least one decorator node representing a deployment parameter corresponding with the security control. The one or more processors can associate the at least one primitive node and the at least one decorator node with at least one cryptographic proof recorded and temporal metadata. The one or more processors can execute a graph query against the graph structure and access the temporal metadata and the at least one cryptographic proof. The one or more processors can generate a structured output indicating a status and an association to the at least one cryptographic proof.

20 Claims, 19 Drawing Sheets

SYSTEMS AND METHODS FOR REAL-TIME GRAPH BASED COMPLIANCE VERIFICATION

BACKGROUND

The present disclosure relates generally to computer security architecture and software for information security and cybersecurity. In a computer networked environment, computing networks can have vulnerabilities that can result in security incidents.

SUMMARY

Some implementations relate to a system for graph-based security modeling. The system can include one or more processing circuits including memory and at least one processor. The at least one processor can be configured to store, in a graph structure, at least one primitive node representing a security control deployed in a network infrastructure of an entity. The at least one primitive node can be stored in association with a first canonical identifier corresponding with the security control. The at least one processor can be configured to store, in the graph structure, at least one decorator node representing a deployment parameter corresponding with the security control. The at least one decorator node can be stored in association with a second canonical identifier corresponding with the deployment parameter and linked to the at least one primitive node by an edge indicating the deployment parameter is applied to the security control in the network infrastructure. The at least one processor can be configured to associate the at least one primitive node and the at least one decorator node with (i) at least one cryptographic proof recorded on a distributed ledger or blockchain storage and (ii) temporal metadata representing a time of verification of the security control or the deployment parameter. The at least one processor can be configured to, responsive at least in part to a request for a status of the security control or the deployment parameter, execute a graph query against the graph structure. The graph query can include at least one of the first canonical identifier or the second canonical identifier. The at least one processor can be configured to access, based at least in part on execution of the graph query, the temporal metadata representing the time of verification and the at least one cryptographic proof from the distributed ledger or blockchain storage. The at least one processor can be configured to generate a structured output corresponding to the request. The structured output can indicate the status of the security control or the deployment parameter and an association to the at least one cryptographic proof.

The at least one processor can be configured to configure a data channel or communication interface to access the network infrastructure of the entity. The at least one processor can be configured to monitor the network infrastructure of the entity using the data channel or communication interface. The at least one processor can be configured to automatically detect, responsive at least in part to monitoring the network infrastructure, an update to at least one of the security control or the deployment parameter.

The at least one processor can be configured to automatically detect an update to at least one of the security control or the deployment parameter. The at least one processor can be configured to modify, responsive at least in part to automatic detection of the update, the at least one primitive node or the at least one decorator node by (i) recording an updated cryptographic proof in the distributed ledger or blockchain storage, and (ii) updating the temporal metadata representing the time of verification to second time corresponding with the update to the at least one of the security control or the deployment parameter.

The distributed ledger or blockchain storage can include a proof ledger, and the proof ledger can store the at least one cryptographic proof in association with a proof identifier. To generate the structured output, the at least one processor can be configured to access the proof identifier of the at least one cryptographic proof from the proof ledger, the proof identifier corresponding with at least one encoded state. The at least one processor can be configured to identify, from the request for the status, at least one parameter of a security control model. The at least one processor can be configured to verify the at least one encoded state of the proof identifier against the at least one parameter of the security control model. The at least one processor can be configured to generate the structured output indicating verification of the at least one encoded state.

The at least one decorator node can include a parameterized condition indicating a temporal interval. The at least one processor can be configured to retrieve, from the temporal metadata associated with the at least one decorator node, the time of verification of the deployment parameter. The at least one processor can be configured to analyze the parameterized condition to detect that a difference between a current time and the time of verification satisfies the temporal interval. The at least one processor can be configured to set the status of the deployment parameter in the structured output based at least in part on the detection that the difference between the current time and the time of verification satisfies the temporal interval.

The at least one processor can be configured to receive, via a user interface, unstructured input associated with security control and the deployment parameter. The at least one processor can be configured to provide the unstructured input to a natural language model. The at least one processor can be configured to receive, from the natural language model, an output including the first canonical identifier of the at least one primitive node and the second canonical identifier of the at least one decorator node.

The at least one processor can be configured to, responsive at least in part to the request for the status, traverse the graph structure using a plurality of edges connecting the at least one primitive node to a plurality of decorator nodes including the at least one decorator node. The at least one processor can be configured to retrieve a plurality of cryptographic proofs associated with the plurality of decorator nodes. The at least one processor can be configured to query the distributed ledger or blockchain data store using a plurality of proof identifiers associated with the plurality of cryptographic proofs to obtain a plurality of encoded states corresponding to the plurality of cryptographic proofs. The at least one processor can be configured to determine, for each of the plurality of decorator nodes, a node-level compliance status based at least in part on analyzing a respective encoded state of the plurality of encoded states and corresponding temporal metadata against a security control model.

The at least one processor can be configured to generate the structured output as a machine-readable data object including a status field representing the status of the security control or the deployment parameter, and an array representing evaluations associated with a plurality of nodes including the at least one primitive node and the at least one decorator node.

The graph structure can be maintained in a graph database implemented as a managed service in a cloud environment. The least one processor can be configured to expose an analysis interface as a microservice endpoint configured to return the structured output in real-time for a plurality of nodes including the at least one primitive node and the at least one decorator node stored in the graph database.

The at least one processor can be configured to store, in the graph structure, a second primitive node representing a second security control deployed in the network infrastructure of the entity. The at least one processor can be configured to link the at least one decorator node to the second primitive node by a second edge indicating the deployment parameter is applied to the second security control in the network infrastructure, and the at least one decorator node can be reused to link to the second primitive node and bypass generation and storage of at least one additional decorator node associated with the second primitive node.

The first canonical identifier and the second canonical identifier can include model-agnostic identifiers corresponding with at least a first security control model and a second security control model.

The at least one processor can be configured to, responsive to detecting an update associated with the at least one decorator node, identify a subset of a plurality of nodes of the graph structured linked with the at least one decorator node by respective edges. The at least one processor can be configured to determine an updated status associated with the subset of nodes. Determination of the updated status can bypass execution of additional operations associated with the plurality of nodes other than the subset of nodes.

Some implementation relate to a method for graph-based security modeling. The method can include storing, by one or more processors, in a graph structure, at least one primitive node representing a security control deployed in a network infrastructure of an entity. The at least one primitive node can be stored in association with a first canonical identifier corresponding with the security control. The method can include storing, by the one or more processors, in the graph structure, at least one decorator node representing a deployment parameter corresponding with the security control. The at least one decorator node can be stored in association with a second canonical identifier corresponding with the deployment parameter and linked to the at least one primitive node by an edge indicating the deployment parameter is applied to the security control in the network infrastructure. The method can include associating, by the one or more processors, the at least one primitive node and the at least one decorator node with (i) at least one cryptographic proof recorded on a distributed ledger or blockchain storage and (ii) temporal metadata representing a time of verification of the security control or the deployment parameter. The method can include, responsive at least in part to a request for a status of the security control or the deployment parameter, executing, by the one or more processors, a graph query against the graph structure. The graph query can include at least one of the first canonical identifier or the second canonical identifier. The method can include accessing, by the one or more processors, based at least in part on execution of the graph query, the temporal metadata representing the time of verification and the at least one cryptographic proof from the distributed ledger or blockchain storage. The method can include generating, by the one or more processors, a structured output corresponding to the request, the structured output indicating the status of the security control or the deployment parameter and an association to the at least one cryptographic proof.

The method can include configuring, by the one or more processors, a data channel or communication interface to access the network infrastructure of the entity. The method can include monitoring, by the one or more processors, the network infrastructure of the entity using the data channel or communication interface. The method can include automatically detecting, by the one or more processors, responsive at least in part to monitoring the network infrastructure, an update to at least one of the security control or the deployment parameter.

The method can include automatically detecting, by the one or more processors, an update to at least one of the security control or the deployment parameter. The method can include modifying, by the one or more processors, responsive at least in part to automatic detection of the update, the at least one primitive node or the at least one decorator node by (i) recording an updated cryptographic proof in the distributed ledger or blockchain storage, and (ii) updating the temporal metadata representing the time of verification to second time corresponding with the update to the at least one of the security control or the deployment parameter.

The distributed ledger or blockchain storage can include a proof ledger. The proof ledger can store the at least one cryptographic proof in association with a proof identifier. Generating the structured output can include accessing, by the one or more processors, the proof identifier of the at least one cryptographic proof from the proof ledger. The proof identifier can correspond with at least one encoded state. The method can include identifying, by the one or more processors, from the request for the status, at least one parameter of a security control model. The method can include verifying, by the one or more processors, the at least one encoded state of the proof identifier against the at least one parameter of the security control model. The method can include generating, by the one or more processors, the structured output indicating verification of the at least one encoded state.

The at least one decorator node can include a parameterized condition indicating a temporal interval. The method can include retrieving, by the one or more processors, from the temporal metadata associated with the at least one decorator node, the time of verification of the deployment parameter. The method can include analyzing, by the one or more processors, the parameterized condition to detect that a difference between a current time and the time of verification satisfies the temporal interval. The method can include setting, by the one or more processors, the status of the deployment parameter in the structured output based at least in part on the detection that the difference between the current time and the time of verification satisfies the temporal interval.

The method can include receiving, by the one or more processors, via a user interface, unstructured input associated with security control and the deployment parameter. The method can include providing, by the one or more processors, the unstructured input to a natural language model. The method can include and receiving, by the one or more processors, from the natural language model, an output including the first canonical identifier of the at least one primitive node and the second canonical identifier of the at least one decorator node.

The method can include, responsive at least in part to the request for the status, traversing, by the one or more processors, the graph structure using a plurality of edges connecting the at least one primitive node to a plurality of decorator nodes including the at least one decorator node.

The method can include retrieving, by the one or more processors, a plurality of cryptographic proofs associated with the plurality of decorator nodes. The method can include querying, by the one or more processors, the distributed ledger or blockchain data store using a plurality of proof identifiers associated with the plurality of cryptographic proofs to obtain a plurality of encoded states corresponding to the plurality of cryptographic proofs. The method can include determining, by the one or more processors, for each of the plurality of decorator nodes, a node-level compliance status based at least in part on analyzing a respective encoded state of the plurality of encoded states and corresponding temporal metadata against a security control model.

Some implementations relate to a non-transitory computer readable storage medium (CRM) including one or more instructions stored thereon. The one or more instructions can be executable by one or more processing circuits to store, in a graph structure, at least one primitive node representing a security control deployed in a network infrastructure of an entity. The at least one primitive node can be stored in association with a first canonical identifier corresponding with the security control. The one or more instructions can be executable by one or more processing circuits to store, in the graph structure, at least one decorator node representing a deployment parameter corresponding with the security control. The at least one decorator node can be stored in association with a second canonical identifier corresponding with the deployment parameter and linked to the at least one primitive node by an edge indicating the deployment parameter is applied to the security control in the network infrastructure. The one or more instructions can be executable by one or more processing circuits to associate the at least one primitive node and the at least one decorator node with (i) at least one cryptographic proof recorded on a distributed ledger or blockchain storage and (ii) temporal metadata representing a time of verification of the security control or the deployment parameter. The one or more instructions can be executable by one or more processing circuits to, responsive at least in part to a request for a status of the security control or the deployment parameter, execute a graph query against the graph structure. The graph query can include at least one of the first canonical identifier or the second canonical identifier. The one or more instructions can be executable by one or more processing circuits to access, based at least in part on execution of the graph query, the temporal metadata representing the time of verification and the at least one cryptographic proof from the distributed ledger or blockchain storage. The one or more instructions can be executable by one or more processing circuits to generate a structured output corresponding to the request. The structured output can indicate the status of the security control or the deployment parameter and an association to the at least one cryptographic proof.

Figure 1A:
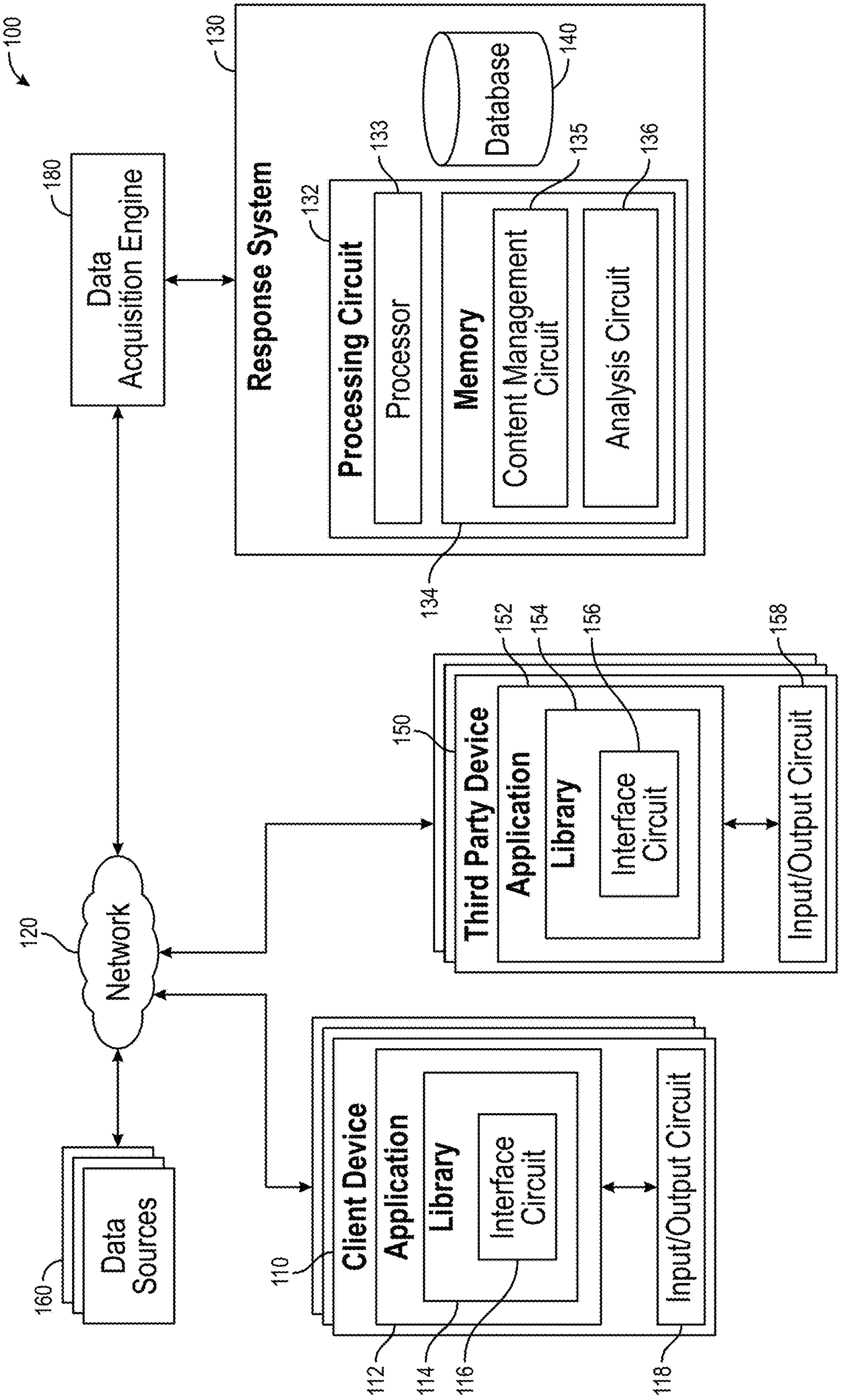
FIG. 1A depicts a block diagram of an implementation of a system for managing and configuring incident responses, according to some implementations.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Referring generally to the FIGURES, systems and methods relate generally to implementing a cybersecurity framework. In some implementations, the system and methods herein relate to a security architecture that employs modeling to protect data and align security postures. In some implementations, the system and methods herein relate to an architecture that provides real-time graph-based compliance verification of cybersecurity safeguards.

Some computing environments maintain cybersecurity safeguards across distributed network infrastructure to satisfy regulatory compliance obligations and protect assets from cyber threats. Regulatory frameworks such as the National Institute of Standards and Technology (NIST) Cybersecurity Framework, the Center for Internet Security (CIS) Controls, and the International Organization for Standardization (ISO) 27001 standard define security requirements as textual control statements that organizations are to interpret and map to deployed security technologies and processes. Conventional governance, risk, and compliance (GRC) platforms store mappings between framework control identifiers and internal control descriptions, representing each requirement as a monolithic text entry without decomposing the requirement into discrete, reusable elements. When an organization deploys a security control, such as managed detection and response or multifactor authentication, the organization can define associated safeguards that govern how the security control is deployed, but conventional systems lack a unified mechanism to model the relationships between security controls and associated safeguards, link each safeguard to verifiable proof artifacts, and evaluate compliance status in real time across multiple regulatory frameworks. Conventional approaches typically involve manual mapping of framework requirements to control descriptions, resulting in increased processing load and latency due to duplicative effort when multiple frameworks reference similar security controls. In addition, conventional approaches do not provide machine-readable proof references or temporal metadata that support automated verification and audit trail generation.

Technical challenges associated with security control modeling can include the inability to decompose regulatory framework controls into discrete, reusable elements that can be evaluated independently and combined across multiple compliance frameworks. That is, conventional systems store each framework control as a monolithic text entry without extracting constituent security control types and safeguard condition types, such that a single security control referenced by multiple frameworks uses duplicate control descriptions for each framework. Conventional systems also do not maintain temporal metadata that tracks when safeguards were last updated or verified, restricting the ability of computing platforms to evaluate time-based compliance requirements automatically. That is, conventional systems lack mechanisms to determine whether a safeguard (such as escalation contact update requirements) satisfies a temporal interval specification (such as updated within thirty days without manual review of configuration records).

Conventional systems further do not provide cryptographic proof references that link compliance evaluations to verifiable artifacts stored in external ledgers, which reduces the trustworthiness of compliance reporting and can lead to redundant processing operations for verification. Conventional systems also do not normalize free-form textual input from policy frameworks into reusable identifiers representing security controls and deployment parameters and lack graph-based modeling architectures that represent relationships between security controls and associated safeguards as traversable edge relationships, limiting the ability to identify groups of safeguards applied to a given security control through automated graph traversal operations.

Further technical challenges can include the inability of existing architecture to evaluate compliance status in real time when proof artifacts are updated in external ledgers. That is, conventional systems do not maintain dynamic linkages between compliance evaluation records and cryptographically secured proof artifacts stored in distributed ledgers or blockchain services, which can lead to redundant processing operations to verify which controls are valid or have been revoked. Conventional systems also lack mechanisms to trigger automatic updates to safeguard compliance status when new proof artifacts are recorded, which prevents the maintenance of accurate and current compliance states. That is, conventional systems can lack mechanisms to (i) automatically detect when monitoring systems record new configuration snapshots or verification events and (ii) update corresponding compliance records to reflect the new timestamps or verifications automatically. Conventional systems also cannot support parameterized conditional evaluations that specify temporal intervals for compliance evaluation, which prevents time-based safeguard requirements from being assessed automatically by comparing current time against last-verified timestamps.

Conventional systems also lack natural language processing capabilities to decompose free-form framework control statements into discrete, reusable elements, instead relying on manual interpretation of policy language and manual mapping of framework requirements to corresponding controls. That is, conventional systems cannot programmatically parse textual control statements from regulatory frameworks such as NIST Cybersecurity Framework or CIS Controls to extract security control types and safeguard condition types, normalize the extracted types to platform-agnostic identifiers, and map the platform-agnostic identifiers to data representing deployed security controls and associated deployment parameters. Conventional systems also do not expose real-time evaluation interfaces as microservice endpoints that can return structured compliance results to downstream systems or client applications automatically and with reduced latency or processing load. That is, conventional systems cannot provide machine-readable compliance evaluation results in structured formats such as JSON objects that indicate node-level compliance status and proof artifact references for programmatic consumption by external compliance management platforms or audit systems.

The technical solutions herein address these technical challenges by providing a graph-based security modeling framework. For example, the technical solutions herein implement a graph structure (e.g., knowledge graph including nodes and edges) in which at least one (e.g., each) security control deployed in an entity network infrastructure is stored as a primitive node, and each safeguard condition associated with respective controls is stored a decorator node linked with one or more primitive nodes. The technical solutions herein further assign, for each node, a globally unique identifier that operable to provides unambiguous reference across multiple regulatory frameworks. That is, the technical solutions described herein can decompose security controls and safeguards into discrete, reusable graph nodes such that a single safeguard can be linked to multiple security controls, thereby preventing latency and increased computing resource consumption associated with the creation of duplicate representations for each regulatory framework.

In some implementations, the technical solutions described herein provide further technical benefits by associating each primitive node and each decorator node with a proof identifier recorded in an external proof ledger, which can be implemented as a distributed ledger or blockchain service that stores cryptographic proof artifacts. For example, the proof identifiers can reference cryptographic proof artifacts such as digitally signed configuration snapshots, timestamped attestations, and/or hash-based integrity proofs that provide verifiable evidence of security control deployments and associated attributes. In some implementations, the technical solutions described herein can maintain temporal metadata for each node, including timestamps that record when the node was last updated or verified, such that time-based compliance requirements can be evaluated automatically by comparing current time against last-verified timestamps. For example, the temporal metadata can include various fields (e.g., lastUpdated timestamp fields and lastVerifiedDate timestamp fields) used programmatically determine whether a safeguard satisfies a temporal interval specification, thereby improving the accuracy and timeliness of security state evaluation compared to conventional systems that rely on static, unencrypted, or manually curated records.

The technical solutions described herein can also provide improvements in data interoperability and unstructured data processing. For example, the technical solutions described herein can receive free-form textual input from questionnaires or policy framework control statements, process the free-form textual input using a natural language processing service, and normalize the free-form textual input into framework-agnostic, canonical primitive identifiers and canonical decorator identifiers that correspond to nodes stored in the graph database. That is, the technical solutions described herein can algorithmically parse textual control statements from regulatory frameworks such as NIST Cybersecurity Framework, CIS Controls, or ISO 27001 standards to extract security control types and safeguard condition types, can normalize the extracted types to canonical identifiers, and can map the canonical identifiers to graph nodes representing deployed security controls and deployment parameters. By converting heterogeneous, unstructured control statements into agnostic identifiers that directly reference graph nodes, the computing system can automatically reuse evaluations across multiple frameworks and eliminate manual, per-framework mapping logic, thereby providing improvements in efficiency, consistency, and scalability relative to conventional systems that operate on static text descriptions or framework-specific control libraries.

In some implementations, the technical solutions herein can use an evaluation service or interface to query the graph database and retrieve relevant nodes, can traverse graph relationships to identify subsets of decorator nodes associated with a given primitive node, and can evaluate compliance status based on temporal metadata and proof artifact states recorded in the external proof ledger. For example, the technical solutions herein can execute graph traversal algorithms that follow edges connecting primitive nodes to decorator nodes to discover all deployment parameters applied to a security control, can retrieve temporal metadata from the discovered decorator nodes, and can query the external proof ledger using proof identifiers to obtain encoded states or status indicators for cryptographic proof artifacts. Because the graph structure explicitly encodes relationships between primitive nodes and decorator nodes, the technical solutions herein can restrict evaluation to subsets of nodes that are connected to a changed control or proof artifact, rather than recomputing compliance status for all stored controls. This graph-based restriction of processing operations thereby reduces the amount of data processed and improves the efficiency and scalability of security control evaluation compared to conventional systems that operate on full data sets or unmapped representations of controls.

The technical solutions described herein can generate structured output that indicates compliance status for each evaluated node and provides references to corresponding proof identifiers, such that downstream systems can verify compliance determinations against cryptographically secured proof artifacts. That is, the technical solutions described herein can generate machine-readable data objects in JSON format that include node-level compliance status indicators, temporal metadata, and proof identifier references, facilitating automated compliance reporting across multiple regulatory frameworks without manual remapping of controls or manual collection and correlation of evidence from disparate data sources. By emitting a consistent, machine-readable representation of evaluated controls and their linked proof artifacts, the technical solutions herein can provide direct integrations into audit tooling and workflow systems, allowing auditors to programmatically retrieve, inspect, and validate the underlying cryptographic evidence for each reported determination, which improves the reproducibility, traceability, and auditability of compliance assessments compared to conventional systems that rely on static reports or unstructured evidence packages.

Additionally, many existing cybersecurity systems and architectures face several challenges that limit their effectiveness in managing and responding to cyber threats. One technical problem is that traditional computing architectures lack mechanisms for dynamically generating and executing modular policy logic across distributed infrastructures. For example, conventional approaches use static configuration files or precompiled logic that cannot adapt in real-time to changes in network states, third-party requirements, or cyber threats. Further, using static data can include performing manual updates and redeployments, leading to operational delays, stale logic, and/or missed cyber response windows. Further, existing systems fail to provide structured or composable objects that can bind both machine-readable metadata and executable logic in a unified format. That is, existing architectures cannot construct or maintain data structures that encode both the decision criteria of a policy (e.g., thresholds, exclusions, and/or posture qualifiers) and the execution pathways (e.g., security triggers, and/or response routines) in a modular and updatable manner. The lack of composability at the object level prevents reliable runtime modification and complicates integration across various cyber systems. That is, existing systems can lack without a unified structure for managing external rules and internal posture data and can use hardcoded duplication or isolated silos for policy logic, which in turn increases synchronization errors, limits auditability, and prevents computational scalability. Thus, existing systems include architectural flaws that degrade runtime performance, reduce visibility into protective measures, and restrict ability to automate incident-driven responses.

In some implementations, the systems and methods described herein address technical challenges associated with static or isolated cyber data by dynamically generating or assembling a composable cyber resilience object that integrates conditional logic and executable code into a unified data structure. For example, the systems and methods described herein can identify a posture state of a given infrastructure or network and can retrieve, select, and/or generate first code segments corresponding to third-party rules or conditions and second code segments that define actionable protection logic tied to the rules or conditions. Further, the systems and methods herein can integrate or embed the code segments into a unified data structure (e.g., composable object) that represents both policy logic and corresponding execution behavior and link the data structure to particular computing resources or network interfaces to facilitate real-time or near real-time responses (e.g., activation of safeguards, triggering of compliance workflows, etc.) to posture changes or cyber events.

In addition, the composable object can be updated without redeploying a full policy because fields, metadata, and/or functions of the composable object are independently modifiable over a period of time, which reduces processing load and/or memory use associated with regenerating and/or updating full data sets. Further, by linking the composable object to a computing or networking infrastructure, the, the systems and methods herein can coordinate policy logic to align with evolving infrastructure states and/or real-time threats facing an entity network. That is, the systems and methods herein provide an architecture that facilitates runtime execution of various customized protections (or micro-protections) based on continuously updated posture data, providing a flexible, modular, and integrated approach to cybersecurity enforcement that is not achievable through traditional policy documents or static rule-based approaches. That is, the systems and methods herein reflect an improvement over traditional approaches by dynamically modeling cyber resilience posture, generating a dynamic cyber resilience object, and coordinating protections across entities and third-parties by executing conditional logic stored in the object without relying on manual intervention or static code.

Another technical problem facing existing cybersecurity systems and architectures is a lack of integrated incident response capabilities. In particular, many existing systems operate in silos, with separate tools for threat detection, response, and recovery. This lack of integration can lead to delays in response times, miscommunication between teams, and a lack of overall visibility into the security posture of an organization. Another problem is the lack of streamlined processes for engaging with third-party vendors for incident response services. Organizations often have to navigate through complex procurement processes during a cyber incident, losing time that could be used to mitigate the incident. Additionally, organizations often struggle to accurately assess their readiness to respond to incidents. They lack clear visibility into their own capabilities and limitations, and often do not have an effective way to communicate this information to potential response providers. Yet another problem with existing cybersecurity systems and architectures is the inability to dynamically adapt to changes in the security landscape. Many existing systems employ static defenses that are unable to adjust to new threats as they arise. This leads to vulnerabilities as attackers continually evolve their strategies and methods. Moreover, static systems also fail to account for changes in the organizational infrastructure and operations, such as the adoption of new technologies or changes in business processes, which can introduce new potential points of attack. This inability to dynamically adapt hampers the ability to maintain a robust security posture, leaving the organization exposed to a continuously evolving threat landscape.

Accordingly, the ability to prevent cyber threats, such as hacking activities, data breaches, and cyberattacks, provides entities and users (e.g., provider, institution, individual, and company) improved cybersecurity by creating a customized cybersecurity framework tailored to their specific attributes. This framework helps entities understand their current cybersecurity vulnerabilities and also connects them with appropriate vendors offering targeted protection plans. The customized framework enhances the protection of sensitive data, such as medical records and financial information, proprietary business data, and also helps safeguard the reputation of the entity. In addition to improving protection, the tailored cybersecurity framework also has the potential to reduce financial costs associated with data breaches, such as falling stock prices, costs of forensic investigations, and legal fees. The detailed design and execution of cybersecurity models for detecting and addressing vulnerabilities provide dynamic monitoring of various relationships, such as network, hardware, device, and financial relationships, between entities and vendors. The approach of providing a customized cybersecurity framework allows for significant improvements in cybersecurity by improving network security, infrastructure security, technology security, and data security. With vendors actively monitoring entities, immediate response to potential threats can be facilitated, thus further enhancing the overall security posture of the entity. This approach mitigates existing vulnerabilities and also anticipates potential threats, offering an adaptive and proactive solution to cybersecurity.

Furthermore, by utilizing a customized cybersecurity framework for entities and users, it is possible to understand existing vulnerabilities, link them to specific assets, and provide targeted protection strategies, offering the technical benefit of generating personalized remediation recommendations and avoiding and preventing successful hacking activities, cyberattacks, data breaches, and other detrimental cyber-incidents. As described herein, the systems and methods of the present disclosure can facilitate the connection of entities to suitable vendors, offering security plans tailored to their specific vulnerabilities and attributes. An additional benefit from the implementation of a customized cybersecurity framework is the ability to streamline the process of identifying and addressing vulnerabilities. This improvement facilitates rapid risk reduction but also allows for the ongoing monitoring of the entity cybersecurity status by the vendor, providing continuous protection and immediate response to potential threats. The implementation of such a framework allows entities to understand and address their current vulnerabilities but also empowers them to make informed decisions about their cybersecurity strategy. This includes selecting from a range of vendor plans and services, activating these plans, and having the peace of mind that their cybersecurity is being actively monitored and managed by professionals.

Additionally, the present disclosure provides a technical enhancement of dynamic cybersecurity architecture comprehension. For example, an entity cybersecurity vulnerabilities can be automatically understood and mapped within the process of implementing a customized cybersecurity framework, eliminating maintaining separate inventories of network weaknesses, infrastructure vulnerabilities, operating systems susceptibilities, etc. In some implementations, the implementation of this customized cybersecurity framework includes identifying potential security gaps associated with a particular entity or device identifier, such as a domain identifier (e.g., a top-level domain (TLD) identifier, a subdomain identifier, or a URL string pointing to a particular directory), an IP address, a subnet, etc. As a result, rather than separately assessing at least one (e.g., each) subclass of vulnerabilities, a computing system can utilize a unified view into a computing environment of a particular target entity (e.g., via the readiness system of the security architecture) and centrally manage the understanding of different types of vulnerabilities and associated potential security threats. For example, by initiating a comprehensive vulnerability assessment in a single operation. These vulnerability identification operations, described further herein, can include computer-executed operations to discern the entity cybersecurity status and potential threats, determine vulnerabilities based on this status and subsequently connect the entity to suitable vendors offering appropriate cybersecurity plans.

Figure 1B:
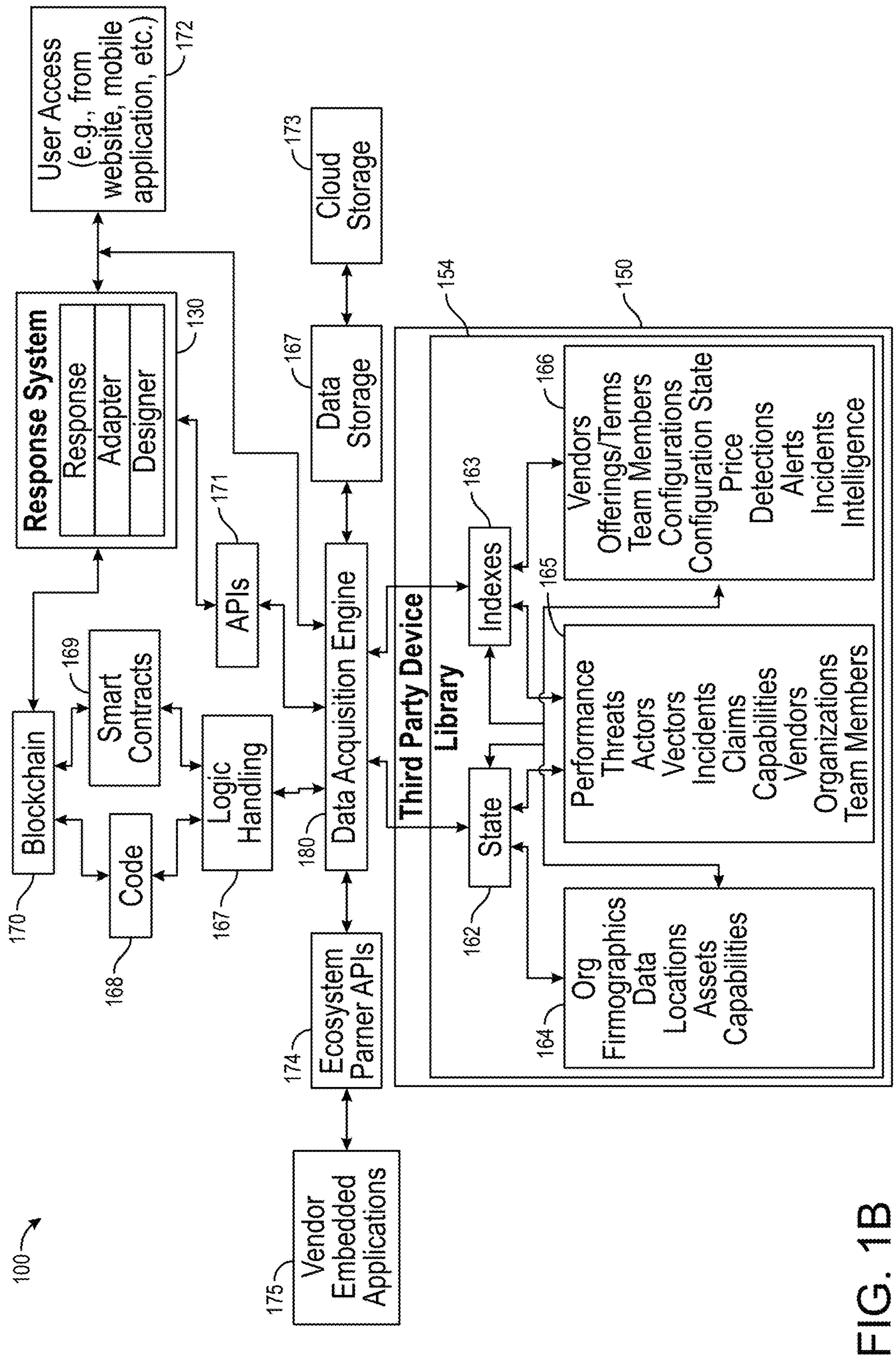
FIG. 1B depicts a block diagram of a more detailed architecture of certain systems or devices of FIG. 1A, according to some implementations.

Referring to FIGS. 1A-1B generally, system 100 is an implementation of a security architecture utilizing modeling to provide an incident response management platform that includes multiple components, such as client device 110, response system 130, third party computing systems 150, and data sources 160. These components can be interconnected through a network 120 that supports secure communication protocols such as TLS, SSL, and HTTPS. In some implementations, the response system 130 can generate and provide an application for incident response readiness that guides users through the steps to prepare for and manage incidents effectively. The application can integrate with various technologies and vendors to purchase services to resolve issues, and provides integration points for incident response workflow management. For example, users can access a marketplace within the application to purchase products, insurance, and services, and can determine the capabilities, limitations, and threat focus of the organization. In some implementations, the response system 130 also presents the readiness of the organization to incident response providers and automatically routes them to pre-associated panel vendors or organization-selected vendors, contracting and activating the incident room immediately.

In some implementations, the response system 130 can integrate readiness, including insurer data, into various third party computing systems via APIs. In some implementations, the response system 130 can map an incident response (IR) plan from a static document or documents to the task enablers in Responder that bring them to life, showing where the tasks for partners such as IR firms, insurers, and breach counsel are covered by the IR plan and IR playbook. The response system 130 can decompose the response plan into associated actionable tasks and activities by the organization, incident response providers, and other stakeholders, and provides different users and partners with a unified view of tasks, activities, and progress/status tracking.

In some implementations, the response system 130 stores data regarding milestones in an authoritative data source such as blockchain (e.g., database 140) such that results are traceable and linkable. For example, issues can be identified, tasks can be created, work can be routed to vendors, and proof of resolution can be recorded. In some implementations, the response system 130 can also support real-time status tracking of policy-aligned tasks to status updates provided for incident response. In some implementations, instant intake is achieved by a remote embeddable widget on a website, which starts an incident response process that begins with a proposal stage and continues through workflows to achieve response readiness based on pre-defined logic and automation. For example, services can be purchased or extended within the application, and in the event of an inbound incident, the application facilitates routing to a claim manager.

In some implementations, the response system 130 can provide an application for incident response readiness that guides users through the steps to determine they are prepared for any potential incidents. The application can be designed to integrate with technology and vendors to purchase services that are used to resolve any issues. For example, the user can access the application through a variety of devices, including client device 110. In particular, the application can offer integration points for incident response workflow management to allow users to streamline their incident response process. The organization incident readiness feature of the response system 130 offers several features, including the integration of readiness, including insurer data, into various third party computing systems, such as via an API. By integrating with third party computing systems, the response system 130 can determine that users have access to up-to-date information regarding the organizational readiness for potential incidents. In addition, the response system 130 can offer incident response plan mapping from a static plan document to the task enablers in Responder, which allows the tasks associated with partners such as IR firms, insurers, and breach counsel to be measurable and identified.

Still referring to FIGS. 1A-1B generally, the response system 130 can offer a marketplace for purchasing products, insurance, and services for and/or in event of an incident. The marketplace includes various vendors that offer different products and services which can be used by users to choose a fit for their organization based on their capabilities, limitations, and threat focus. The application also determines organization readiness levels with proof of date, time stamps, and artifacts (e.g., on the blockchain), which can be used to identify any gaps in the incident response plan. In some implementations, the response system 130 can automate the routing of incidents to pre-associated, panel vendors or organization-selected vendors at the point of response and immediately contracts and activates the incident room (e.g., when a cyber incident occurred or potentially occurred). Accordingly, the system 100 can determine that the organization can respond to an incident as quickly and efficiently as possible. Additionally, the response system 130 can decompose the response plan into associated actionable tasks and activities by the organization, incident response providers, and others. This allows users to better understand their response plan and identify areas for improvement.

In general, the application (e.g., graphical user interface provided by content management circuit 135) provides different users/partners with a unified view of tasks, activities, and progress/status tracking. For example, the status tracking can be tied back to incident readiness and managing the incident through resolution. Users can collaborate via the tool instead of via phone calls and emails, which can be used to determine whether one or more persons are working from the same information and avoids any miscommunication. The application can also offer real-time (or near real-time) status tracking of policy aligned tasks to status updates provided for incident response, and can be used by users to quickly and easily see how their incident response plan is progressing. In some implementations, data regarding milestones is stored in an authoritative data source such as blockchain (e.g., database 140 (private ledger) or data sources 160 (public ledger)) such that results can be traceable and linkable. Thus, this can allow users to identify areas for improvement in their incident response plan and make changes. In some implementations, the response system 130 offers an instant intake feature that can be integrated into a remote embeddable widget on a website. For example, the widget can start an incident response process that starts with a proposal stage and continues through workflows to achieve response readiness based on pre-defined logic and automation. This can be used to determine that incidents are quickly identified and resolved, and that the organization is prepared for any potential incidents.

Still referring to FIG. 1A generally, the response system 130 of system 100 includes a data acquisition engine 180 and analysis circuit 136 that democratizes posture threats, incidents, and/or claim data. In particular, stakeholders in the incident response process can have access to relevant data to make informed decisions. The analysis circuit 136 can use the democratized data in underwriting, claims, and/or the resilience process to enhance the overall response to an incident. With the data acquisition engine 180, the response system 130 can collect and/or process data from various sources, such as third party computing systems 150 and/or data sources 160, to provide a comprehensive view of the security posture. In some implementations, the response system 130 also implement incident response protocols and/or features via analysis circuit 136 that provide a centralized location for managing and/or configuring incident responses. For example, an application can walk users through the steps of incident response readiness and/or integrates with technology and/or vendors to purchase services to resolve issues. The response system 130 can automate the routing of incident response tasks to pre-associated, panel vendors, or organization-selected vendors and/or immediately contracts and/or activates the incident room. By decomposing the response plan into associated actionable tasks and/or activities by the organization, incident response providers, and/or other stakeholders, the response system 130 can be used to determine that parties are working together to manage the incident through resolution.

In some implementations, the response system 130 includes a vendor-provider marketplace that allows organizations to purchase products, insurance, and/or services that enhance their incident response capabilities. For example, the marketplace can be integrated into the response system 130, allowing users to easily access relevant products and services during an incident. Additionally, the response system 130 can determine the capabilities, limitations, and threat focus of the organization to present readiness to incident response providers. In some implementations, the response system 130 can include collection, recall, and proof of state features that provide that data regarding milestones is stored in an authoritative data source such as the blockchain. This includes pre-incident capabilities, what happened after the incident occurred, what was the root cause, and recording. For example, results are traceable and linkable, and issues are identified, tasks are created, work is routed to vendors, and proof of resolution is recorded. In some implementations, the response system 130 can include a drag and drop file tokenization feature that allows users to securely tokenize and store sensitive files. In particular, this feature is useful when organizations desire to share sensitive information with third parties or with internal stakeholders. The system can be used to determine that the information is secure and that authorized parties can access it. Thus, this feature is designed to streamline the incident response process and allow better collaboration between stakeholders.

Referring now to FIG. 1A in more detail, a block diagram depicting an implementation of a system 100 for managing and/or configuring incident responses. System 100 includes client device 110, response system 130, third party computing systems 150, and data sources 160. In various implementations, components of system 100 communicate over network 120. Network 120 can include computer networks such as the Internet, local, wide, metro or other area networks, intranets, satellite networks, other computer networks such as voice or data mobile phone communication networks, combinations thereof, or any other type of electronic communications network. Network 120 can include or constitute a display network. In various implementations, network 120 facilitates secure communication between components of system 100. As a non-limiting example, network 120 can implement transport layer security (TLS), secure sockets layer (SSL), hypertext transfer protocol secure (HTTPS), and/or any other secure communication protocol.

In general, the client device 110 and third party computing system 150 can execute a software application (such as application 112, e.g., a web browser, an installed application, or other application) to retrieve content from other computing systems and/or devices over network 120. Such an application can be configured to retrieve interfaces and/or dashboards from the response system 130. In one implementation, the client device 110 and/or third party computing system 150 can execute a web browser application, which provides the interface (e.g., from content management circuit 135) on a viewport of the client device 110 or third party computing system 150. The web browser application that provides the interface can operate by receiving input of a uniform resource locator (URL), such as a web address, from an input device (such as input/output circuit 118 or 158, e.g., a pointing device, a keyboard, a touch screen, or another form of input device). In response, one or more processors of the client device 110 or third party computing system 150 executing the instructions from the web browser application can request data from another device connected to the network 120 referred to by the URL address (e.g., the response system 130). The other device can then provide webpage data and/or other data to the client device 110 or third party computing system 150, which causes the interface (or dashboard) to be presented by the viewport of the client device 110 or third party computing system 150. Accordingly, the browser window presents the interface to facilitate user interaction with the interface. In some implementations, the interface (or dashboard) can be presented via an application stored on the client device 110 and third party computing system 150.

The network 120 can facilitate communication between various nodes, such as the response system 130, third party computing system 150, client device 110, and/or data sources 160. In some implementations, data flows through the network 120 from a source node to a destination node as a flow of data packets, e.g., in the form of data packets in accordance with the Open Systems Interconnection (OSI) layers. A flow of packets can use, for example, an OSI layer-4 transport protocol such as the User Datagram Protocol (UDP), the Transmission Control Protocol (TCP), or the Stream Control Transmission Protocol (SCTP), transmitted via the network 120 layered over an OSI layer-3 network protocol such as Internet Protocol (IP), e.g., IPv4 or IPv6. The network 120 is composed of various network devices (nodes) communicatively linked to form one or more data communication paths between participating devices. At least one (e.g., each) networked device includes at least one network interface for receiving and/or transmitting data, typically as one or more data packets. An illustrative network 120 is the Internet; however, other networks can be used. The network 120 can be an autonomous system (AS), e.g., a network that is operated under a consistent unified routing policy (or at least appears to from outside the AS network) and is generally managed by a single administrative entity (e.g., a system operator, administrator, or administrative group).

Client device 110 (sometimes referred to herein as a "mobile device") can be a mobile computing device, smartphone, tablet, smart watch, smart sensor, or any other device configured to facilitate receiving, displaying, and interacting with content (e.g., web pages, mobile applications, etc.). Client device 110 can include an application 112 to receive and display content and to receive user interaction with the content. For example, application 112 can be a web browser. Additionally, or alternatively, application 112 can be a mobile application. Client device 110 can also include an input/output circuit 118 for communicating data over network 120 (e.g., receive and transmit to response system 130).

In various implementations, application 112 interacts with a content publisher to receive online content, network content, and/or application content. For example, application 112 can receive and/or present various dashboards and information resources from distributed by the content publisher (e.g., content management circuit 135). Dashboards and/or information resources can include web-based content such as a web page or other online documents. The dashboard's information resources can include instructions (e.g., scripts, executable code, etc.) that when interpreted by application 112 cause application 112 to display a graphical user interface such as an interactable web page and/or an interactive mobile application to a user (e.g., dashboards). In various implementations, application 112 can include one or more application interfaces for presenting an application (e.g., mobile application, web-based application, virtual reality/augmented reality application, smart TV application and so on).

Application 112 is shown to include library 114 having an interface circuit 116. The library 114 can include a collection of software development tools included in a package (e.g., software development kit (SDK), application programming interface (API), integrated development environment (IDE), debugger, etc.). For example, library 114 can include an application programming interface (API). In another example, library 114 can include a debugger. In yet another example, the library 114 can be an SDK that includes an API, a debugger, and/or IDE, and so on. In some implementations, library 114 includes one or more libraries having functions that interface with a particular system software (e.g., iOS, Android, Linux, etc.). Library 114 can facilitate embedding functionality in application 112. For example, a user can use library 114 to automatically transmit event logs whenever an event occurs on application 112. As a further example, library 114 can include a function configured to collect and/or report device analytics and a user can insert the function into the instructions of application 112 to cause the function to be called during specific actions of application 112 (e.g., during testing as described in detail below). In some implementations, interface circuit 116 functionalities are provided by library 114.

In various implementations, interface circuit 116 of system 100 can provide one or more interfaces to users, which can be accessed through an application interface presented in the viewport of client device 110. These interfaces can take the form of dashboards and other graphical user interfaces, offering a variety of functionality to the user. For example, a user can view incident responses, remediate claims, communicate with team members, purchase or extend products and services, and more. The interfaces provided by interface circuit 116 can be customizable and dynamic, allowing users to configure and adjust them to suit their specific attributes. They can also be designed to present real-time data associated with current incident responses, potential incidents or threats, and other information, allowing users to make informed decisions and take proactive steps to manage risk.

For example, interface circuit 116 can generate dashboards that provide real-time data and/or insights. These dashboards can be customized to suit the attributes of individual users or groups, providing a comprehensive view of incident responses, potential threats, and the status of remediation efforts. For example, a dashboard can show the status of incident responses across different regions, or highlight areas for additional resources. In another example, the interface circuit 116 can generate a landscape of currently connected devices to the entity, such as a company or institution. This can include information on the types of devices, their locations, and other details that can help inform incident response efforts. With this information, users can better understand the scope of potential threats, identify vulnerable areas, and take steps to improve security and resilience.

In another example implementation, the application 112 executed by the client device 110 can cause a web browser to the display the interfaces (e.g., dashboards) on the client device 110. For example, the user can connect (e.g., via the network 120) to a website structured to host the interfaces. In various implementations, interface can include infrastructure such as, but not limited to, host devices (e.g., computing device) and/or a collection of files defining the interface and stored on the host devices (e.g., in database 140). The web browser operates by receiving input of a uniform resource locator (URL) into a field from an input device (e.g., a pointing device, a keyboard, a touchscreen, mobile phone, or another form of input device). In response, the interface circuit 116 executing the interface in the web browser can request data such as from content (e.g., vendor information, settings, current incident response, other dashboards, etc.) from database 140. The web browser can include other functionalities, such as navigational controls (e.g., backward and forward buttons, home buttons). In some implementations, the debugging interface can include both a client-side interface and a server-side interface. For example, a client-side interface can be written in one or more general purpose programming and can be executed by client device 110. The server-side interface can be written, for example, in one or more general purpose programming languages and can be executed by the response system 130.

Interface circuit 116 can detect events within application 112. In various implementations, interface circuit 116 can be configured to trigger other functionality based on detecting specific events (e.g., transactions, in-app purchases, performing a test of a vendor, scrolling through an incident response plan, sending a contract to a vendor, spending a predefined amount of time interacting with an application, etc.). For example, interface circuit 116 can trigger a pop-up window (overlayed on an interface) upon selecting an actionable object (e.g., button, drop-down, input field, etc.) within a dashboard. In various implementations, library 114 includes a function that is embedded in application 112 to trigger interface circuit 116. For example, a user can include a function of library 114 in a transaction confirmation functionality of application 112 that causes interface circuit 116 to detect a confirmed transaction (e.g., purchase cybersecurity protection plans, partnering). It can be understood that events can include any action relevant to a user within an application and are not limited to the examples expressly contemplated herein. In various implementations, interface circuit 116 is configured to differentiate between different types of events. For example, interface circuit 116 can trigger a first set of actions based on a first type of detected event (e.g., selecting actionable objects within the static response plan) and can trigger a second set of actions based on a second type of detected event (e.g., running a test). In various implementations, interface circuit 116 is configured to collect event logs associated with the detected event and/or events and transmit the collected event logs to content management circuit 135.

In various implementations, the interface circuit 116 can collect events logs based on a designated session. In one example, the designated session can be active from when application 112 is opened/selected to when application 112 is closed/exited. In another example, the designated session can be active based on a user requesting a session to start and a session to end. At least one (e.g., each) session, the interface circuit 116 can collect event logs while the session is active. Once completed, the event logs can be provided to any system described herein. During the session, the event logs can trace at least one (e.g., each) event in the session such that the events are organized in ascending and/or descending order. In some implementations, the events can be organized utilizing various other techniques (e.g., by event type, by timestamp, by malfunctions, etc.).

In various implementations, the interface circuit 116 of the client device 110 (or third party computing system 150) can start collecting event logs when application 112 is opened (e.g., selected by the user via an input/output circuit 118 of the client device 110), thus starting a session. In some implementations, once the application is closed by the user the interface circuit 116 can stop collecting event logs, thus ending the session. In various implementations, the user can force clear event logs or force reset application 112 such that the current session can reset, thus ending a particular session and starting a new session.

The input/output circuit 118 is structured to send and receive communications over network 120 (e.g., with response system 130 and/or third party computing system 150). The input/output circuit 118 is structured to exchange data (e.g., bundled event logs, content event logs, interactions), communications, instructions, etc. with an input/output component of the response system 130. In one implementation, the input/output circuit 118 includes communication circuitry for facilitating the exchange of data, values, messages, and the like between the input/output circuit 118 and the response system 130. In yet another implementation, the input/output circuit 118 includes machine-readable media for facilitating the exchange of information between the input/output device and the response system 130. In some implementations, the input/output circuit 118 includes any combination of hardware components, communication circuitry, and machine-readable media.

In some implementations, the input/output circuit 118 includes suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or other user interaction purposes. As such, the input/output circuit 118 can provide an interface for the user to interact with various applications (e.g., application 112) stored on the client device 110. For example, the input/output circuit 118 includes a keyboard, a keypad, a mouse, joystick, a touch screen, a microphone, a haptic sensor, a car sensor, an IoT sensor, a biometric sensor, an accelerometer sensor, a virtual reality headset, smart glasses, smart headsets, and the like. As another example, input/output circuit 118, can include, but is not limited to, a television monitor, a computer monitor, a printer, a facsimile, a speaker, and so on. As used herein, virtual reality, augmented reality, and mixed reality can be used interchangeably yet refer to any kind of extended reality, including virtual reality, augmented reality, and mixed reality.

In some implementations, input/output circuit 118 of the client device 110 can receive user input from a user (e.g., via sensors, or any other input/output devices/ports described herein). A user input can be a plurality of inputs, including by not limited to, a gesture (e.g., a flick of client device 110, a shake of client device 110, a user-defined custom gesture (e.g., utilizing an API), biological data (e.g., stress level, heart rate, hand geometry, facial geometry, psyche, and so on) and/or behavioral data (e.g., haptic feedback, gesture, speech pattern, movement pattern (e.g., hand, food, arm, facial, iris, and so on), or combination thereof, etc. In some implementations, one or more user inputs can be utilized to perform various actions on client device 110.

For example, a user can use a gesture, such as a flick or a shake, to quickly invoke an incident response through the response system 130 from their client device 110. With the use of biological and behavioral data, a user could trigger an incident response, access the vendor marketplace, or recall proof of state using custom-defined gestures via an API with input/output circuit 118. The drag and drop file tokenization feature can also be activated by a gesture, allowing a user to seamlessly tokenize files and secure them on the blockchain with a simple motion or touch on their client device 110.

Input/output circuit 118 can exchange and transmit data information, via network 120, to the devices described herein. In various implementations, input/output circuit 118 transmits data via network 120. Input/output circuit 118 can confirm the transmission of data. For example, input/output circuit 118 can transmit requests and/or information to response system 130 based on selecting one or more actionable items within the interfaces and dashboards described herein. In another example, input/output circuit 118 can transmit requests and/or information to third party computing systems 150 operated one or more vendors. In various implementations, input/output circuit 118 can transmit data periodically. For example, input/output circuit 118 can transmit data at a predefined time. As another example, input/output circuit 118 can transmit data on an interval (e.g., at ten minute intervals, twenty four hour intervals, etc.).

The third party computing system 150 includes application 152, library 154, interface circuit 156, and input/output circuit 158. The application 152, library 154, interface circuit 156, and input/output circuit 158 can function substantially similar to and include the same or similar components as the components of client device 110, such as application 112, library 114, interface circuit 116, and input/output circuit 118, described above. As such, it can be understood that the description of the client device 110, such as application 112, library 114, interface circuit 116, and input/output circuit 118 of the client device 110 provided above can be similarly applied to the application 152, library 154, interface circuit 156, and input/output circuit 158 of the third party computing system 150. However, instead of a user of a company or institution operations the third party computing system 150, a vendor or providers (e.g., goods or services) operates the third party computing system 150.

The response system 130 can include a logic device, which can be a computing device equipped with a processing circuit that runs instructions stored in a memory device to perform various operations. The processing circuit can be made up of various components such as a microprocessor, an ASIC, or an FPGA, and the memory device can be any type of storage or transmission device capable of providing program instructions. The instructions can include code from various programming languages commonly used in the industry, such as high-level programming languages, web development languages, and systems programming languages. The response system 130 can also include one or more databases for storing data and an interface, such as a content management circuit 135, that receives and provides data to other systems and devices on the network 120.

The response system 130 can be run or otherwise be executed on one or more processors of a computing device, such as those described below in FIG. 2. In broad overview, the response system 130 can include a processing circuit 132, a processor 133, memory 134, a content management circuit 135, an analysis circuit 136, a database 140, a front and 142. The interface and dashboards generated by content management circuit 135 can be provided to the client devices 110 and third party computing systems 150. Generally, the interfaces and dashboards can be rendered at the client devices 110 and/or third party computing systems 150. The content management circuit 135 can include a plurality of interfaces and properties. The interfaces and dashboards can execute at the response system 130, the client device 110, the third party computing systems 150, or a combination of the three to provide the interfaces and dashboards. In some implementations, the interfaces and dashboards generated and formatted by content management circuit 135 can be provided within a web browser. In another implementation, the content management circuit 135 executes to provide the interfaces and dashboards at the client devices 110 and third party computing systems 150 without utilizing the web browser.

The response system 130 can be a server, distributed processing cluster, cloud processing system, or any other computing device. Response system 130 can include or execute at least one computer program or at least one script. In some implementations, response system 130 includes combinations of software and hardware, such as one or more processors configured to execute one or more scripts. Response system 130 is shown to include database 140 and processing circuit 132. Database 140 can store received data. For example, the database 140 can include data structures for storing information such as, but not limited to, the front end information, interfaces, dashboards, incident information, claim information, user information, vendor information, contract information, invoices, a blockchain ledger, etc. The database 140 can be part of the response system 130, or a separate component that the response system 130, the client device 110, or the third party computing system 150 can access via the network 120. The database 140 can also be distributed throughout system 100. For example, the database 140 can include multiple databases associated with the response system 130, the client device 110, or the third party computing system 150, or three. Database 140 can include one or more storage mediums. The storage mediums can include but are not limited to magnetic storage, optical storage, flash storage, and/or RAM. Response system 130 can implement or facilitate various APIs to perform database functions (e.g., managing data stored in database 140). The APIs can be but are not limited to SQL, ODBC, JDBC, NOSQL and/or any other data storage and manipulation API.

Processing circuit 132 includes processor 133 and memory 134. Memory 134 can have instructions stored thereon that, when executed by processor 133, cause processing circuit 132 to perform the various operations described herein. The operations described herein can be implemented using software, hardware, or a combination thereof. Processor 133 can include a microprocessor, ASIC, FPGA, etc., or combinations thereof. In many implementations, processor 133 can be a multi-core processor or an array of processors. Memory 134 can include, but is not limited to, electronic, optical, magnetic, or any other storage devices capable of providing processor 133 with program instructions. Memory 134 can include a floppy disk, CD-ROM, DVD, magnetic disk, memory chip, ROM, RAM, EEPROM, EPROM, flash memory, optical media, or any other suitable memory from which processor 133 can read instructions. The instructions can include code from any suitable computer programming language.

The data sources 160 can provide data to the response system 130. In some implementations, the data sources 160 can be structured to collect data from other devices on network 120 (e.g., user devices 110 and/or third party computing systems 150) and relay the collected data to the response system 130. In one example, a user and/or entity can have a server and database (e.g., proxy, enterprise resource planning (ERP) system) that stores network information associated with the user and/or entity. In this example, the response system 130 can request data associated with specific data stored in the data source (e.g., data sources 160) of the user or entity. For example, in some implementations, the data sources 160 can host or otherwise support a search or discovery engine for Internet-connected devices. The search or discovery engine can provide data, via the data acquisition engine 180, to the response system 130. In some implementations, the data sources 160 can be scanned to provide additional data. The additional data can include newsfeed data (e.g., articles, breaking news, and television content), social media data (e.g., Facebook, Twitter, Snapchat, and TikTok), geolocation data of users on the Internet (e.g., GPS, triangulation, and IP addresses), governmental databases, generative artificial intelligence (GAI) data, and/or any other intelligence data associated with the specific entity of interest.

The system 100 can include a data acquisition engine 180. In various implementations, the response system 130 can be communicatively and operatively coupled to the data acquisition engine 180. The data acquisition engine 180 can include one or more processing circuits configured to execute various instructions. In various implementations, the data acquisition engine 180 can be configured to facilitate communication (e.g., via network 120) between the response system 130 and systems described herein. The facilitation of communication can be implemented as an application programming interface (API) (e.g., REST API, Web API, customized API), batch files, and/or queries. In various implementations, the data acquisition engine 180 can also be configured to control access to resources of the response system 130 and database 140.

The API can be used by the data acquisition engine 180 and/or computing systems to exchange data and make function calls in a structured format. The API can be configured to specify an appropriate communication protocol using a suitable electronic data interchange (EDI) standard or technology. The EDI standard (e.g., messaging standard and/or supporting technology) can include any of a SQL data set, a protocol buffer message stream, an instantiated class implemented in a suitable object-oriented programming language (e.g., Java, Ruby, C#), an XML file, a text file, an Excel file, a web service message in a suitable web service message format (e.g., representational state transfer (REST), simple object access protocol (SOAP), web service definition language (WSDL), JavaScript object notation (JSON), XML remote procedure call (XML RPC)). As such, EDI messages can be implemented in any of the above or using another suitable technology.

In some implementations, data is exchanged by components of the data acquisition engine 180 using web services. Where data is exchanged using an API configured to exchange web service messages, one or more components of the computing environment can include or can be associated with (e.g., as a client computing device) one or more web service node(s). The web service can be identifiable using a network address, such as an IP address, and/or a URL. One or more components of the computing environment can include circuits structured to access and exchange data using one or more remote procedure call protocols, such as Java remote method invocation (RMI), Windows distributed component object model (DCOM). The web service node(s) can include a web service library including callable code functions. The callable code functions can be structured according to a predefined format, which can include a service name (interface name), an operation name (e.g., read, write, initialize a class), operation input parameters and data type, operation return values and data type, service message format, etc. In some implementations, the callable code functions can include an API structured to access on-demand and/or receive a data feed from a search or discovery engine for Internet-connected devices. Further examples of callable code functions are provided further herein as embodied in various components of the data acquisition engine 180.

The data sources 160 can provide data to the response system 130 based on the data acquisition engine 180 scanning the Internet (e.g., various data sources and/or data feeds) for data associated with a specific user or entity (e.g., vendor, insurer). That is, the data acquisition engine 180 can hold (e.g., in non-transitory memory, in cache memory, and/or in database 140) the executables for performing the scanning activities on the data sources 160. Further, the response system 130 can initiate the scanning operations. For example, the response system 130 can initiate the scanning operations by retrieving domain identifiers or other user/entity identifiers from a computer-implemented DBMS or queue. In another example, a user can affirmatively request a particular resource (e.g., domain or another entity identifier) to be scanned, which triggers the operations. In various implementations, the data sources 160 can facilitate the communication of data between the client devices 110 and third party computing systems 150, such that the data sources 160 receive data (e.g., over network 120) from the client devices 110 and third party computing systems 150 before sending the data other systems described herein (e.g., response system 130). In other implementations and as described herein, the client devices 110 and third party computing systems 150, and the data sources 160 can send data directly, over the network 120, to any system described herein and the data sources 160 can provide information not provided by any of the client devices 110 and third party computing systems 150.

As used herein, the terms "scan" and "scanning" refer to and encompass various data collection operations, which can include directly executing and/or causing to be executed any of the following operations: query(ies), search(es), web crawl(s), interface engine operations structured such that the data acquisition engine 180 can allow an appropriate system interface to continuously or periodically receive inbound data, document search(es), dataset search(es), retrieval from internal systems of previously received data, etc. These operations can be executed on-demand and/or on a scheduled basis. In some implementations, these operations include receiving data (e.g., device connectivity data, IP traffic data) in response to requesting the data (e.g., data "pull" operations). In some implementations, these operations include receiving data without previously requesting the data (e.g., data "push" operations). In some implementations, the data "push" operations are supported by the interface engine operations.

One of skill will appreciate that data received as a result of performing or causing scanning operations to be performed can include data that has various properties indicative of device properties, hardware, firmware, software, configuration information, and/or IP traffic data. For example, in an implementation, a device connectivity data set can be received. In some implementations, device connectivity data can include data obtained from a search or discovery engine for Internet-connected devices which can include a third-party product (e.g., Shodan), a proprietary product, or a combination thereof. Device connectivity data can include structured or unstructured data.

Various properties (sometimes referred to as "attributes") (e.g., records, delimited values, values that follow particular pre-determined character-based labels) can be parsed from the device connectivity data. The properties can include device-related data and/or IP traffic data. Device-related data can encompass data related to software, firmware, and/or hardware technology deployed to, included in, or coupled to a particular device. Device-related data can include IP address(es), software information, operating system information, component designation (e.g., router, web server), version information, port number(s), timestamp data, host name, etc. IP traffic data can include items included in packets, as described elsewhere herein. Further, IP traffic data included in the device connectivity data can include various supplemental information (e.g., in some implementations, metadata associated with packets), such as host name, organization, Internet Service Provider information, country, city, communication protocol information, and Autonomous System Number (ASN) or similar identifier for a group of devices using a particular defined external routing policy. In some implementations, device connectivity data can be determined at least in part based on banner data exposed by the respective source vendor or insurer. For example, device connectivity data can include metadata about software running on a particular device of a source entity.

In various implementations, vendors and users can utilize Internet-wide scanning tools (e.g., port scanning, network scanning, vulnerability scanning, Internet Control Message Protocol (ICMP) scanning, TCP scanning, UDP scanning, semi-structured and unstructured parsing of publicly available data sources) for collecting data (e.g., states and performance of companies, corporations, users). Further, in addition to this data, other data collected and fused with the data obtained via scanning can be newsfeed data (e.g., articles, breaking news, television), social media data (e.g., Facebook, Twitter, Snapchat, TikTok), geolocation data of users on the Internet (e.g., GPS, triangulation, IP addresses), governmental databases, and any other data associated with the specific user or entity (e.g., vendor or insurer), their capabilities, configurations, cyber insurance policy, coverage, attestations, questionnaires and overall state of aforementioned attributes.

In some implementations, scanning occurs in real-time such that the data acquisition engine 180 continuously scans the data sources 160 for data associated with a specific vendor or user (e.g., real-time states of specific vendors or users, real-time threats, real-time performance). In various implementations, scanning can occur in periodic increments such that the data acquisition engine 180 can scan the Internet for data associated with the specific vendor or user periodically (e.g., by minute, hour, day, week, and any other increment of time.) In some implementations, data acquisition engine 180 can receive feeds from be various data aggregating systems that collect data associated with specific vendors or users. For example, the response system 130 can receive specific vendor or user data from the data sources 160, via the network 120 and data acquisition engine 180. The information collected by the data acquisition engine 180 can be stored in database 140. In some implementations, an entity (e.g., company, vendor, insurer, any service or goods provider, etc.) can submit data to response system 130 and provide information about their products or services, pricing, capabilities, statuses, etc., which can be stored in database 140.

Memory 134 can include analysis circuit 136. The analysis circuit 136 can be configured to perform data fusion operations, including operations to generate and/or aggregate various data structures stored in database 140, which can have been acquired as a result of scanning operations or via another EDI process. For example, the analysis circuit 136 can be configured to aggregate entity data stored in the database 140. The entity data can be a data structure associated with a specific entity and include various data from a plurality of data channels. In some implementations, the analysis circuit 136 can be configured to aggregate line-of-business data stored in the database 140. The line-of-business data can be a data structure associated with a plurality of line-of-business of an entity and indicate various data from a plurality of data channels based on line-of-business (e.g., information technology (IT), legal, marketing and sales, operations, finance and accounting).

The analysis circuit 136 can also be configured to receive a plurality of user and entity data. In some implementations, the analysis circuit 136 can be configured to receive data regarding the network 120 as a whole (e.g., stored in database 140) instead of data specific to particular users or entities. The received data that the analysis circuit 136 receives can be data that response system 130 aggregates and/or data that the response system 130 receives from the data sources 160 and/or any other system described herein. As previously described, the response system 130 can be configured to receive information regarding various entities and users on the network 120 (e.g., via device connectivity data). Further, the response system 130 can be configured to receive and/or collect information regarding interactions that a particular user or entity has on the network 120 (e.g., via IP traffic data). Further, the response system 130 can be configured to receive and/or collect additional information. Accordingly, the received or collected information can be stored as data in database 140. In various implementations, the database 140 can include user and entity profiles.

The response system 130 can be configured to electronically transmit information and/or notifications relating to various metrics, dashboards (e.g., graphical user interfaces) and/or models it determines, analyzes, fuses, generates, or fits to user data, entity data, and/or other data. This can allow a user of a particular one of the client devices 110 and third party computing systems 150 to review the various metrics, dashboards, or models which the response system 130 determines. Further, the response system 130 can use the various metrics to identify remediation actions for users and entities. The analysis circuit 136 implements data fusion operations of the response system 130. In various implementations, the analysis circuit 136 can be configured to receive a plurality of data (e.g., user and entity data) from a plurality of data sources (e.g., database 140, client devices 110, third party computing systems 150, data sources 160) via one or more data channels (e.g., over network 120). At least one (e.g., each) data channel can include a network connection (e.g., wired, wireless, cloud) between the data sources and the response system 130.

In some implementations, the analysis circuit 136 can also be configured to collect a plurality of data from a particular data source or from a plurality of data sources based on electronically transmitting requests to the data sources via the plurality of data channels, managed and routed to a particular data channel by the data acquisition engine 180. A request submitted via the data acquisition engine 180 can include a request for scanning publicly available information exposed by a user or entity. In some implementations, the request submitted via the data acquisition engine 180 can include information regarding access-controlled data being requested from the user or entity. In such cases, the request can include trust verification information sufficient to be authenticated by the target entity (e.g., multi-factor authentication (MFA) information, account login information, request identification number, a pin, certificate information, a private key of a public/private key pair). This information can be sufficient to allow the target entity to verify that a request is valid.

In various implementations, the analysis circuit 136 can be configured to initiate a scan, via the data acquisition engine 180, for a plurality of data from a plurality of data sources based on analyzing device connectivity data, vendor information, scheduling information (e.g., team members), network properties (e.g., status, nodes, element-level (sub-document level), group-level, network-level, size, density, connectedness, clustering, attributes) and/or network information (e.g., IP traffic, domain traffic, sub-domain traffic, connected devices, software, infrastructure, bandwidth) of a target computer network environment and/or environments of the entity or associated with the entity. The operations to fuse various properties of data returned via the scan can include a number of different actions, which can parse device connectivity data, packet segmentation, predictive analytics, cross-referencing to data regarding known vulnerabilities, and/or searching data regarding application security history. These operations can be performed to identify costs of vendors, services offered, hosts, ports, and services in a target computer network environment. The target computer network environment can be identified by an identifier, such as a domain identifier (e.g., a top-level domain (TLD) identifier, a subdomain identifier, a URL string pointing to a particular directory), an IP address, a subnet, etc. Further, the target computer network environment can be defined with more granularity to encompass a particular component (e.g., an entity identified by an IP address, software/applications/operating systems/exposed API functions associated with a particular port number, IP address, subnet, domain identifier). In some implementations, one or more particular target computer network environments can be linked to an entity profile (e.g., in the database 140). In one example, scanning can include parsing out packet and/or device connectivity data properties that can indicate available UDP and TCP network services running on the target computer network environment. In another example, scanning can include parsing out packet and/or device connectivity data that indicates the operating systems (OS) in use on the target computer network environment.

In various implementations, vendor information can be determined based on accessing a vendor device (e.g., 150) or website of the vendor to collect vendor information (e.g., via an API call). In various implementations, vulnerabilities and incidents can be determined based on any software feature, hardware feature, network feature, or combination of these, which could make an entity vulnerable to cyber threats, incidents, such as hacking activities, data breaches, and cyberattacks. In turn, cyber-threats (sometimes referred to herein as "cyber-indents" or "incidents") increase the probability of cyber-incidents. Accordingly, a vulnerability or incident can be a weakness that could be exploited to gain unauthorized access to or perform unauthorized actions in a computer network environment (e.g., system 100). For example, obsolete computing devices and/or obsolete software can present vulnerabilities and/or threats in a computer network environment. In another example, network frameworks can present vulnerabilities and/or threats in a computer network environment. In yet another example, business practices of an entity can present vulnerabilities and/or threats in a computer network environment. In yet another example, published content on the Internet can present vulnerabilities in a computer network environment. In yet another example, third-party computing devices and/or software can present vulnerabilities and/or threats in a computer network environment. Accordingly, as shown, one or more devices (e.g., servers, computers, any infrastructure), data (e.g., network information, vendor data, network traffic, user data, certificate data, public and/or private content), practices (e.g., business practices, security protocols), software (e.g., frameworks, protocols), and any relationship an entity has with another entity can present vulnerabilities and/or threats in a computer network environment that could lead to one or more cyber-incidents.

In broad view, the analysis circuit 136 can also be configured to receive company and vendor information regarding the company/vendor. In some implementations, the analysis circuit 136 can receive a registration request and register user accounts (e.g., accounts). For example, a user of library 114 can register their user account with a client device such that the client device 110 can execute the library 114 and perform various actions. Registering a client device 110 or user (or vendor) can include, but not limited to, providing various identifying information (e.g., device name, geolocation, identifier, etc.), platform designations (e.g., iOS, Android, WebOS, BlackBerry OS, etc.), user actions (e.g., activation gesture, haptic, biometric, etc.), authentication information (e.g., username, password, two-step criteria, security questions, address information, etc.). Once the analysis circuit 136 approves a registration request, the information associated with the request can be stored in database 140. Additionally, a notification can be transmitted to the client device 110 indicating the user, vendor, or client device 110 (or third party computing system 150) is registered and can utilize the dashboards to perform actions associated with one or more applications.

In various implementations, analysis circuit 136 performs statistical operations on received data to produce statistical measurements describing the received data. For example, analysis circuit 136 can determine capabilities of individuals, objectives, cost estimates, etc. In various implementations, the statistical operations can be calculated based on performing various statistical operations and analysis. In some implementations, received data and previously collected data stored in database 140 can be used to train a machine-learning model. That is, predictions regarding vulnerabilities and incidents could be based on artificial intelligence or a machine-learning model. For example, a first machine-learning model can be trained to identify particular incidents and output a prediction. In this example, a second machine-learning model can be trained to identify remediation actions based on incident. In various implementations, machine learning algorithms can include, but are not limited to, a neural network, convolutional neural network, recurrent neural network, linear regression model, and sparse vector machine). The various computing systems/devices described herein can input various data (e.g., event logs, debugging information and so on) into the machine learning model, and receive an output from the model indicating a particular action to perform. In some implementations, analysis circuit 136 can be configured to perform source testing on one or more networks. Source testing on one or more networks can include performing various test plans. During the source testing, various malfunctions and exceptions can be identified. Additionally, the network can be identified such that the testing occurs on a designated network (e.g., or multiple designated content networks).

Memory 134 also includes content management circuit 135. The content management circuit 135 can be configured to generate content for displaying to users and vendors. The content can be selected from among various resources (e.g., webpages, applications). The content management circuit 135 is also structured to provide content (e.g., via a graphical user interface (GUI)) to the user devices 110 and/or third party computing systems 150), over the network 120, for display within the resources. For example, in various implementations, a claim dashboard or incident response dashboard can be integrated into a mobile application or computing application or provided via an Internet browser. The content from which the content management circuit 135 selects can be provided by the response system 130 via the network 120 to one or more user devices 110 and/or third party computing systems 150. In such implementations, the content management circuit 135 can determine content to be generated and published in one or more content interfaces of resources (e.g., webpages, applications).

The content management circuit 135 can be configured to interact with a database management system or data storage vault, where clients can obtain or store information. Clients can use queries in a formal query language, inter-process communication architecture, natural language or semantic queries to obtain data from the DBMS. In some implementations, one or more clients obtain data from the DBMS using queries in a custom query language such as a Visualization API Query Language. In some implementations, the content management circuit 135 can be configured to provide one or more customized dashboards (e.g., stored in database 140) to one or more computing devices (e.g., user devices 110, third party computing systems 150) for presentation. That is, the provided customized dashboards (also referred to herein as "customized interface") can execute and/or be displayed at the computing devices described herein. In some implementations, the customized dashboards can be provided within a web browser or installed application. In some implementations, the customized dashboards can include PDF files. In some implementations, the customized dashboards can be provided via email. According to various implementations, the customized dashboards can be provided on-demand or as part of push notifications.

In various implementations, the content management circuit 135 executes operations to provide the customized dashboards to the user devices 110 and third party computing systems 150, without utilizing the web browser. In various implementations, the customized dashboards can be provided within an application (e.g., mobile application, desktop application). The dashboard from which the content management circuit 135 generates can be provided to one or more users or entities, via the network 120. In some implementations, the content management circuit 135 can select dashboards and/or interfaces associated with the user or entity to be displayed on the user devices 110 or third party computing systems 150.

In an example implementation, an application executed by the user devices 110 and/or third party computing systems 150 can cause the web browser to display on a monitor or screen of the computing devices. For example, the user can connect (e.g., via the network 120) to a website structured to host the customized dashboards. In various implementations, hosting the customized dashboard can include infrastructure such as host devices (e.g., computing device) and a collection of files defining the customized dashboard and stored on the host devices (e.g., in a database). The web browser operates by receiving input of a uniform resource locator (URL) into a field from an input device (e.g., a pointing device, a keyboard, a touchscreen, mobile phone, or another form of input device). In response, the content management circuit 135 executing the web browser can request data such as from the database 140. The web browser can include other functionalities, such as navigational controls (e.g., backward and forward buttons, home buttons, other navigational buttons or items). The content management circuit 135 can execute operations of the database 140 (or provide data from the database 140 to the user devices 110, and/or third party computing systems 150 for execution) to provide the customized dashboards at the user devices 110 and/or third party computing systems 150.

In some implementations, the content management circuit 135 can include both a client-side application and a server-side application. For example, a content management circuit 135 can be written in one or more general purpose programming languages and can be executed by user devices 110 and/or third party computing systems 150. The server-side content management circuit 135 can be written, for example, in one or more general purpose programming, or a concurrent programming language, and can be executed by the response system 130. The content management circuit 135 can be configured to generate a plurality of customized dashboards and their properties. The content management circuit 135 can generate customized user-interactive dashboards for one or more users and entities, such as the client device 110 and third party computing systems 150, based on data received, collected, and/or aggregated from the analysis circuit 136, any other computing device described herein, and/or any database described herein (e.g., 140).

The generated dashboards can include various data (e.g., data stored in database 140 and/or data sources 160) associated with one or more entities including scheduling information, profile information, cybersecurity risk and/or vulnerabilities cybersecurity vulnerabilities (e.g., malware, unpatched security vulnerabilities, expired certificates, hidden backdoor programs, super-user and/or admin account privileges, remote access policies, other policies and procedures, type and/or lack of encryption, type and/or lack of network segmentation, common injection and parameter manipulation, automated running of scripts, unknown security bugs in software or programming interfaces, social engineering, and IoT devices), insurer and vendor information (e.g., policies, contracts, products, services, underwriting, limitations), incident information, cyberattack information (e.g., phishing attacks, malware attacks, web attacks, and artificial intelligence (AI)-powered attacks), remediation items, remediation actions/executables, security reports, data analytics, graphs, charts, historical data, historical trends, vulnerabilities, summaries, help information, domain information, and/or subdomain information. As used herein, a "cyber-incident" can be any incident where a party (e.g., user, individual, institution, company) gains unauthorized access to perform unauthorized actions in a computer network environment. The database 140 can also include data structures for storing information such as system definitions for customized dashboards generated by content management circuit 135, animated or other content items, actionable objects, graphical user interface data, and/or additional information.

The analysis circuit 136 can be configured to determine organization incident readiness. Readiness is the process an organization follows to prepare for a cyber incident before it happens. This includes entering information at the initiation of an incident by incident response teams and breach counsel. Readiness levels are calculated by binary completion of the n tasks that are included in readiness activities. An organization with 10 readiness steps and 5 completed shows as 50%. In some implementations, determining organization incident readiness can include integrating readiness (e.g., insurer data and other vendor data) into third party computing systems 150. For example, the insurer data of a company insurer can be recorded and stored at a third party computing system 150. In various implementations, determining organization incident readiness can include the analysis circuit determining organization capabilities, limitations, cyber threats, and specific focus associated with cyber threats. Additionally, organization incident readiness can be provided to incident response providers (e.g., security providers, firmware providers, software providers, infostructure providers). The analysis circuit 136 can also be configured to automatically route incidents and claims to vendors associated with a company or user (e.g., client device 110) and in turn contracting and activating an incident response. In some implementations, a response plan can be submitted by a company and the analysis circuit 136 can decompose and analyze the response plan to determine actionable tasks and activities to complete (e.g., by the company or after contracting with a vendor).

In various implementations, the determined organization incident readiness can be stored (e.g., by the analysis circuit 136) as a block in a blockchain (or on a ledger) that can metadata identifying the readiness including, but not limited to, a time stamp, proof of date, and artifacts. In various implementations, the data regarding milestones (e.g., capabilities pre-incident, what happened after the incident occurred, root cause, recoding) can be stored on a blockchain (e.g., such that it is immutable). In particular, milestones can be traceable and linkable within a blockchain (or ledger) such that issues can be identified, actionable tasks can be tracked, work is routed to vendors (e.g., 150), and proof of resolution is recorded. In some implementations, database 140 can include a plurality of ledgers or blockchains and the database 140 can be a node of a plurality of nodes on a ledger or blockchain. It can be understood that the various data and information described herein can be implemented on a blockchain. For example, the blockchain can be used to provide irrefutable proof in a data set of the data, locations, capabilities, or configurations that were in place prior to an incident. In another example, the block can be used to link the incident occurrence with what worked (e.g., effective in preventing an incident) and what did not work (e.g., vulnerability that led to the incident). For example, the irrefutable permanent ledgers (or blockchain) can be used by users at points in the process where they wish to record proofs on chain. This can include configurations, capabilities, assets, policies, threats, actors, claims, incident reports, cyber threat intelligence artifacts, and any other state-based attribute that is to be recorded and can be shared with others to irrefutably prove that the state of that attribute was "x" at time "t". Combinations of attributes for different data, assets, configurations, capabilities, are collected and rolled up to show if any elements have changed through the use of Merkel Trees, allowing a check of the top hash of the combination of downstream values facilitating a single checkpoint to determine if any other elements and configurations, combinations of parameters is the same or if they have changed.

In various implementations, the analysis circuit 136 can intake potential or current incidents based on an embedded widget on remote web sites or within remote web applications. This allows an incident response provider or vendor (sometimes referred to herein as "IR providers" or IR vendors") the ability to seamlessly intake incident response requests for assistance from their web site or one of their sales channel partner sites and have it load directly into the incident intake process within responder. In turn, an embedded widget could be communicably coupled to the analysis circuit 136 (e.g., via network 120) to allow the analysis circuit to start an incident response process (e.g., at proposal stage) and continue through a workflow to achieve response readiness based on pre-defined logic or rules. This rule mechanism can allow the user to specify specific attributes, collection of attributes, order, and routing method for connecting inbound requests to those who are fit to execute on the requests. For example, when an inbound instance of an incident response can be routed to a claim manager based on pre-defined logic or rules, such as to route inbound cases to the IR provider that is active currently, or to the provider who specializes in ransomware extortion cases where the ransom exceeds 10 million, or to round-robin inbound cases among a set of panel IR providers, etc.

In some implementations, the analysis circuit 136 can facilities invoice processing within an incident response process across different insurers. Furthermore, throughout an incident response conditions can be modified, added, or removed to route tasks (or work) to different vendors or partners (e.g., 150). In some implementations, the analysis circuit 136 can also be configured to collect incident submission data, normalize the data (e.g., based on historical data or trends), and automatically submit insurance claims based on the normalized data. Moreover, the analysis circuit 136 can connect the underlying root cause to the capability failure or procedural issue and have that data submitted with the insurance claim. For example, the analysis circuit 136 can connect underlying root cause back to the insurers underwriting questions. In various implementations, the analysis circuit 136 can integrate organization incident readiness into related parties to a company. As such, the analysis circuit 136 can integrate incident response activation and collaborative across business, teams, insurers, etc. Further, the analysis circuit 136 can be configured to link the root cause of an incident to the capability failure or procedural issue and then link back the insurers underwriting questions.

The content management circuit 135 can also be configured to allow a user (e.g., of a company) to purchase and extended services via the generated dashboards. In some implementations, the content management circuit 135 allows the user (e.g., via a step through process) to integrate into technology and vendors to resolve issues (e.g., incidents) and/or prevent incidents in the future. For example, the dashboards can provide users with integration points for incident response workflow management. As such, the content management circuit 135 can generate dashboards (and/or interfaces) on an application (e.g., 112 or 152) for purchasing products, insurances, and services. In particular, the generated dashboards can provide users of the application with a unified (or universal) view of tasks, activities, and progress/status tracking of incidents, claims, etc. The dashboards can also tie back to incident readiness and managing the incidents through resolution. The content management circuit 135 can also generate the dashboards to include collaboration tools (e.g., video calls, calendar, chats), and the dashboards can include real-time status tracking of policies, incidents, claims, and insurers, such that policy aligned tasks and status updated can be provided for incident responses and claims.

Referring now to FIG. 1B, a block diagram depicting a more detailed architecture of certain systems or devices of system 100. System 100 includes the data acquisition engine 180 and response system 130 described in detail with reference to FIG. 1A. However, it can be understood that the response system 130 also encompasses the capability to generate content and dashboards tailored for at least one (e.g., each) aspect of the response process, including the response, adapter, and designer components. These content and dashboards are generated by the content management circuit 135.

To illustrate further, the response system 130 facilitates the presentation of diverse information related to security and threats through the adapter dashboard and architecture. This facilitates a comprehensive understanding of the security landscape and helps inform decision-making processes. Additionally, the dashboard functionality can be customized by the vendor and/or organization using the designer dashboard and architecture. This empowers them to tailor the visual representation of data, making it more intuitive and aligned with their specific requirements. Furthermore, the responder dashboard and architecture provided by the response system 130 facilitate the vendor and/or organization to effectively prepare for, track, and update incidents and readiness. This comprehensive dashboard encompasses the incident response lifecycle, from the initial incident detection and response through to the final incident closure and claim submission. By leveraging the responder dashboard and architecture, the vendor and/or organization can facilitate smooth incident management, streamline processes, and facilitate efficient collaboration among stakeholders.

In the depicted architecture, both organizations and vendors operating the third party computing systems 150 or client devices 110 have the ability to store states 162 and indexes 163 within the library 154 (or library 114). In some implementations, these states 162 and indexes 163 can be determined based on data derived from various datasets, including the organization dataset 164, performance dataset 165, and vendor dataset 166.

In some implementations, the organization dataset 164 encompasses a wide range of information such as firmographics, data related to locations, assets, and capabilities of the third-party or client organization. This dataset provides a comprehensive understanding of the profile and resources of the organization. In some implementations, the performance dataset 165 includes diverse sets of data, including threat data, actor data, vector data, incident data, claim data, capability data, vendor data, organization data, and team member data. These performance-related datasets capture information for assessing the organization security posture, incident history, and overall operational performance. They facilitate effective monitoring, analysis, and decision-making in incident response activities. In some implementations, the vendor dataset 166 includes information related to offerings (cybersecurity protection plans), terms, team member data, configuration data, configuration state data, pricing details, detection data, alert data, incident data, and intelligence data. This dataset allows organizations to gain insights into the capabilities and services provided by vendors, facilitating informed decision-making when selecting and collaborating with specific vendors.

In general, the states 162 and indexes 163, derived from the datasets, are utilized as input by the data acquisition engine 180 (or analysis circuit 136) to output a security posture. In some implementations, the data acquisition engine 180 is configured to scan and perform data collection based on accessing vendor embedded applications 175, via ecosystem partner APIs 174. This facilitates seamless integration with vendor systems, allowing for efficient retrieval and synchronization of relevant data. In the depicted architecture, the states 162 and indexes 163 improve the efficient operations of the response system 130. These states 162 and indexes 163 can stored within the library 154 (or library 114)

and are determined based on data from various datasets, including the organization dataset 164, performance dataset 165, and vendor dataset 166.

In some implementations, the states 162 represent the current condition or status of the organization or vendor operating the third party computing system 150 or client devices 110. They encapsulate information such as system configurations, security policies, incident response readiness, and other relevant parameters. By maintaining these states, the response system 130 can quickly access and reference up-to-date information about the environment of the organization or vendor. Additionally, in some implementations, the indexes 163 serve as pointers or references to specific data or resources within the library 154 (or library 114). They streamline the retrieval and access information by facilitating efficient data processing and analysis. These indexes are designed to provide efficient search operations and facilitate rapid access to relevant datasets, contributing to the overall responsiveness and effectiveness of the response system 130.

Accordingly, to facilitate accuracy and currency of the states 162 and indexes 163, the data acquisition engine 180 can be configured to scan and collect data by interacting with the vendor embedded applications 175. The communication can occur through ecosystem partner APIs 174, establishing a connection between the response system 130 and the embedded applications 175 used by vendors. Through this communication, the data acquisition engine 180 can retrieve real-time (or near real-time) information from the vendor systems, including offerings, configurations, alerts, incidents, and other relevant data. In some implementations, the engine 180 can utilize the retrieved data to update and synchronize the states 162 and indexes 163, providing that the response system 130 has updated and accurate information to support incident response activities.

Expand further on states 162 and indexes 163, the data acquisition engine 180 can maintain the security posture of the organization. That is, the data acquisition engine 180 can actively check a vendor API for any changes in the configuration "State," the data acquisition engine 180 that the security posture remains up to date and aligned with the evolving environment. By recording these configuration updates to the corresponding index, the data acquisition engine 180 and response system 130 establishes a view of the security landscape of the organization. This approach goes beyond static assessments and provides a dynamic and real-time perspective of the entity security posture. By linking the configuration data with real incident data and other relevant metadata, the response system 130 enhances the accuracy and actionability of the match, facilitating quick and effective response to potential threats. In various implementations, this continuous monitoring and adaptation of the security posture over time is provided and/or presented in a posture stream, which captures and analyzes the evolving information. As new data points are gathered and recorded in the posture stream, the response system 130 can execute proactive incident response activities.

As used herein, a "security posture" refers to the current state and overall cybersecurity fsk profile of an organization or vendor. It is determined based on various factors and information collected from entity data, including system configurations, security policies, incident response readiness, and other relevant parameters. In some implementations, the data acquisition engine 180 (or analysis circuit 136) scans and collects data from vendor embedded applications through ecosystem partner APIs to determine and/or maintain the accuracy and currency of the states and indexes used to represent the security posture. In various implementations, the analysis circuit 136 utilizes a distributed ledger to tokenize and broadcast the security posture, providing transparency and immutability. The analysis circuit 136 can also be configured to model the security posture and multiple security objectives to generate a set of cybersecurity attributes specific to the entity.

Furthermore, the data acquisition engine 180 is shown to gather data from blockchain 170 (e.g., ledgers storing various immutable information about entities, vendors, and corporations) via code 168 and smart contracts 169 that are executed by logic handling 167 (e.g., of the data acquisition engine 180). In some implementations, data acquisition engine 180 can communicate with response system 130 directly (e.g., via a wired or hard-wired connection) or via APIs 171. To facilitate user access and interaction with the dashboards and content generated by the response system 130, user access 172 is provided. Users, including organizations, vendors, and entities, can access the dashboards and content through dedicated applications such as application 112 or application 152. These applications can be accessed through user devices, such as client device 110, or through third party computing systems 150.

Additionally, user access 172 to the dashboards and content can be provided to users (e.g., organizations, vendors, entities) via an application (e.g., 112 or 152) a user device (e.g., 110) and/or third party computing system 150. Additional, fewer, or different systems and devices can be used. The architecture can be tailored to suit the goals of organizations, vendors, and entities, allowing for flexibility and customization in the deployment of the response system 130.

In addition to gathering data from the blockchain 170, the response system 130 can establish a communication channel with the blockchain 170. This communication facilitates the response system 130 to interact with the blockchain 170 in a secure and decentralized manner. By directly accessing the blockchain 170, the response system 130 can leverage its properties of immutability, transparency, and distributed consensus to enhance the integrity and reliability of incident-related data and information. Accordingly, the response system 130 can use blockchain 170 to record and verify incident details, maintain an auditable trail of actions and transactions, and monitor the integrity of information throughout the incident response process.

It will be recognized that some or all of the figures are schematic representations for purposes of illustration. The figures are provided for the purpose of illustrating one or more implementations with the explicit understanding that they will not be used to limit the scope or the meaning of the claims.

Figure 2:
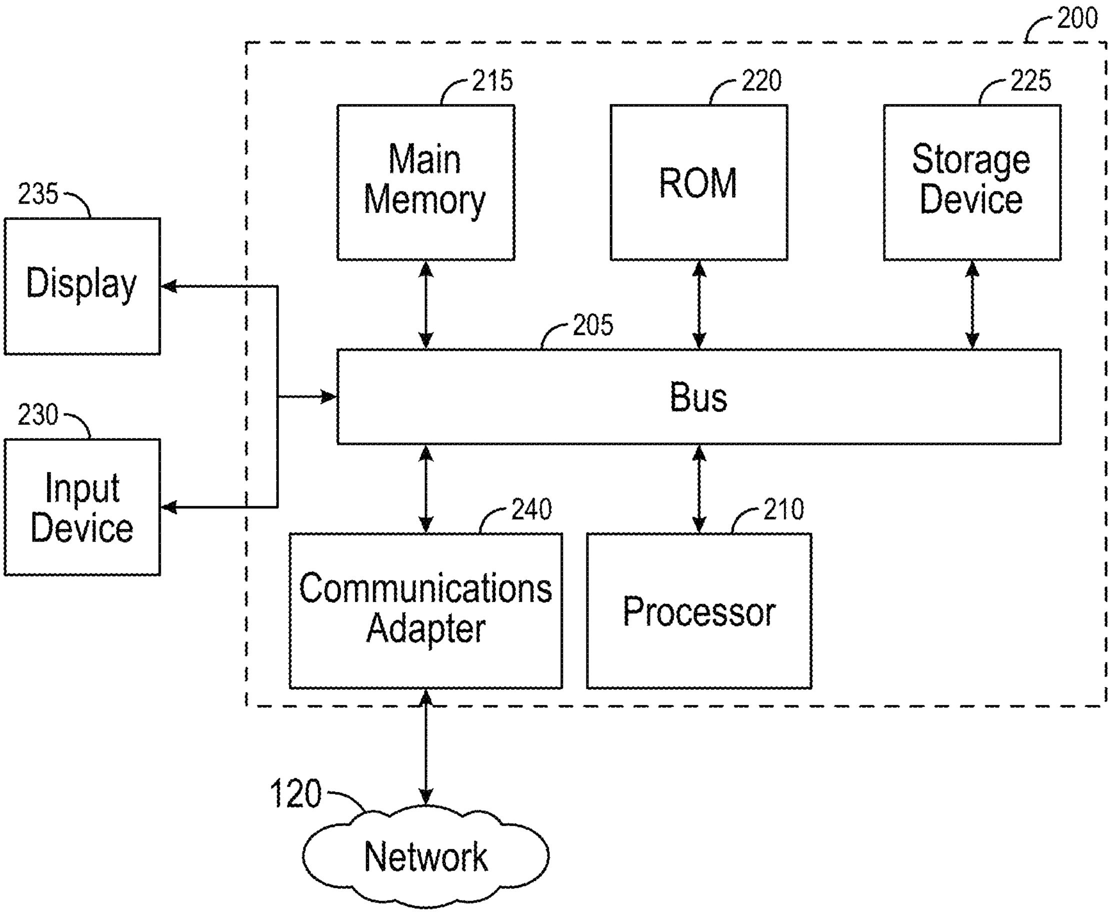
FIG. 2 depicts a computer system, according to some implementations.

Referring now to FIG. 2, a depiction of a computer system 200 is shown. The computer system 200 that can be used, for example, to implement a system 100, response system 130, client devices 110, third party computing systems 150, data sources 160, and/or various other example systems described in the present disclosure. The computing system 200 includes a bus 205 or other communication component for communicating information and a processor 210 coupled to the bus 205 for processing information. The computing system 200 also includes main memory 215, such as a random-access memory (RAM) or other dynamic storage device, coupled to the bus 205 for storing information, and instructions to be executed by the processor 210. Main memory 215 can also be used for storing position information, temporary variables, or other intermediate information during execution of instructions by the processor 210. The computing system 200 can further include a read-only memory (ROM) 220 or other static storage device coupled to the bus 205 for storing static information and instructions for the processor 210. A storage device 225, such as a solid-state device, magnetic disk or optical disk, is coupled to the bus 205 for persistently storing information and instructions.

The computing system 200 can be coupled via the bus 205 to a display 235, such as a liquid crystal display, or active matrix display, for displaying information to a user. An input device 230, such as a keyboard including alphanumeric and other keys, can be coupled to the bus 205 for communicating information, and command selections to the processor 210. In another implementation, the input device 230 has a touch screen display 235. The input device 230 can include any type of biometric sensor, a cursor control, such as a mouse, a trackball, or cursor direction keys, for communicating direction information and command selections to the processor 210 and for controlling cursor movement on the display 235.

In some implementations, the computing system 200 can include a communications adapter 240, such as a networking adapter. Communications adapter 240 can be coupled to bus 205 and can be configured to facilitate communications with a computing or communications network 120 and/or other computing systems. In various illustrative implementations, any type of networking configuration can be achieved using communications adapter 240, such as wired (e.g., via Ethernet), wireless (e.g., via Wi-Fi, Bluetooth), satellite (e.g., via GPS) pre-configured, ad-hoc, LAN, WAN.

According to various implementations, the processes that effectuate illustrative implementations that are described herein can be achieved by the computing system 200 in response to the processor 210 executing instructions included in main memory 215. Such instructions can be read into main memory 215 from another computer-readable medium, such as the storage device 225. Execution of the instructions included in main memory 215 causes the computing system 200 to perform the illustrative processes described herein. One or more processors in a multi-processing implementation can also be employed to execute the instructions included in main memory 215. In alternative implementations, hard-wired circuitry can be used in place of or in combination with software instructions to implement illustrative implementations. Thus, implementations are not limited to any specific combination of hardware circuitry and software.

Figure 3:
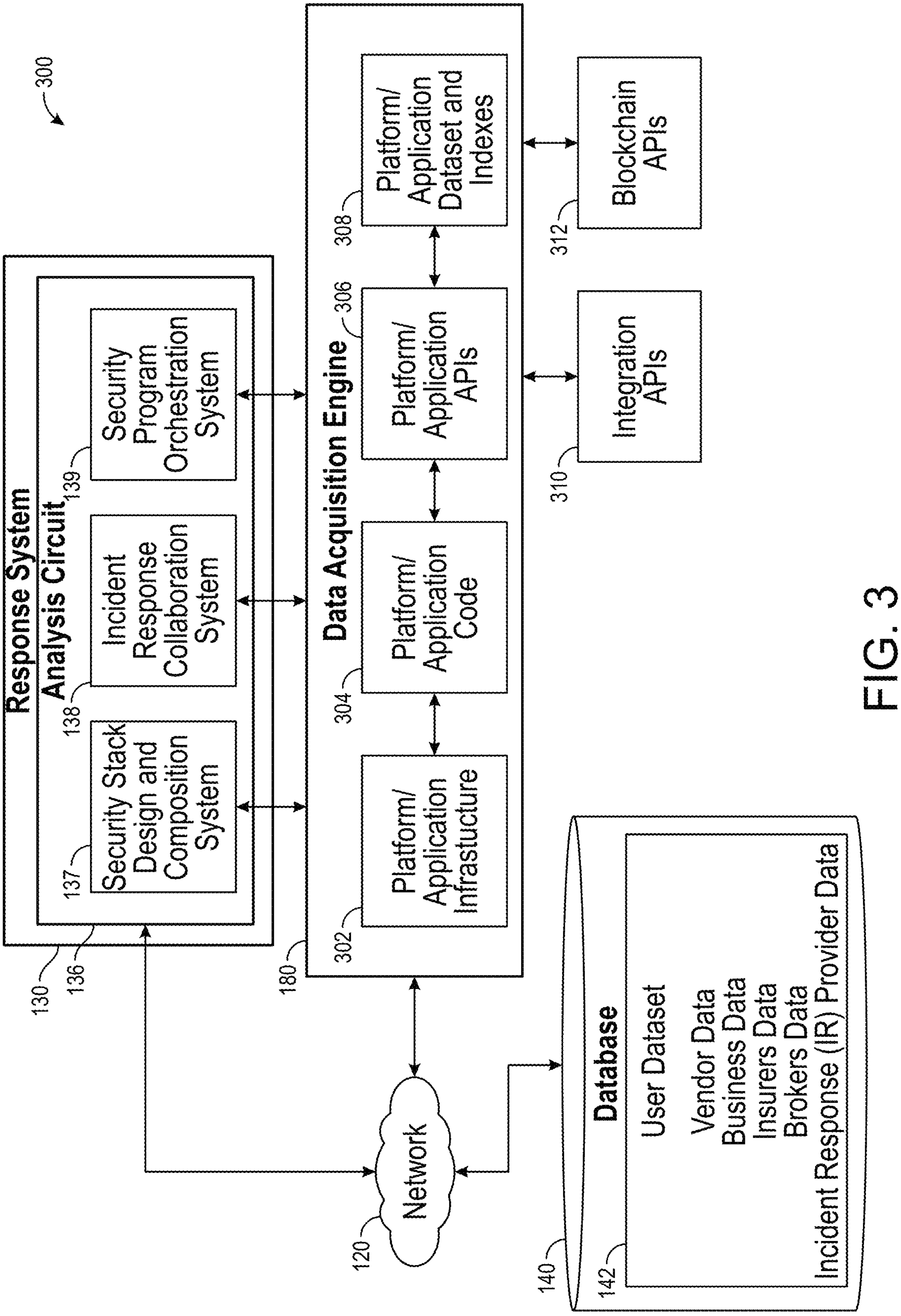
FIG. 3 depicts an architecture that facilitates data acquisition and analysis, according to some implementations.

Referring now to FIG. 3, the data acquisition engine 180 and analysis circuit 136 of the response system 130, as depicted in FIGS. 1A-1B, depict an architecture that facilitates efficient data acquisition and analysis. In some implementations, a user dataset 142, including diverse data associated with different entities and users, can be securely stored in the database 140. The systems and devices illustrated in FIG. 3 (e.g., components of system 300) communicate and exchange information over the network 120, which facilitates seamless integration and collaboration among the components.

The data acquisition engine 180 encompasses various components designed to support the execution of applications 112 and 152. These components include, but are not limited to, the platform application infrastructure 302, platform application code 304, platform application APIs 306, and platform application datasets and indexes 308. Together, these elements form the support of the data acquisition engine 180, providing the structures and resources to identify the efficient functioning of the applications. Additionally, integration APIs 310 and blockchain APIs 312 are integrated into the data acquisition engine 180 and facilitate seamless execution of API requests, data retrieval from blockchains, access to data sources 160, and integration with various vendors and third parties for streamlined data exchange. These integration APIs 310 facilitate the secure and reliable flow of information and validate the responsiveness and effectiveness of the data acquisition process.

The analysis circuit 136 is shown to include, but is not limited to, a security stack designer and composition (SSDC) system 137, an incident response collaboration (IRC) system 138, and a security program orchestration (SPO) system 139. For example, the SSDC system 137 walk users through identifying what data and computations are relevant, where the data resides, what vendor product, service, and procedural capabilities are in place to prevent/detect/respond to cyber-attacks, and based on these visualized gaps, determine what to prioritize.

The analysis circuit 136 includes several components that improve the capabilities of the response system 130. One of these components is the security stack designer and composition (SSDC) system 137, which is configured to guide users through the process of identifying and addressing potential vulnerabilities and gaps in their security infrastructure. In some implementations, the SSDC system 137 provides users with a systematic approach to evaluate the significance of their data and computational processes, determining a role of the data and/or computational processes in the context of cybersecurity. By utilizing the SSDC system 137, users can gain insights into the specific locations where their data is stored and processed, allowing for a comprehensive understanding of potential security risks. In general, the SSDC system 137 employs various techniques to identify specific locations where data is stored and processed within an organizational or entity infrastructure. In particular, by leveraging data mapping and inventory techniques that allow the SSDC system 137 to identify data repositories, databases, file systems, and other storage systems where data is stored. For example, the SSDC system 137 can analyze network traffic and data flows within an entity network to identify sources and destinations of data. By monitoring network communication and analyzing data packets, the SSDC system 137 can trace the path of data transmission and determine the endpoints where data is stored or processed.

Additionally, the SSDC system 137 can utilize data discovery and scanning mechanisms (e.g., using data acquisition engine 180) to identify data repositories within an entity infrastructure. This can include scanning file systems, databases, cloud storage, and other data repositories to identify the locations where sensitive data resides (e.g., cloud storage 173). In some implementations, the SSDC system 137 can integrate with data classification tools or metadata repositories (e.g., data sources 160) to gather information about the nature and sensitivity of the data. By understanding the characteristics and classification of data, the SSDC system 137 can identify the specific locations where sensitive data is stored or processed. By combining these techniques, the SSDC system 137 can provide organizations with a comprehensive view of the locations where data is stored and processed. It allows organizations to understand the data flow across their infrastructure and gain insights into the potential security risks associated with specific data storage and processing environments.

For example, an organization that utilizes both on-premises servers and cloud storage for data storage. The SSDC system 137 can perform an analysis of the entity network and infrastructure, monitoring data flows between different systems. It can identify the on-premises servers, databases, and file systems where one or more data objects are stored. Additionally, it can detect the cloud storage providers and specific cloud repositories where data is stored. By mapping out these locations, the SSDC system 137 provides the organization with a clear understanding of the data storage landscape and causes them to apply appropriate security measures to protect the data in at least one (e.g., each) location.

In some implementations, the SSDC system 137 facilitates an assessment of the existing vendor products, services, and procedural capabilities that are currently in place to prevent, detect, and respond to cyber-attacks. This evaluation allows users to identify any gaps or areas of improvement in their security stack. Through visualizations and analysis, the SSDC system 137 helps users prioritize their security measures based on identified gaps and vulnerabilities. By highlighting areas for attention, the SSDC system 137 empowers organizations to allocate their resources effectively and take proactive steps to enhance their overall security posture. Moreover, the SSDC system 137 is designed to be dynamic and adaptable, accommodating the ever-evolving threat landscape and the changing security parameters or attributes of organizations. It provides a user-friendly interface that simplifies the complex task of security stack design and composition, making it accessible to users with varying levels of technical expertise.

In some implementations, the IRC system 138 can be configured to collect, aggregate, and generate data and data structure that can be presented via application 112 and 152 and can be configured to determine level of importance related to matter pre-incidents, pre-associate to internal incident team members, cyber insurers, breach counsel, incident response firms, and security vendors to reduce the time it takes to activate and triage live incidents in the future. By leveraging the capabilities of the IRC system 138, organizations can efficiently manage incidents, reduce response times, and facilitate collaboration among various stakeholders.

In some implementations, the IRC system 138 can collect and aggregate relevant data. This can include gathering information from various sources such as incident reports, security logs, system alerts, and user-generated data. The IRC system 138 employs data collection mechanisms to capture and centralize this information such that incident responders have a comprehensive and consolidated view of the incident landscape. The term "incident landscape" refers to the overall environment and context in which incidents occur within entity systems and networks. It encompasses the various factors, elements, and conditions that shape the occurrence and impact of security incidents. The incident landscape includes aspects such as the entity infrastructure, network architecture, data assets, applications, user activities, potential vulnerabilities, and threat landscape. Understanding the incident landscape can be used by incident responders as it allows them to gain insights into the security challenges of the entity, identify potential attack vectors, assess risks, and develop effective incident response strategies. By comprehensively mapping and analyzing the incident landscape using the IRC system 138, organizations can proactively strengthen their defenses, detect and respond to incidents promptly, and reduce the impact of security breaches.

In some implementations, the IRC system 138 can generate data structures that facilitate the organization and presentation of incident-related information. These data structures facilitate the categorization, classification, and correlation of incident data, making it easier for incident responders to analyze and make informed decisions. The IRC system 138 can employ various techniques such as data modeling, schema design, and indexing to create efficient and structured data representations. By leveraging the data and data structures generated by the IRC system 138, organizations can determine the level of importance related to pre-incident matters. This includes assessing the potential impact and severity of different incident scenarios, identifying assets and systems, and evaluating the potential risks and vulnerabilities. This information helps organizations prioritize their incident response efforts, allocating appropriate resources and attention to high-priority incidents.

In some implementations, the IRC system 138 also facilitates pre-association of internal incident team members, cyber insurers, breach counsel, incident response firms, and security vendors. By establishing these pre-associations, organizations can expedite the activation and triaging of live incidents in the future. The IRC system 138 can maintain a database of trusted contacts and partners, allowing incident responders to quickly engage expertise and support when responding to incidents. This reduces response times and enhances the overall efficiency of technology and incident handling. Moreover, the IRC system 138 facilitates seamless collaboration among various stakeholders included in incident response. It provides a unified platform where team members can share information, communicate, and coordinate their efforts. The IRC system 138 can include features such as real-time messaging, task assignment, document sharing, and incident status tracking to facilitate effective collaboration and determine that all stakeholders are aligned and working towards a common goal.

The security program orchestration (SPO) system 139 can be configured to manage and adapt an entity security program to address changes in the security posture and cyber threats. In some implementations, it operates by receiving inputs that indicate the changing state of the security posture, which can come from various sources such as technical indicators or human-assisted inputs through APIs or social media sharing. These inputs provide information about emerging threats, vulnerabilities, or changes in the entity security landscape. Once the SPO system 139 receives these inputs, it analyzes and evaluates the information to determine adjustments and changes for the security program. This includes identifying specific areas or aspects of the security program that are to be modified, such as updating security policies, configurations, access controls, or implementing additional security measures.

The orchestration aspect of the SPO system 139 coordinates and manages the implementation of these changes across the various vendor tools and configurations. It can be used to determine that modifications are applied consistently and effectively across different security systems and technologies, reducing or eliminating any potential gaps or inconsistencies that could compromise the overall security posture. Furthermore, the SPO system 139 can be configured to automate and streamline the process of implementing security program changes, reducing the manual effort and potential errors associated with manual intervention. It can leverage automation capabilities to efficiently propagate the changes to the appropriate security tools, configurations, and policies such that the entity security program remains up-to-date and aligned with the evolving threat landscape.

Referring to the interplay of the analysis circuit 136 generally, the SSDC system 137 designs and composes the security stack. It guides users through the process of identifying data, determining its storage locations, and understanding the vendor products, services, and procedural capabilities to protect against, detect, and respond to cyberattacks. By visualizing the existing gaps and vulnerabilities, the SSDC system 137 helps organizations prioritize their security efforts and make informed decisions to strengthen their security posture. The IRC system 138 focuses on collaboration and information sharing during incident response. It collects, aggregates, and generates data to be presented via applications 112 and 152. This system facilitates the efficient and effective communication among internal incident team members, cyber insurers, breach counsel, incident response firms, and security vendors. By pre-associating relevant parties and establishing clear lines of communication, the IRC system 138 reduces the time it takes to activate and triage live incidents in the future, leading to improved incident response capabilities. The SPO system 139, on the other hand, plays a role in managing the entity security program. It receives inputs indicating changes in the security posture or emerging cyber threats, whether through technical indicators or human-assisted inputs. Leveraging these inputs, the SPO system 139 determines the adjustments in the security program and orchestrates the implementation of those changes across the various vendor tools and configurations associated with the organization or entity such that that the security program remains up-to-date and aligned with the evolving threat landscape, improving overall security resilience.

Accordingly, together, these three systems create a powerful synergy within the entity security ecosystem. The SSDC system 137 helps design a robust security infrastructure, the IRC system 138 facilitates efficient collaboration and information sharing during incident response, and the SPO system 139 can be used to determine the agility and adaptability of the entity security program. By working in tandem, these systems contribute to a proactive and comprehensive approach to improve security, empowering organizations to mitigate risks, respond effectively to incidents, and continuously improve their security posture in a rapidly evolving threat landscape.

Figure 4A:
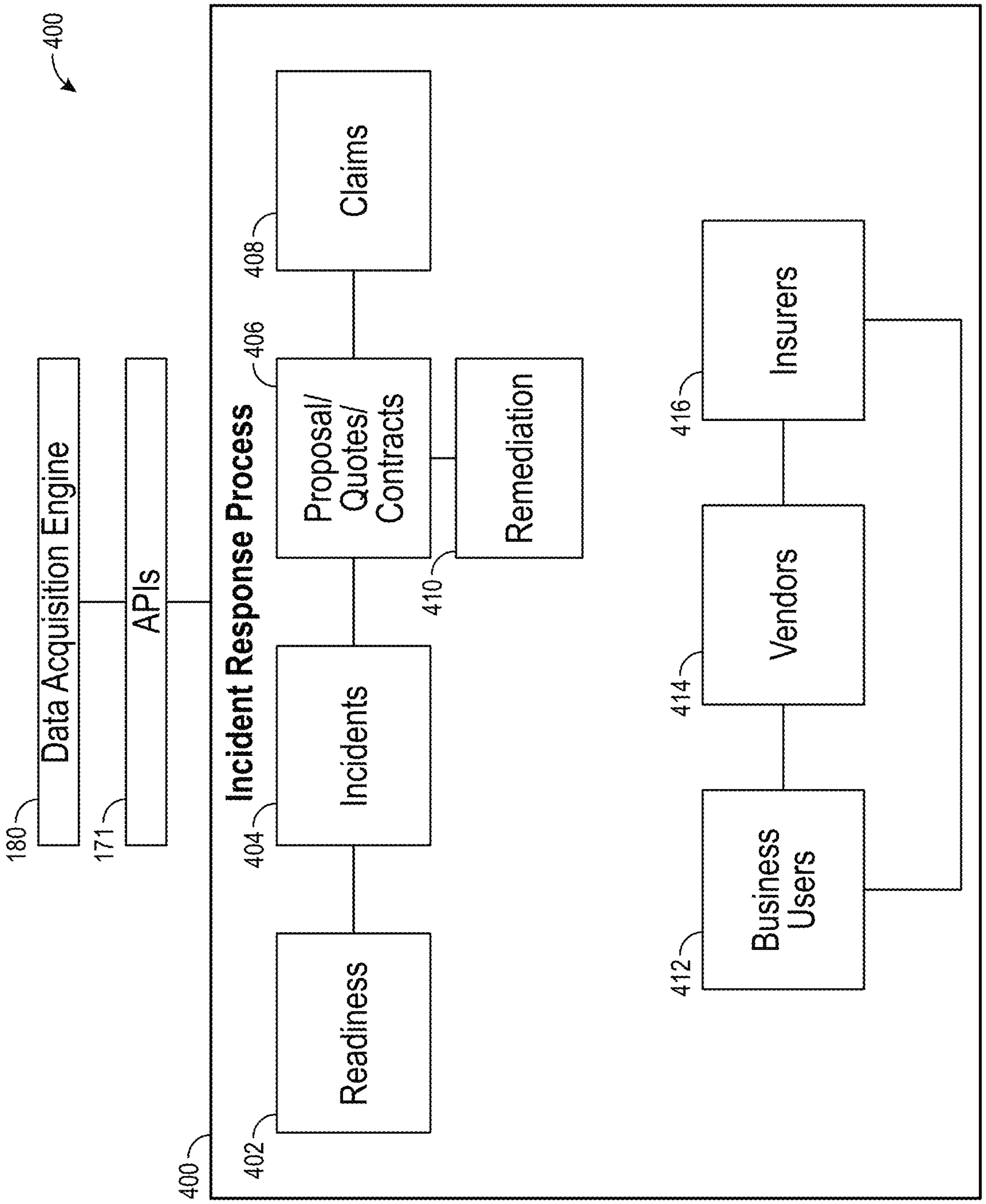
FIGS. 4A-4B depicts a flowchart for a method for incident response preparedness and readiness, according to some implementations.
Figure 4B:
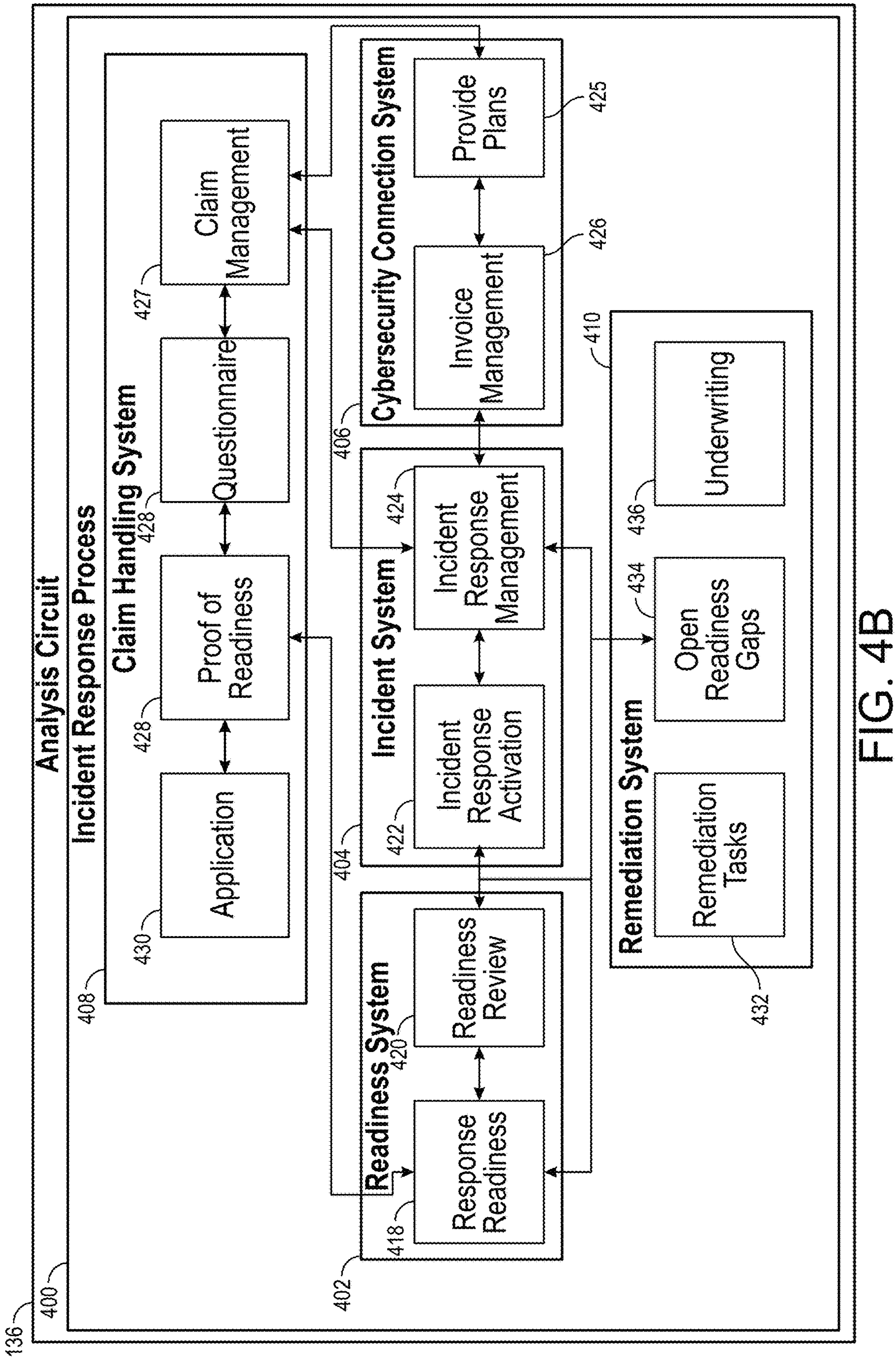

Referring now to FIGS. 4A-4B, a method 400 for incident response preparedness and readiness through the final incident closure and claim submission. Response system 130 (e.g., analysis circuit 136) or third party computing system 150 can be configured to perform method 400. Further, any computing device or system described herein can be configured to perform method 400. Additionally, one or more of the functions and features described in method 400 can be performed on an application. The data acquisition engine 180 can communicate using APIs with the response system 130.

In broad overview of the incident response process (e.g., method 400), the analysis circuit 136 can implement method 400. The analysis circuit can include various computing systems such as readiness system 402, incident system 404, cybersecurity connection system 406, claim handling system 408, and remediation system 410 can include systems configured to implement steps within an incident response process. In particular, FIG. 4B shows examples of activities or tasks performed in at least one (e.g., each) of the steps shown in FIG. 4A. Throughout the steps and activities data and data structures can be utilized (e.g., aggregate, collected, or generated) including data of business users 412, vendors 414, and insurers 416. APIs 171 and API request and returns can be sent and received by the one or more processing circuits to perform method 400. Additionally, fewer, or different operations can be performed depending on the particular implementation. In some implementations, some or all operations of method 400 can be performed by one or more processors executing on one or more computing devices, systems, or servers. In various implementations, at least one (e.g., each) operation can be re-ordered, added, removed, or repeated.

Referring to method 400 in more detail, the analysis circuit 136 can execute a readiness step by readiness system 402, where a readiness analysis is executed. In some implementations, during the readiness step by readiness system 402, the analysis circuit 136 can perform response readiness 418 and readiness review 420. During the response readiness 418, the analysis circuit 136 evaluates the level of preparedness of the entity or organization to effectively respond to incidents. It assesses various factors such as the availability of incident response teams, the adequacy of incident response plans and procedures, the integration of incident response tools and technologies, and the establishment of communication channels and protocols. This evaluation helps identify any gaps or deficiencies in the entity response capabilities and can be used to determine appropriate measures to be taken to address them.

Simultaneously (or in a logical order), the readiness review 420 conducted by the analysis circuit 136 includes a thorough examination of the overall readiness of the entity or organization for incident response. It encompasses a comprehensive review of the entity incident response framework, including its policies, procedures, documentation, and training programs. The analysis circuit 136 examines whether the incident response framework aligns with industry best practices, regulatory requirements, and internal objectives. It also assesses the ability of the entity to effectively coordinate and collaborate with external stakeholders, such as incident response providers, cyber insurers, breach counsel, and other relevant parties.

In some implementations, the readiness system 402 is configured to access the entity data of an organization and utilize this information to determine the entity security posture. The readiness system 402 can take into account various parameters such as the cybersecurity policies, system configurations, incident response readiness, and others parameters of an entity. It can then model the security posture along with a plurality of security objectives of the organization to generate a set of cybersecurity attributes.

The analysis circuit 136 can also execute an incident step by incident system 404, where an incident analysis is executed. In some implementations, during the incident step by incident system 404, the analysis circuit 136 can perform incident response activation 422 and incident response management 424. During the incident response activation 422, the analysis circuit 136 triggers the actions to initiate the incident response process. It activates the predefined incident response plans, procedures, and resources to provide a swift and coordinated response. This includes notifying the incident response team, engaging relevant stakeholders and vendors, and initiating communication channels to exchange information.

In some implementations, the incident system is configured to maintain the relationship between the entity and third-party cybersecurity providers. That is, it is configured to model a plurality of cybersecurity protection plans between the entity and a third-party. In particular, it provides a framework for integrating third-party cybersecurity solutions into the entity systems such that that these solutions align with the entity security objectives and can effectively address its cybersecurity goals.

Simultaneously (or in a logical order), the analysis circuit 136 executes incident response management 424, which includes the ongoing coordination, monitoring, and control of the incident response activities. For example, it can be used to determine that the incident response team follows the established procedures, communicates effectively, and collaborates seamlessly to address the incident. The analysis circuit 136 provides real-time insights and updates on the incident status, facilitates information sharing between team members, and tracks the progress of incident containment, eradication, and recovery efforts. By effectively managing the incident response, the analysis circuit 136 helps reduce the impact of the incident and accelerates the return to normal operations. By performing the incident response activation 422, it initiates a rapid and coordinated response, while the incident response management 424 can be used to determine effective coordination and control throughout the incident response process. This incident analysis and response approach facilitated by the analysis circuit 136 allows organizations to mitigate the impact of incidents, reduce downtime, and protect their assets and operations.

The analysis circuit 136 can also execute a proposal/quote/contract step by cybersecurity connection system 406, where a proposal/quote/contract generation is executed. In some implementations, during the proposal/quote/contract step by cybersecurity connection system 406, the analysis circuit 136 can perform invoice management 426. During the proposal/quote/contract step by cybersecurity connection system 406, the analysis circuit 136 leverages its capabilities to generate comprehensive and accurate proposals, quotes, and contracts. It takes into account the specific requirements, parameters, and preferences of the included parties such that the proposed terms align with their respective goals. The analysis circuit 136 utilizes relevant data, such as pricing information, service level agreements (SLAs), and contractual obligations, to generate customized proposals and quotes. In some implementations, within the proposal/quote/contract step by cybersecurity connection system 406, the analysis circuit 136 incorporates invoice management 426 functionality. This feature facilitates the efficient handling and tracking of invoices related to the proposed services or products. The analysis circuit 136 can be used to determine that accurate and timely invoices are generated, shared, and managed throughout the invoicing process. It can include features such as invoice creation, validation, tracking, and payment processing, streamlining the financial aspect of the proposal/quote/contract lifecycle.

In some implementations, the cybersecurity connection system 406 can be configured to determine and provide (e.g., connect) a cybersecurity protection plan, utilizing one or more protection parameters. The plans can correspond to a new cybersecurity attribute that has been identified to protect the organization. The cybersecurity connection system 406 makes this protection plan available to the entity, which can then choose to activate it based on its specific goals and acceptance of the plan terms.

The analysis circuit 136 can also execute a claims step by claim handling system 408, where claims are generated and tracked. In some implementations, during the claims step by claim handling system 408, the analysis circuit 136 can perform proof of readiness 429, provide an application 430 (e.g., application 112 and 152), generate and provide questionaries 428, and perform claim management 427. In some implementations, proof of readiness 429 includes gathering and presenting evidence to substantiate the readiness of the organization in handling incidents and responding effectively. The analysis circuit 136 collects relevant data, such as incident response plans, documentation, training records, and compliance certifications, to demonstrate the entity preparedness. Additionally, the analysis circuit 136 provides an application 430, such as application 112 and 152, to facilitate the claims process. This application serves as a centralized platform where users can access and submit their claims. It streamlines the claims workflow by facilitating efficient communication, documentation, and tracking of the claims from initiation to resolution.

In some implementations, the claim handling system 408 is configured to monitor the environmental data of the entity while modeling at least one of the plurality of cybersecurity protection plans. That is, the claim handling system 408 monitors for any anomalies or signs of potential cybersecurity incidents in the entity environment. When it detects a new cybersecurity incident associated with the entity from the environmental data, it generates a report such that the entity or vendor can use the report to promptly respond to the incident and prevent further damage.

In some implementations, as part of the claims step by claim handling system 408, the analysis circuit 136 also generates and provides questionnaires 428. These questionnaires are designed to gather specific information related to the incident or the claim being submitted. They serve as a structured means to collect relevant details and documentation for claim evaluation and processing. Moreover, the analysis circuit 136 encompasses claim management 427 functionalities during the claims step by claim handling system 408. This includes activities such as claim validation, documentation management, claim status tracking, and communication with included parties. The analysis circuit 136 can be used to determine that claims are effectively managed, providing transparency and visibility into the progress and status of at least one (e.g., each) claim.

The analysis circuit 136 can also execute a remediation step by remediation system 410, where remediations are executed. In some implementations, during the remediation step by remediation system 410, the analysis circuit 136 can perform remediation tasks 432, open readiness issues and gaps 434, and execute underwriting 436 (e.g., of organizations to determine what type of vendor plans, products, or services they can qualify for). The execution of remediation tasks 432 includes implementing specific actions or measures to mitigate vulnerabilities, resolve security gaps, and address any identified weaknesses in the entity security infrastructure. The analysis circuit 136 can provide guidance and instructions to stakeholders, outlining steps to remediate the identified issues effectively.

In some implementations, the remediation system 410 is configured to execute one or more remediation actions to mitigate a vulnerability or security gap. It bases its actions on the security posture of the entity. If a vulnerability is detected or a security gap is identified, the remediation system 410 executes to address the issue, employing a range of remediation actions such as patching software, modifying system configurations, or enhancing security policies.

Additionally, the analysis circuit 136 facilitates the process of opening readiness issues and gaps 434. It identifies areas where the organization can have shortcomings or deficiencies in its preparedness for potential incidents or security threats. By highlighting these gaps, the analysis circuit 136 helps organizations prioritize and allocate resources to address the identified issues and enhance their overall readiness posture. Moreover, the analysis circuit 136 can execute underwriting 436, which includes evaluating organizations to determine the type of vendor plans, products, or services they can qualify for. Through a comprehensive assessment, the analysis circuit 136 analyzes various factors, such as the entity security measures, incident response capabilities, risk management practices, and compliance with industry standards. Based on the evaluation, the analysis circuit 136 provides insights and recommendations on suitable vendor offerings that align with the entity specific requirements and level of readiness.

In some implementations, the readiness system 402 is configured to continuously update the security posture of the entity. It does this by monitoring dynamic changes in the entity data, which can include alterations in system configurations, updates to security policies, new cyber threats, and shifts in the cyber risk landscape. This continuous updating of the security posture can be used to determine that the entity security status continuously reflects the current conditions. It allows the analysis circuit 136 to react to emerging threats or vulnerabilities, providing real-time protection for the entity data and systems.

In some implementations, the readiness system 402 can also be configured to tokenize and broadcast the security posture to a distributed ledger. This process includes converting the security posture into a format suitable for recording on a blockchain (e.g., a type of distributed ledger). It then broadcasts this tokenized data across the network of computers that maintain the ledger. Additionally, the readiness system 402 provides a public address of the tokenized updated security posture on the distributed ledger. This public address can be accessed by a plurality of third-parties for verification. This transparent and immutable record-keeping enhances trust among stakeholders and provides a verifiable proof of the entity security posture.

In some implementations, the readiness system 402 is further configured to generate a security roadmap. This roadmap includes a plurality of phases associated with the modeling of the set of cybersecurity attributes. At least one (e.g., each) cybersecurity attribute of the set is assigned a phase associated with the security roadmap of the entity. For example, the roadmap serves as a strategic plan that outlines the steps the entity is to take to enhance its security posture. It provides a clear pathway to achieving the entity security objectives by validating that efforts are well-coordinated, and resources are efficiently utilized. By assigning at least one (e.g., each) cybersecurity attribute to a phase of the roadmap, the readiness system 402 can be used to determine that at least one (e.g., each) aspect of the entity security is appropriately addressed.

In some implementations, the cybersecurity connection system 406 can create and set in motion a cybersecurity protection obligation, in provide plans 425, between the entity and the third-party upon receiving an activation of the cybersecurity protection plan. The cybersecurity protection obligation can be a binding agreement or contract that outlines the responsibilities and roles of the entity and the third-party in securing the entity systems and data. This protection obligation is characterized by several protection attributes, which can include various elements such as the scope of protection, the duration of the contract, the specific cybersecurity services to be provided, the response time in the event of a security incident, and the terms of service termination or renewal. Moreover, the cybersecurity connection system 406 can identify multiple cybersecurity protection plans (e.g., at provide plans 425) associated with various third-parties. These could include a wide array of cybersecurity service providers, at least one (e.g., each) offering distinct protection plans. For example, a first cybersecurity protection plan could be offered by a first third-party, while a second cybersecurity protection plan could be offered by a different third-party. At least one (e.g., each) of these protection plans can be associated with the new cybersecurity attribute identified during the modeling process, indicating that they are specifically designed to address this aspect of the entity cybersecurity goals.

In some implementations, at least one (e.g., each) cybersecurity protection plan, in turn, is associated with one of several availability states. These states provide an immediate understanding of plan status regarding its accessibility for the entity. The "available now" state means that the plan is currently accessible for implementation. The "available pending" state signifies that the plan will become accessible in the future (e.g., subject to conditions or the passing of a period). Conversely, an "unavailable" state denotes that the plan is not currently accessible, possibly due to it being phased out, fully subscribed, or not being offered in the entity region. Additional or fewer states can be added. This system of availability states allows the entity to quickly determine which plans are viable options for enhancing their cybersecurity posture.

In some implementations, the incident system 404 can establish a data (e.g., continuous, in real-time, periodically) monitoring channel between the entity and the third-party. This communication stream allows for real-time (or near real-time) detection and response to any potential cybersecurity incidents. To achieve this, a first communication connection is established using a first application programming interface (API) between the entity computing system (e.g., 110) or one or more entity assets (e.g., 110) and the incident system 404. This connection allows the incident system 404 to continuously monitor the entity systems and data for any signs of a cybersecurity incident. Simultaneously, a second communication connection is established using a second API between a third party computing system (e.g., 150) and the incident system 404. This connection facilitates the third-party, often a cybersecurity service provider, to also monitor the entity systems and data, providing an additional layer of protection and vigilance.

Moreover, the claim handling system 408 can be configured to quickly respond to any detected cybersecurity incidents. Upon detection of a new cybersecurity incident, the claim handling system 408 generates alerts and provides a real-time dashboard for the entity and vendor. This dashboard provides an overview of the entity cybersecurity posture, details of the detected incident, recommended response actions, and updates on the response process. This real-time information allows the entity to rapidly understand and react to the cybersecurity incident, reducing potential damage and downtime.

In some implementations, the remediation system 410 can use predictive analytics to identify potential security gaps before they can be exploited. It analyses patterns in the entity data and behaviors, as well as trends and threats in the broader cybersecurity landscape, to predict where vulnerabilities can arise. Upon identifying a potential security gap, the remediation system 410 proactively executes one or more remediation actions. These actions could include updating security policies, patching software vulnerabilities, reconfiguring system settings, providing cybersecurity training to employees, or implementing additional cybersecurity measures.

Figure 5:
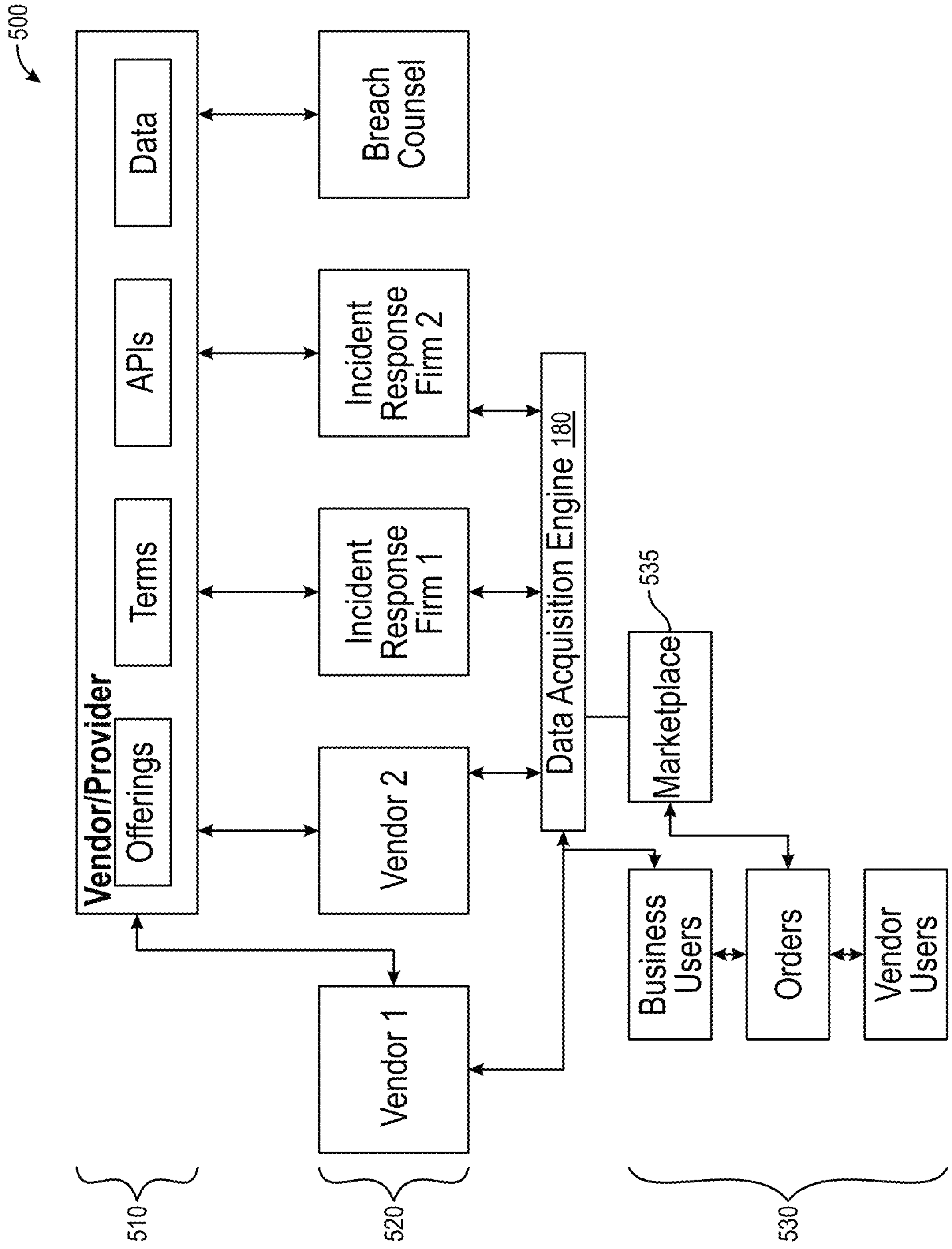
FIG. 5 depicts an example vendor-provider marketplace, according to some implementations.

Referring now to FIG. 5, a vendor-provider marketplace 500, according to some implementations. The vendor-provider marketplace 500 depicts generally the interactions between vendors 510 and users 530 (e.g., directly or through partners) as well as vendors 510 to partners 520. For example, at least one (e.g., each) vendor 510 can include, but is not limited to, offerings, terms, APIs, and data that can be provided and/or exchanged with to the response system 130 via the data acquisition engine 180 and other vendors, incident response firms, and breach counsel (e.g., law firm) (collectively referred to as "partners 520"). In some implementations, those partners 520 can communicate with the data acquisition engine 180 of FIG. 1A to generate dashboards of an application (e.g., 112, 152) and store data in database 140 for future use.

Expanding on the vendor-provider marketplace 500 depicted in FIG. 5, this marketplace serves as a central hub for interactions between vendors 510, users 530, and partners 520, facilitating the exchange of offerings, terms, APIs, and data. At least one (e.g., each) vendor 510 within the marketplace encompasses a range of products, services, and resources that can be made available to users 530 directly or through the engagement of partners 520. These partners 520, which include incident response firms, breach counsel (such as law firms), and other relevant entities, play a role in providing expertise and additional support to enhance incident response capabilities (e.g., a type of cybersecurity attribute). Through seamless communication with the data acquisition engine 180, the partners 520 can actively engage in generating comprehensive dashboards within the application interfaces (e.g., 112, 152). These dashboards offer real-time insights and analytics such that users 530 can visualize and assess their incident response readiness, track ongoing incidents, and access relevant data stored in the database 140 for future reference. The data acquisition engine 180 serves as a communication bridge, allowing partners 520 to contribute information and leverage the functionalities of the response system 130. It can be understood that the vendors 510, partners 520, and users 530 depicted in the vendor-provider marketplace 500 can be executed by computer systems, exemplified by the computing system 200 shown in FIG. 2. These computer systems facilitate seamless collaboration, data exchange, and transactional activities within the marketplace to provide a dynamic and efficient ecosystem for incident response management.

In some implementations, the vendor-user interaction within the marketplace 535 extends beyond mere browsing and exploration. Vendors 510 and users 530 have the capability to place orders directly through the marketplace 535, initiating a streamlined process facilitated by the data acquisition engine. This integration of ordering functionality enhances the efficiency and convenience of the marketplace, providing seamless transactions between vendors and users. Notably, the marketplace 535 serves as a platform for programmatic connectivity and identifies new partners to establish collaborative relationships efficiently. The marketplace incorporates contracting workflows and partnering processes, which are seamlessly facilitated through the application interface. Once a partnership is ratified, the partners can immediately engage in business activities within the platform, leveraging the full range of services and offerings available. This includes the ability to submit proposals, engage in reselling, establish technical connectivity for provisioning and licensing, establish API connections for data sharing, utilization, and presentation on the platform, and leverage pre-defined programmable logic for user, vendor, and partner interactions.

In some implementations, the marketplace 535 introduces dynamic and automated workflows that facilitate efficient routing of inbound orders to the appropriate partner based on predefined criteria. This programmable logic facilitates that orders are seamlessly directed to the designated partner for processing and fulfillment. Furthermore, programmatic activation of contracts and seamless order fulfillment processes are executed, facilitating a smooth and rapid delivery of the purchased offering, whether it is a product or service. The marketplace ecosystem facilitates the seamless integration of vendors, partners, and users, streamlining the order management process and facilitating timely and efficient delivery of products and services.

Distinguishing itself from other vendor marketplaces, this embedded marketplace 535 is seamlessly integrated within the applications and APIs (171) spanning the system architecture. This integration facilitates vendor offerings to be presented to users dynamically, seamlessly integrating within the user flow during various stages of cybersecurity incident response planning, testing, and execution. Moreover, the marketplace becomes a part of the design and composition processes for constructing a robust cybersecurity stack, as well as during security program orchestration and adaptation to determine the ongoing effectiveness of the cybersecurity program. By embedding the marketplace within the applications and APIs, users 530 have immediate access to a comprehensive array of vendor offerings precisely at the point of vulnerability. Whether users are developing their incident response plans, conducting tests, executing response strategies, or adapting their security programs, the marketplace seamlessly integrates within their workflow, providing timely and relevant vendor options to enhance their cybersecurity capabilities (e.g., cybersecurity attributes). This approach eliminates users navigating separate platforms or search for vendors independently, streamlining the process and promoting efficiency in decision-making and procurement.

Additionally, this embedded marketplace fosters a holistic approach to cybersecurity management, facilitating collaboration between users 530 and vendors 510 throughout the ecosystem. By offering vendor options during incident response planning, testing, and execution, users can make informed decisions and select the suitable solutions to mitigate risks effectively. Similarly, during the design and composition of their cybersecurity stack, users 530 can access a diverse range of vendor offerings directly within the application interface and use the offerings to build a comprehensive and tailored security infrastructure. Additionally, during security program orchestration and adaptation, the marketplace 535 provides users with insights and options to enhance the effectiveness and resilience of their security programs by providing continuous protection against evolving threats.

It can be understood that the embedded marketplace architecture allows for flexibility and scalability, accommodating additional systems, devices, data structures, and data sources. The marketplace can adapt to the evolving goals of users and vendors, expanding its offerings and functionalities to meet the dynamic nature of the cybersecurity landscape. This adaptability can be used to determine that the marketplace remains a resource for users, providing access to the updated innovations and vendor solutions while facilitating seamless collaboration and partnership within the cybersecurity ecosystem.

Figure 6:
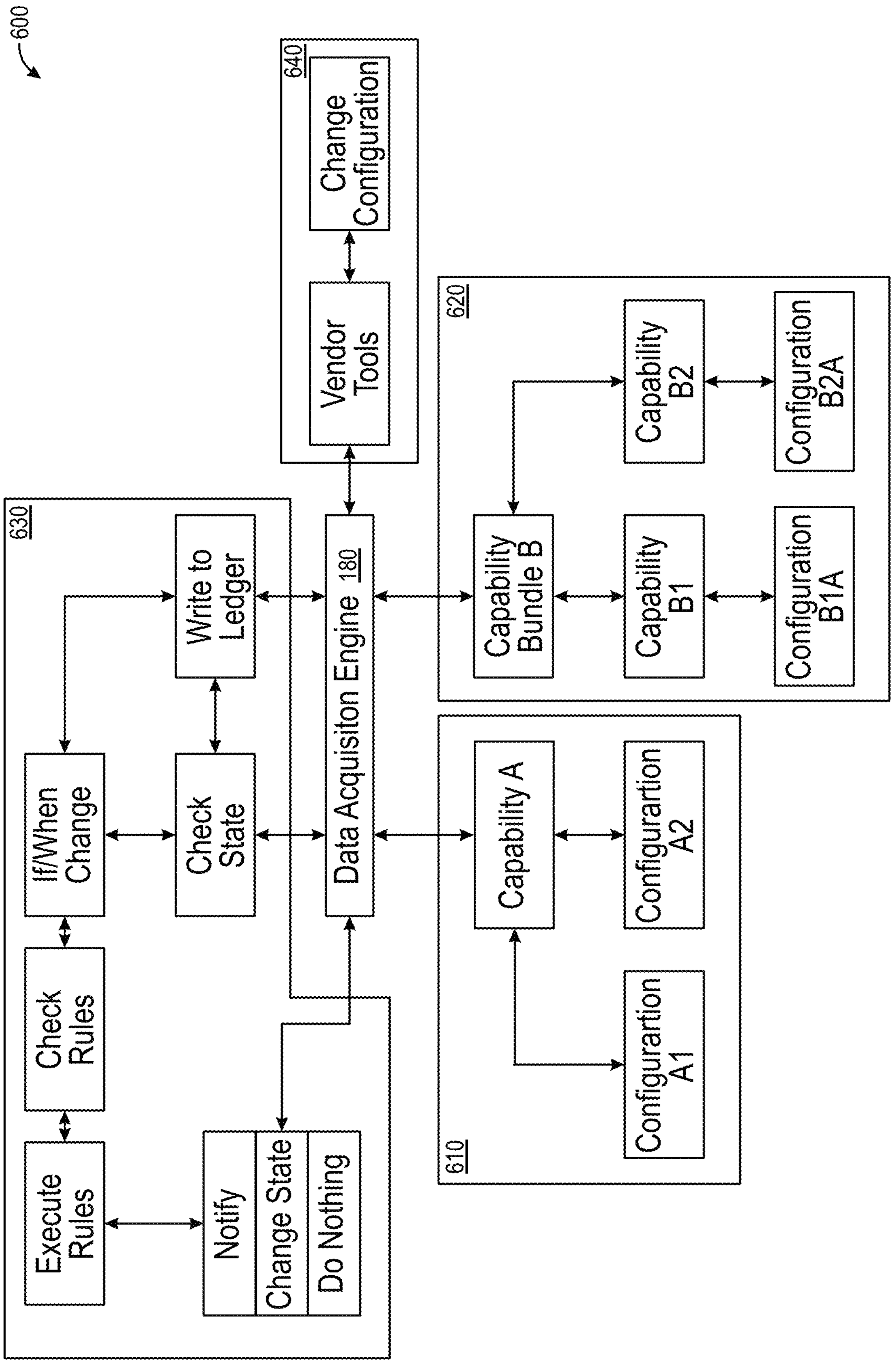
FIG. 6 depicts a flowchart for a method for capturing the state of capabilities, according to some implementations.

Referring now to FIG. 6, a method 600 for capturing the state of capabilities (sometimes referred to herein as "cybersecurity attributes") (e.g., vendor technologies or configurations) in place and in use by users, retrieving state, and sharing of state at points in time as well as over a time period. Response system 130 (e.g., analysis circuit 136 or data acquisition engine 180) or third party computing system 150 can be configured to perform method 600. Further, any computing device or system described herein can be configured to perform method 600. Additionally, one or more of the functions and features described in method 600 can be performed on an application.

In broad overview of method 600, capabilities 610 and 620 associated with a corporation of business can be received (e.g., capability A with configuration A1 and configuration A2, and capability bundle B with capability B1 and B2, where capability B1 has a configuration B1A and capability B2 has a configuration B2A). The capabilities 610 and 620 can be checked (e.g., check state) and the capabilities can be written to a ledger (e.g., database and/or blockchain 170) in steps 630. Once the capabilities 610 and 620 are received, a thorough check is conducted to verify their state and determine their accuracy and validity. This check entails examining the current status and parameters of at least one (e.g., each) capability, evaluating factors such as readiness, compatibility, and compliance with established standards or requirements. By performing this comprehensive assessment, any discrepancies or issues pertaining to the capabilities can be identified and addressed.

In some implementations, following the verification process, the next step includes recording the capabilities into a ledger. This ledger serves as a secure and reliable storage medium, which can take the form of a database or a blockchain 170. The capabilities, along with their associated configurations, are meticulously documented and stored within the ledger to maintain the integrity and traceability of the information. This facilitates easy access to the capability details, their respective configurations, and any historical changes or updates that can occur over time. By writing the capabilities to the ledger, organizations gain a centralized and auditable repository that securely maintains a record of their capabilities. Additionally, the ledger facilitates transparency and accountability by providing an immutable and tamper-proof audit trail of the capabilities and their configurations.

In turn in steps 630, a process can occur if a state has changed including, but not limited to, checking rules, execute rules, and notifying, changing state, and/or performing no actions. If a change occurred (e.g., trigger condition, e.g., capability A changed, the data acquisition engine 180 can determine to change it back (or role it back), capability B changed and in turn then vendor technology is configured to change Y associated with the business or corporation) then the one more processing circuits can programmatically connect to vendor technology to change a configuration (e.g., utilizing API calls). In some implementations, at steps 640, the data acquisition engine 180 can communicate with vendor tools to change particular configurations.

Upon detecting a change in state, the data acquisition engine 180 evaluates the trigger condition, such as the alteration of capability A or capability B. Based on this evaluation, a decision is made regarding the appropriate course of action. For example, if capability A experiences a change, the data acquisition engine 180 can determine that a rollback is to be performed to revert the capability back to its previous state. Similarly, if capability B undergoes a change, the vendor technology associated with the business or corporation can be configured to adjust Y accordingly, aligning it with the modified capability. To effectuate these changes, the processing circuits within the data acquisition engine 180 (or within response system 130) establish programmatic connections with the vendor technology responsible for managing the configurations (e.g., at step 640). Moving forward to step 640, the data acquisition engine 180 actively engages in communication with the vendor tools to implement the desired changes. Through this interaction, the data acquisition engine 180 can efficiently orchestrate the configuration changes to align the capabilities with the desired state.

With reference to FIG. 6, the one or more processing circuits can utilize the various data structures (e.g., assets, locations, capabilities, threats) to collect, attribute, and adapt to determine if a trigger condition occurred (e.g., historical data of the corporation or business can be used to determine if a trigger condition occurred) In turn, the one or more processing circuits can execute one or more functions such as make an API request (e.g., to vendor, insurer, or business), store information in a database, and/or update a blockchain ledger (e.g., at step 630). Additionally, fewer, or different operations can be performed depending on the particular implementation. In some implementations, one or more operations of method 600 can be performed by one or more processors executing on one or more computing devices, systems, or servers.

In some implementations, in order to identify the occurrence of a trigger condition, historical data of the corporation or business is often utilized. This historical data provides insights into the past behavior and patterns of the organization, allowing the processing circuits to make informed decisions regarding trigger condition identification. Upon determining that a trigger condition has indeed occurred, the one or more processing circuits initiate a series of functions and operations to address the situation. These functions can include making API requests to relevant entities such as vendors, insurers, or other businesses. Through these API requests, the processing circuits can retrieve information or initiate specific actions to respond to the trigger condition effectively. Additionally, in some implementations, the processing circuits can update a blockchain ledger, providing a secure and immutable record of the trigger condition and any associated changes made as a result.

In various implementations, at least one (e.g., each) operation can be re-ordered, added, removed, or repeated. This system will be used to deliver state of a business security configuration to facilitate insurance underwriting, whereby the facts of the state of the business user computing environment are known, and provable. This provides the underwriting insurer the ability to collect irrefutable proof-of-state of the business environment as part of their pre-underwriting and risk selection process and can be then used for programmatic binding as part of their application process. The system can be further utilized to provide programmatically and dynamically adaptable insurance products that change the coverage level based on the factual changes in state of the computing environment at the insured through the policy period. This allows the insurer to determine that the insured has followed the underwriting criteria throughout the term of the policy. Cyber insurance renewals can be programmatically generated and automatically bound based on the binary data provided by the system during renewal as the insurer knows what the compliance history has been for the insured as well as the facts of the current state of the vendor capabilities and configurations in the insureds computing environment.

In various implementations, the underwriting process begins by collecting data from security tools and configurations of the insured. This data can then be analyzed and matched against the specific underwriting requirements defined by the insurer. The collected data acts as irrefutable proof of the security posture of the insured, providing the insurer with a holistic understanding of the risk associated with the business environment of the insured. In some implementations, once the data has been collected and matched to underwriting requirements, the processing circuits can wrap this information with context and metadata through a broker. The broker acts as an intermediary, consolidating and structuring the data in a standardized format that can be seamlessly transmitted to the quoting API of the insurer. This integration improves the underwriting application process by allowing the insurer to access the factual data of the insured security configurations and/or computing environment. With this data, the insurer can programmatically assess the risk and make informed decisions regarding coverage and policy terms. This automated and dynamic approach empowers insurers to offer adaptable insurance products that can be adjusted based on the factual changes in the insured computing environment throughout the policy period, facilitating ongoing compliance with underwriting criteria and tailored coverage for the insured. Additionally, the system facilitates the automatic generation and binding of cyber insurance renewals based on the binary data provided during the renewal process. By utilizing the compliance history and the up-to-date facts of the insured computing environment, the insurer can renew the policy while maintaining a comprehensive understanding of the insured risk profile and providing continuous coverage.

Generally, FIGS. 7A-7D depict the organization or entity dashboards and the interactive items and actionable items the organization can interact with (e.g., using client device 110). Referring now to FIGS. 7A-7D, which generally relate to an onboarding process for a response system 130 (referred to herein as "Responder") that facilitates incident response. Specifically, FIGS. 7A-7D provides a quick start guide for organizations to onboard into Responder. As shown in FIGS. 7A-7D, the quick start guide includes a series of steps that guide organizations through the process of getting ready to use Responder for incident response. Upon interaction with a client device 110 (e.g., of a customer), Responder's response system 130 initiates an onboarding process. The onboarding process begins with a guided wizard that assists the organization in setting up key components of the system, such as inviting team members and identifying critical assets. The guide also provides general guidance on the different features of Responder.

As the organization progresses through the steps in the quick start guide, Responder provides helpful tutorial videos to guide the user through each of the different features. Additionally, as the organization fills out the initial steps in the guide, Responder becomes more tailored to the organization's specific goals. Specifically, Responder will provide details on how the organization's specific vendors will help during an incident, rather than just general information on incident response vendors. The first step in the onboarding process is inviting the organization's internal team and copying and sending them an invite link. From there, the guide assists the organization in identifying key assets and understanding how Responder and its vendors will assist during an incident. By providing a comprehensive onboarding process, Responder streamlines incident response and facilitates effective communication and collaboration among all stakeholders.

Figure 7A:
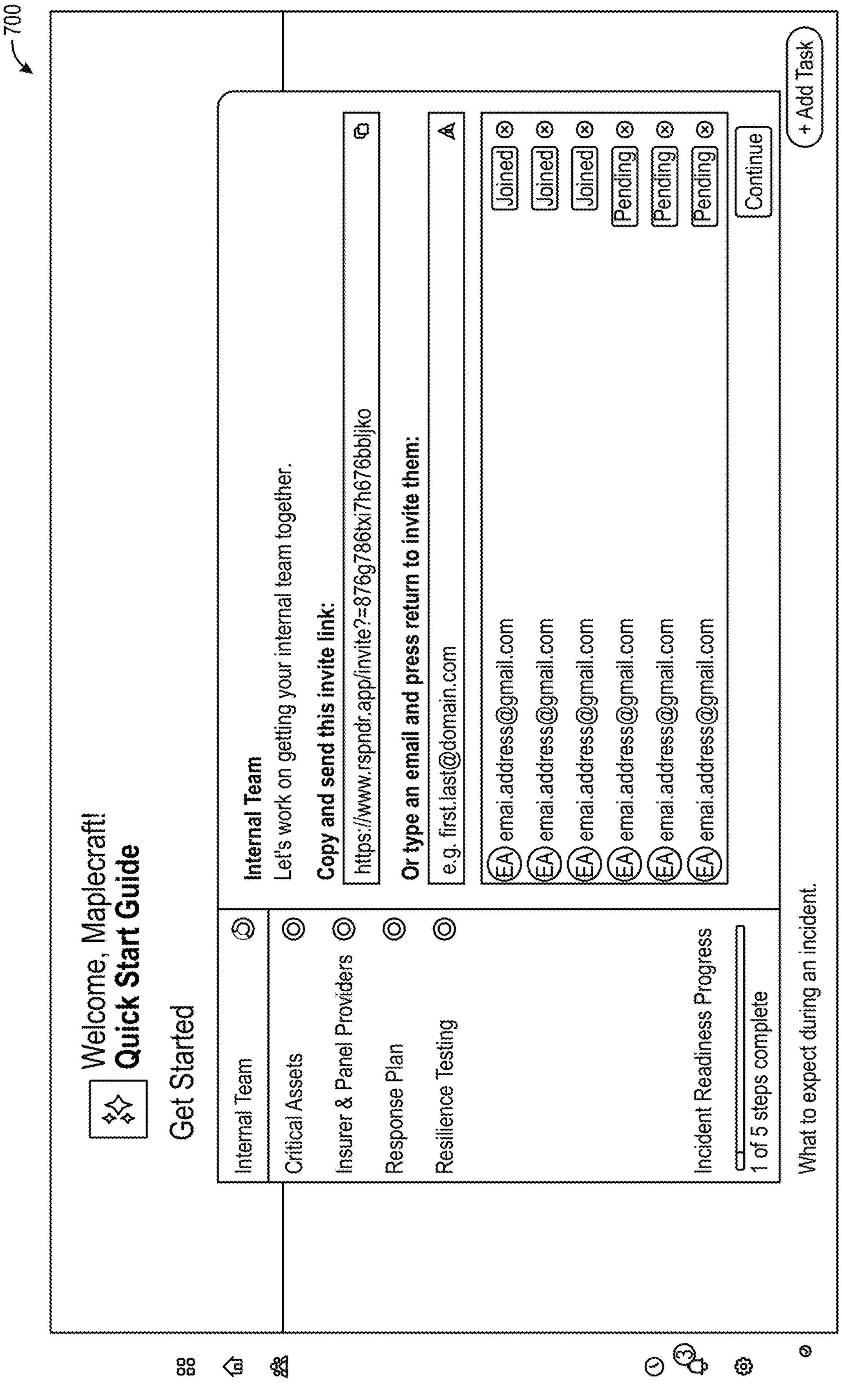
FIGS. 7A-7D depict example user interfaces, according to some implementations.

Referring now to FIG. 7A, the interface 700 presents (e.g., on client device 110) a step in the onboarding process for Responder, which can include inviting the organization's internal team and its members to join the platform. The response system 130 streamlines this process by allowing the user to copy and send an invite link to team members via email. Alternatively, users can type in the emails manually and send the invitations that way. In some implementations, once the invitations are sent, the user can proceed to the next step of the onboarding process. This step can include involves identifying critical assets, such as systems and applications, that should be protected and monitored during any incident (e.g., cyber incident). Responder's onboarding guide provides detailed guidance on how to identify these assets and incorporate them into the platform provided by response system 130 for effective incident response. In addition to facilitating the invitation and asset identification process, Responder's onboarding guide can provide an overview of the platform's various features and functionalities. This includes tutorials on how to use Responder's response system 130, how to communicate with internal and external stakeholders, and how to utilize Responder's vendor network for additional support during incidents.

Figure 7B:
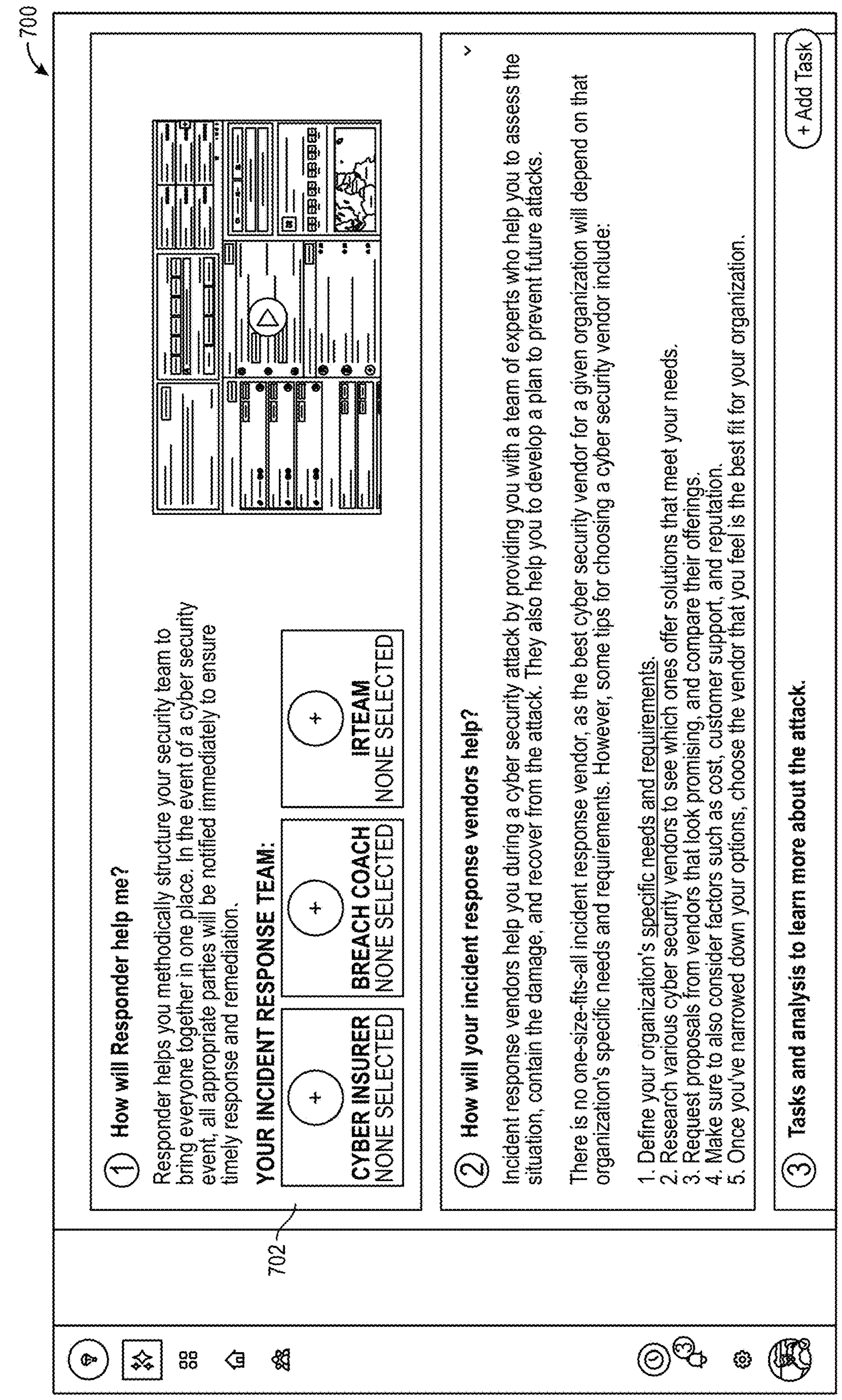
Figure 7C:
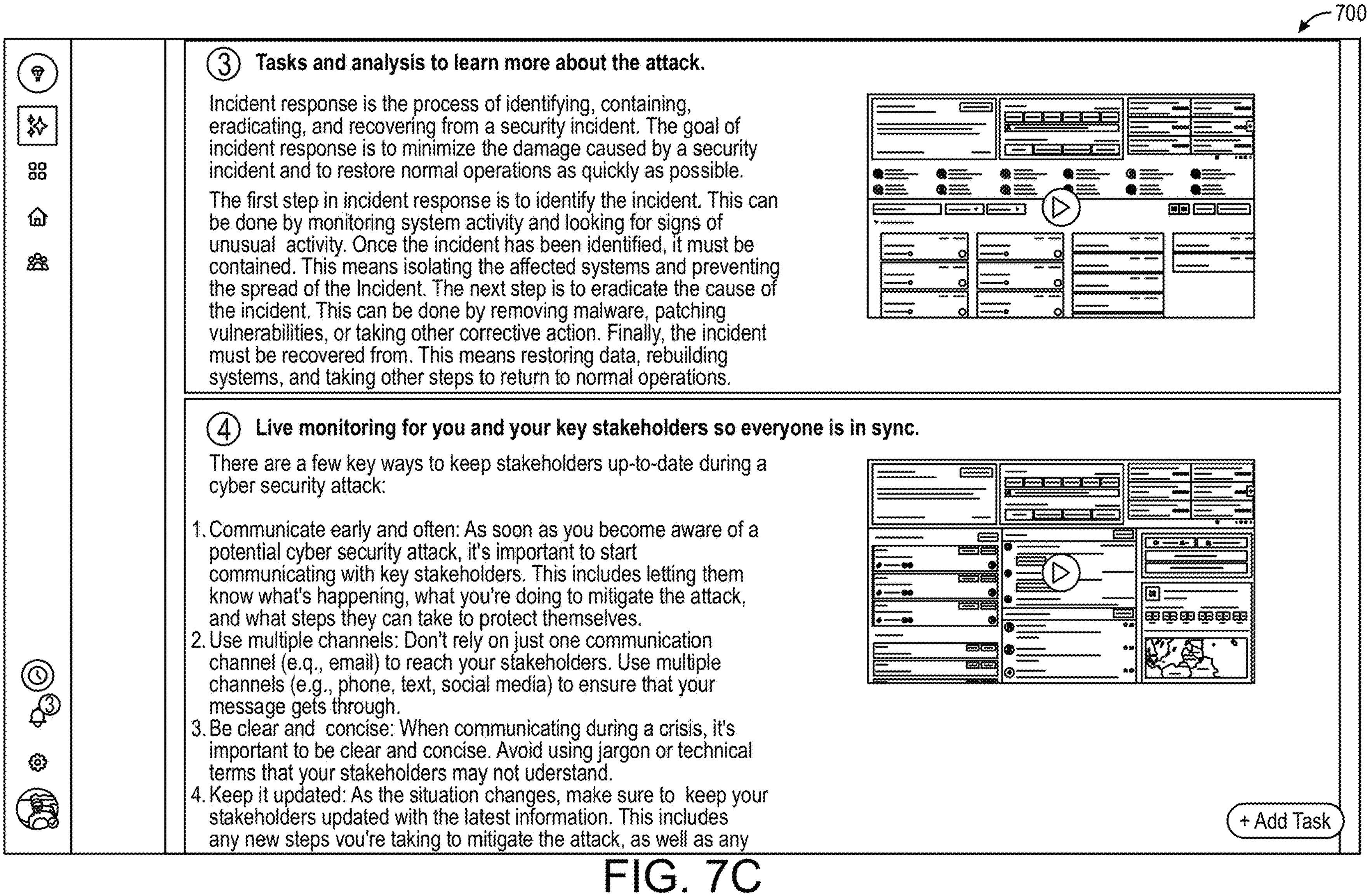
Figure 7D:
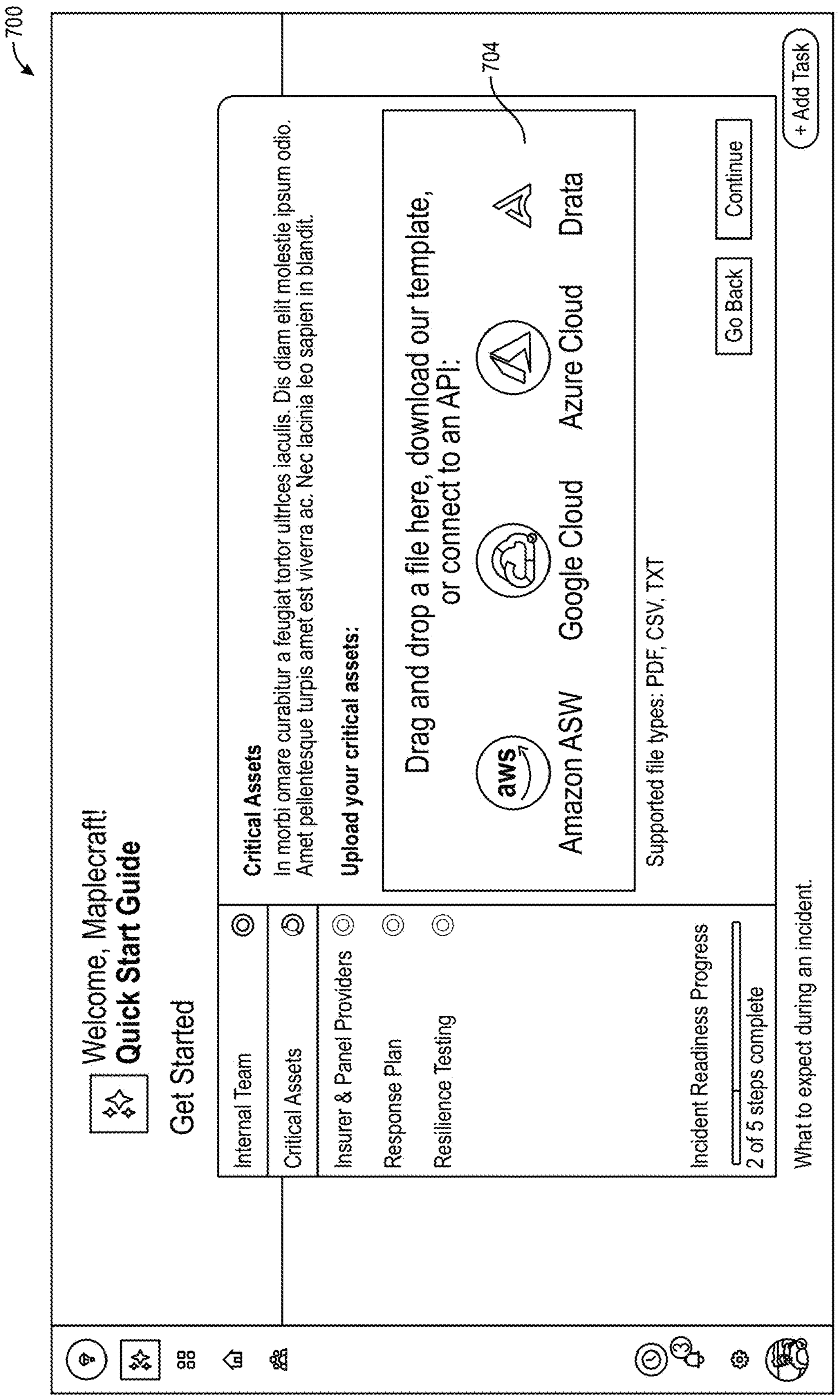

Referring now to FIGS. 7B, 7C, and 7D, Responder's onboarding process continues with the identification of critical assets that should be protected and monitored during an incident. Interface 700 presents an interactive view that allows the user to drag and drop critical assets into actionable items 702 and 704. These actionable items allow the user to upload critical assets from any file rile or connect to a cloud providers such as Amazon, AWS, Google Cloud, or Azure to pull in assets that have already been managed elsewhere. This intuitive interface 700 improves asset identification for users, providing that Responder's response system 130 can effectively monitor and protect them during an incident. Thus, responder's onboarding guide provides detailed guidance on how to identify and manage critical assets, such that users have a clear understanding of the platform's capabilities and functionalities. In addition to uploading critical assets, Responder's onboarding guide provides guidance on how to configure alerts and notifications for these assets. This verifies that the appropriate stakeholders are notified by the response system 130 in real-time (or near real-time) if an incident occurs, allowing for rapid response and effective incident management.

Some arrangements relate to modeling data, the Responder can be configured to accept data from a user device via an application programming interface (API), tokenize and extract content of the data into a plurality of tokens, generate a unique identifier for each of the plurality of tokens, store a mapping between the unique identifier and each of the plurality of tokens, populate, from each of the plurality of tokens, a plurality of fields of a data object based on the extracted content of the data stored in each of the plurality of tokens, and verify accuracy of the populated plurality of fields.

In general, the response system 130 can be configured to automate the process of filling out questionnaires and applications by allowing users to upload files including relevant information. In some arrangements, the following method can be implemented to tokenize and index data using the response system 130. The method can include (1) accepting files, where the response system 130 can allow a user to drag and drop files (e.g., docx, csv, xls, ppt, pdf, etc.) into the application or upload files via an API. The method can further include (2) indexing all the content and chunking the data, (3) creating a unique index, and (4) bashing up against a model. Additionally, the method can further include, from the files, (5) allowing the user to answer the questions for underwriting purposes. The method can further include (e.g., within the questioner) (6) determining or receiving data locations, (7) identifying if the evidence that is mapped, (8) determining if the location of the storage matters, (9) identifying the readiness application side.

In some arrangements, indexing and chunking data can include indexing all content and breaking it down into smaller, more manageable chunks. This process allows the response system 130 to efficiently parse and analyze the data, extracting the relevant information for completing the questionnaire or application. In some arrangements, a unique index can be created for each chunk of data, which serves as a reference point for the system. In some arrangements, the chunked and indexed data can be compared against a pre-existing model, which could be a knowledge base or a machine learning model.

Expanding on tokenizing and indexing, tokenizing the data can provide several improvements, such as facilitating easier data analysis by breaking data into smaller units simplifies the process of searching, sorting, and comparing information within the uploaded files. Additionally, tokenizing can enhance data processing efficiency by using smaller data units it allow the system to handle and process data faster and more efficiently. Furthermore, tokenizing can improve data extraction accuracy by identifying and extracting relevant information to recognize patterns, relationships, or similarities among the tokens. With regards to indexing, the process can include (1) assigning a unique identifier to each token (e.g., where each token is assigned a unique identifier, allowing the system to differentiate between tokens and facilitating accurate data retrieval), (2) creating an index data structure (e.g., the system constructs an index data structure that stores the mapping between the unique identifiers and their respective token positions within the files), and (3) updating the index (e.g., as new data is added, modified, or removed from the uploaded files, the index is updated accordingly to maintain its accuracy and usefulness).

For example, the automation can be performed on a questioner that allows the user to answer questions for underwriting purposes. Some questions can include: Does the Applicant conduct security vulnerability assessments to identify and remediate critical security vulnerabilities on the internal network and Applicant's public website(s) on the Internet; Does the Applicant install and update an anti-malware (also known as endpoint protection, DR) solution on all systems commonly affected by malicious software? If yes, explain how you know. If no, explain why not; Does the Applicant use any software or hardware that has been officially retired (i.e., considered "end-of-life") by the manufacturer (e.g., Windows XP); Does the Applicant update (e.g., patch, upgrade) commercial software for known security vulnerabilities per the manufacturer's advice; Does the Applicant update open source software (e.g., Java, Linux, PHP, Python, OpenSSL) that is not commercially supported for known security vulnerabilities; Does the Applicant have processes established that verify the proper addition, deletion, and modification of user accounts and associated access rights.

In some arrangements, the response system 130 can process the uploaded files and tokenizes the text and data included within, converting them into identifiable units of information. In some arrangements, the response system 130 can index the tokenized information, facilitating efficient searching, retrieval, and extraction of relevant data. In some arrangements, the response system 130 can map the indexed information to corresponding fields in the questionnaires or applications, based on pre-defined rules and logic. In some arrangements, the response system 130 can automatically prefill out the questionnaires or applications with the extracted and mapped information, thereby reducing the user's time and effort. In some arrangements, the user can review the prefilled information and make any adjustments before submitting the completed questionnaire or application.

The response system 130 can include a user interface, a file processing module (or circuit or system), a tokenization and indexing engine (or circuit or system), a mapping module or system, and a form prefilling module or system. The user interface can allow users to drag and drop or upload files, while the response system 130 can process the uploaded files and sends them to the tokenization and indexing engine. The response system 130 can tokenize and index the information, which can then be mapped to the appropriate fields in the questionnaires or applications by the response system 130. In some arrangements, the response system 130 can fill out the forms with the extracted information, allowing users to review and submit the completed forms. Advantages of the present disclosure include time and effort savings for users, a reduction in errors due to manual data entry, and an increased likelihood of consistent and accurate information across multiple forms.

Accordingly, the response system 130 offers a user-friendly and efficient feature that allows users to drag and drop files, such as docx, csv, xls, ppt, pdf, and other formats, into the application or upload them via an API. This feature improves the process of providing information for insurance questionnaires or applications, and cybersecurity questionnaires. The system automates the extraction and utilization of the relevant information within the files, reducing manual effort, time consumption, and the potential for errors. In some arrangements, the response system 130 incorporates a seamless and intuitive user interface that allows users to drag and drop files of various formats into the system. This interface also provides users with the option to upload files using an API, making it easy to integrate the system into their existing workflow. The system is designed to accommodate a wide range of file formats, such that users can provide information from multiple sources and formats without time-consuming conversions.

In some arrangements, once the files are uploaded or provided, the response system 130 processes them by tokenizing and indexing their content. The tokenization process breaks down the content into smaller units, making it easier to analyze and extract relevant information. The indexing process assigns unique identifiers to each token and maps them to their positions within the files, allowing for efficient data retrieval during the subsequent steps. After tokenization and indexing, the system compares the processed data against a pre-existing model, such as a knowledge base or a machine learning model, to identify pertinent information. This comparison allows the system to extract insights and verify the accuracy of the information. With the relevant data extracted, the system proceeds to pre-fill the fields in the insurance questionnaires or applications, and cybersecurity questionnaires.

Systems and Methods for Security Intelligence Exchange

Figure 8:
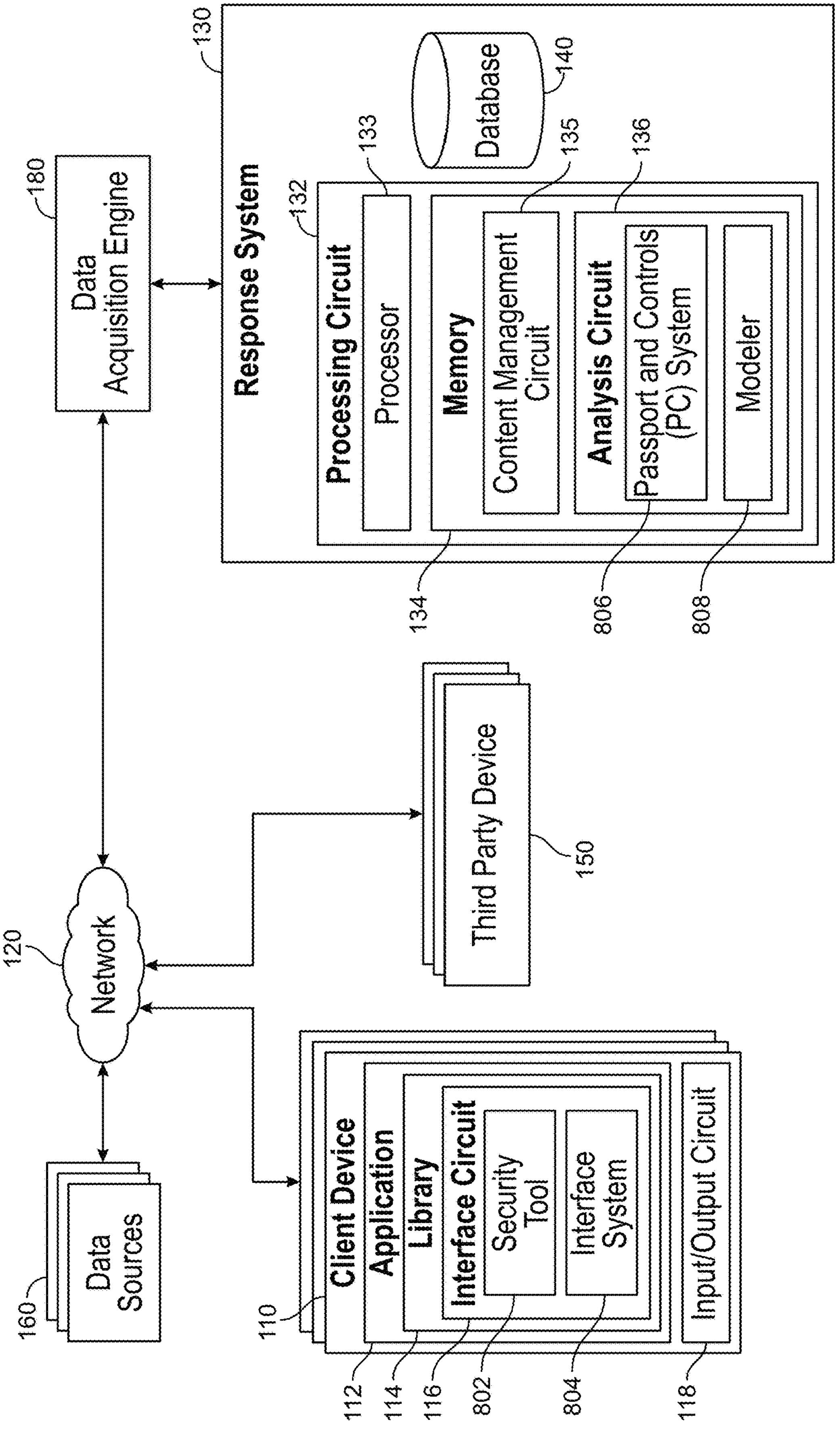
FIG. 8 depicts a block diagram of an implementation of a system for improving cybersecurity protections across a plurality of entities, according to some implementations.

Referring now to FIG. 8, a block diagram depicting an implementation of a system for improving cybersecurity protections across the plurality of entities. In some implementations, the interface circuit 116 of the client device 110 within the implementation of the system shown on FIG. 8 can include a security tool 802 and an interface system 804. As described herein, the library 114 can include the interface circuit 116. The security tool 802 of the interface circuit 116 can include a plurality of features to enhance the security of the client device 110 or the application 112. The plurality of features can include antivirus software, firewalls, instruction detection systems, vulnerability scanners, endpoint security software, and/or the like. The security tool 802 can monitor, secure, and/or protect the interface system 804 by executing the plurality of features. Using aspects of the technical solution described herein, can improve the cybersecurity protection of the client device 110, the third party device 150, and/or the data sources 160.

The interface system 804 can collect or identify the incident data associated with the cybersecurity incident. During the claims process of the claim handling by a claim handling system (e.g., implementation shown on FIG. 8), the interface system 804 can monitor and collect the incident data at various steps of the process. For example, the interface system 804 can collect incident data from the environmental data of the entity during the modeling of the plurality of cybersecurity protection plans. The incident data from the environmental data can correspond to anomalies or potential cybersecurity incidents in the environment of the entity. In some implementations, the interface system 804 can identify incident data from the reports of the claim handling system. In some implementations, the interface system 804 can collect incident data from the questionnaire generated by the analysis circuit 136. For example, a questionnaire can gather information related to the incident or the claim submitted. From the information, the interface system 804 can extract incident data associated with the claim.

The interface system 804 can collect the incident data to satisfy a threshold or upon the reception of a signal from the analysis circuit 136. For example, the interface system 804 can identify incident data from application 112, a questionnaire, proof of readiness, and/or other components within the analysis circuit 136. The threshold can increase or decrease based on the submitted claim or incident. Responsive to the interface system 804, the interface system 804 can record the incident data within the distributed ledger of the analysis circuit 136.

Figure 9:
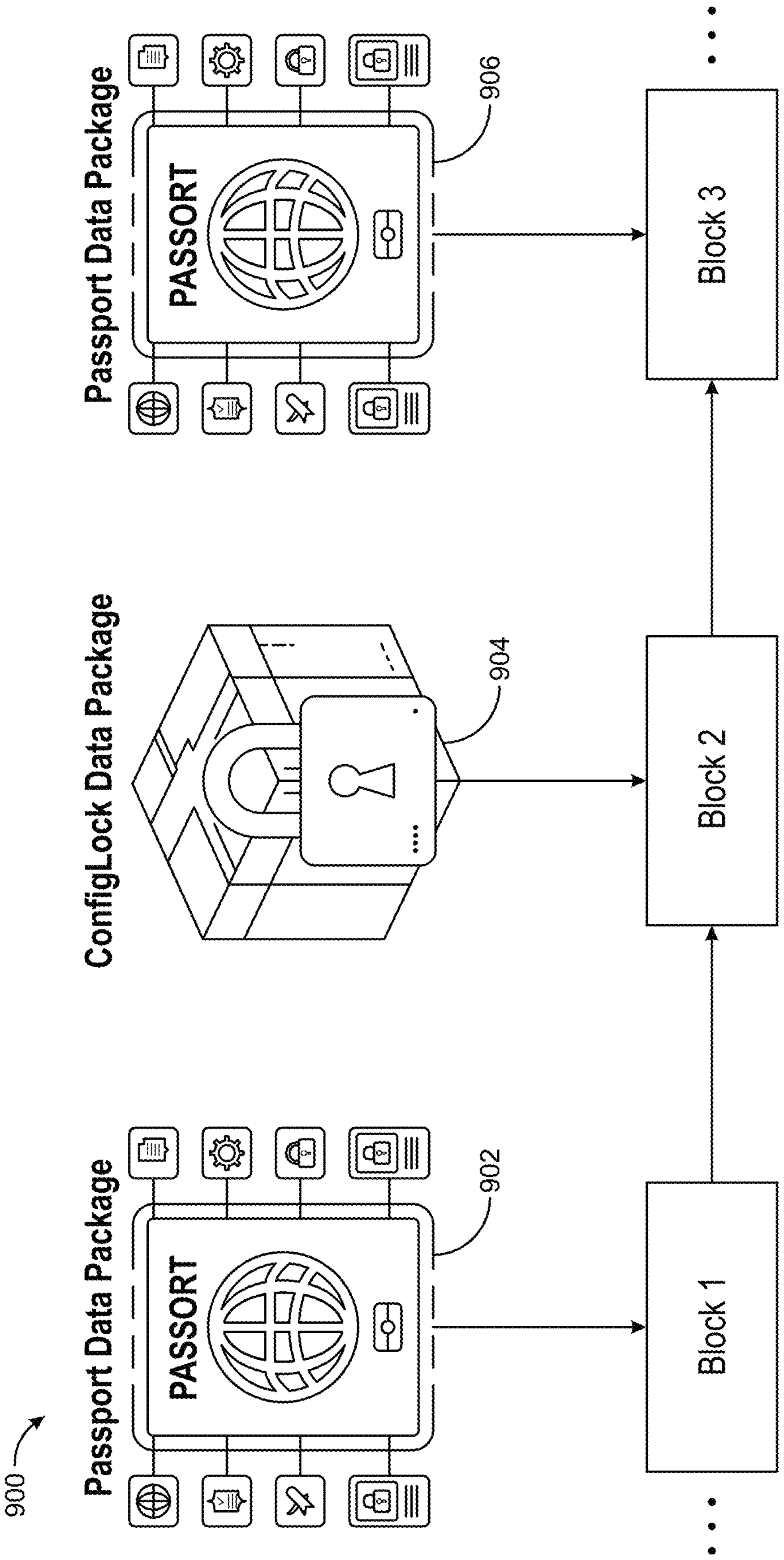
FIG. 9 depicts a block diagram of a system to analyze proof of performance of the plurality of entities to improve cybersecurity protections.

Referring now to FIG. 8 and FIG. 9, FIG. 9 depicts a block diagram 900 depicting a passport and controls (PC) system 806. The analysis circuit 136 can include the passport and controls (PC) system 806 and a modeler 808. The PC system 806 can include a passport data package 902 (e.g., first passport data package), a ConfigLock data package 904, and/or a second passport data package. In some implementations, the PC system 806 can generate a decentralized identity passport for at least one (e.g., each) entity in the plurality of entities. The decentralized identity passport can be located with the passport data package 902. The decentralized identity passport can be built from a distributed ledger and stored within a blockchain network, as shown in FIG. 9. At least one (e.g., each) decentralized identity passport can include a decentralized identifier such that at least one (e.g., each) identify passport is distinct.

In some implementations, the PC system 806 can attach or embed a plurality of proof of controls to the corresponding decentralized identity passport of one entity in the plurality of entities. The plurality of proof of controls can be based on one or more cybersecurity protection actions implemented by the entity. For example, a first entity can use mitigation strategies as a cybersecurity protection action, whereas a second company can use firewalls as a cybersecurity protection action.

The analysis circuit 136 of response system 130 of FIG. 8 can monitor environmental data of the third-party devices 150 (e.g., computing devices) of an entity. To monitor for environmental data, the analysis circuit 136 can detect interactions between an end-user and a computing device. The computing devices can be servers, laptops, tablets, phone, and/or the like associated with an entity of the decentralized identity passport. The interactions can reveal or indicate compliance corresponding to the cyber protections of the entity. For example, a first end-user can access a website blocked by a firewall on the computing device of then entity. The analysis circuit 136 can flag the interaction as out of compliance with the cyber security protection.

When the analysis circuit 136 flags an interaction, the entity can receive an indication that the entity is out of compliance with a cybersecurity parameter from the analysis circuit 136. The indication can be at least one of an alert, a notification, and/or a message. For example, after the analysis circuit 136 flags the interaction, the analysis circuit 136 can transmit the indication to the entity to notify the entity of the lack of compliance. The indication can include a recommendation to update the one or more cybersecurity protection actions. Updating the one or more cyber security protection actions can including updating the security tools 802 of the client device 110.

Each time an entity executes at least one proof control of the plurality of proof controls, the PC system 806 can embed the proof control within the decentralized identity passport. The proof control can indicate that the entity executed the one or more cyber security protection actions in response to a cyberthreat. For at least one (e.g., each) attached proof control, the PC system 806 can record or store the proof control within the data sources 160 or the distributed ledger. When on the distributed ledger, at least one (e.g., each) block corresponding to the attached proof control can link to the decentralized identity passport as one or more exchanges. In some implementations, the analysis circuit 136 can validate the one or more cyber security protections for at least one (e.g., each) entity. The database 140 can include a collection of cyber security protections for at least one (e.g., each) entity. The analysis circuit 136 can match the cybersecurity protection action with the stored cybersecurity action in the database 140 to validate the one or more cybersecurity protections. Upon validation of the one or more cybersecurity protections, the analysis circuit 136 can record the validation in the distributed ledger or within the data sources 160 as a new exchange linked to the decentralized identity passport.

The PC system 806 can identify a plurality of level 1 (L1) or first level configurations corresponding to at least one operational or security action performed on the plurality of client devices 110 of the entity. The L1 configurations can include at least one of network settings, security tool settings, access control lists, endpoint protection settings, and/or encryption keys. The L1 configurations can include system-level operations or security actions performed on the plurality of computing systems. In some implementations, the PC system 806 can include a plurality of level 2 (L2) configurations that include secondary or maintenance operations or security actions on the plurality of computing systems.

The PC system 806 can tokenize the plurality of L1 configurations within the ConfigLock data package 904. The ConfigLock data package 904 can include the plurality of L2 configurations. To tokenize the plurality of L1 configurations, the PC system 806 can digitize and represent the plurality of L1 configurations on a blockchain. The PC system 806 can execute one or more smart contracts to tokenize the L1 configurations. For example, the PC system 806 can execute a first smart contract to tokenize one or more L1 configurations and a second smart contract to tokenize one or more L2 configurations. Upon tokenizing the L1 configurations, the PC system 806 can store or record the L1 and L2 configurations on the distributed ledger or a data source 160 as shown in FIG. 9.

In some implementations, the PC system 806 can provide a recovery key to the entity. The recovery key can be configured to allow the recovery of the tokenized L1 configurations. In some implementations, the interface circuit 116 can receive the recovery key and provide the plurality of L1 configurations from the distributed ledger or data source 160. The interface circuit 116 can detokenize or decrypt the plurality of L1 configuration using the recovery key.

The modeler 808 can be an artificial intelligence (AI) or machine learning (ML) model designed to identify, detect, and/or respond to incidents, claims, and/or cyber threats. The modeler 808 can include a data collection layer to gather incident data from the interface system 804. The modeler 808 can include a preprocessing layer and a feature engineering layer. The modeler 808 can use a model training layer to train the modeler 808 to model the incident data by using one or more training data sets within the database 140. In some implementations, the modeler 808 can include a model evaluation layer to evaluate the trained model using one or more validation data sets within the database 140. In some implementations, the modeler 808 can execute heuristic analysis, pattern identification, anomaly identification, and/or threat projections.

In some implementations, the modeler 808 can generate verifiable credentials, designed to encapsulate and validate the cybersecurity efforts of entities. Utilizing statistical analysis and correlation techniques, the modeler 808 can analyze, correlate, and/or cross-reference datasets to identify patterns indicative of potential security threats or vulnerabilities. This process can employ algorithms capable of detecting anomalies in network traffic, unauthorized access attempts, and/or the presence of malicious software by comparing observed behaviors against established norms. For example, the modeler 808 can evaluate a security posture of an organization by analyzing both historical incident data and existing cybersecurity measures. This thorough assessment aids in the stratification of security priorities. The verifiable credentials generated as a result encapsulate the evaluated security posture, offering entities a means to demonstrably showcase their cybersecurity diligence to partners, regulators, and/or other stakeholders. Moreover, the modeler 808 can integrate domain-specific heuristic analysis to bolster its predictive analysis capabilities. This provides the generation of verifiable credentials that are broad in scope and also customized to address the unique threats pertinent to an entity operational domain. Additionally, the incorporation of regulatory compliance tracking into the modeler 808 analytical framework provides that the generated verifiable credentials also reflect adherence to legal and industry standards.

Using the modeler 808, the analysis circuit 136 can model the incident data to generate one or more verified intelligences corresponding to at least one cybersecurity threat. For example, the modeler 808 can model the incident data by generating a cyberthreat and transmit the generated cyberthreat to the analysis circuit 136. Responsive to receiving the generated cyberthreat, the analysis circuit 136 can use the generated cyberthreat to generate one or more verified intelligences to address the cyberthreat. The one or more verified intelligences can include at least one of threat indicators, vulnerability patches, and/or mitigation strategies corresponding to the at least one cybersecurity threat. In some implementations, the generated one or more verified intelligences can be a plurality of steps, a process, and/or a method to protect against the cyber threat.

The analysis circuit 136 can determine the one or more verified intelligences by using the generated cyberthreat. In some implementations, the one or more verified intelligences can correspond to at least one of firmographic data, identified security gaps, and/or existing protection guards. For example, the one or more verified intelligences can be based on firmographic data of the cyberthreat. In another example, the one or more verified intelligences can be based on identified security gaps of the cyberthreat. The firmographic data, the identified security gaps, and/or the existing protection guards can correspond to an entity profile of at least one (e.g., each) of the plurality of entities.

To determine the one or more verified intelligences, the analysis circuit 136 can monitor interactions between an end-user and the interface system 804. The interactions can reveal that the end-user executed intelligences stored within the database 140. For at least one (e.g., each) executed intelligence, the analysis circuit 136 can identify the verified intelligence if the executed intelligence corresponds to the cyberthreat. For example, an entity can execute a mitigation strategy to protect against a cyberthreat. The analysis circuit 136 can detect the mitigation strategy and determine or identify the mitigation strategy as verified intelligence.

The analysis circuit 136 can decode the one or more verified intelligences into entity data formats of one entity in the plurality of entities. In this manner, the analysis circuit 136 can automatically generate the one or more verified intelligences in a format of one entity. For example, a first entity can use seven verified intelligences, whereas a second entity can use eight verified intelligences. At least one (e.g., each) of the verified intelligences for the first entity and at least one (e.g., each) of the verified intelligences for the second entity can differ based on the protections of the first entity and the second entity.

During the decoding of the one or more verified intelligences, the analysis circuit 136 can translate the one or more verified intelligences into formats compatible with the security tool 802. The format can define the configuration for the security tool 802. For example, the format can be an API in the programming language of the security tool 802. The format for a first entity can differ from the format for a second entity such that the security tools 802 of at least one (e.g., each) entity are not the same.

The analysis circuit 136 can configure or reconfigure the security tool 802 of the respective entity. The analysis circuit 136 can transmit a configuration to the security tool 802 to modify, adjust, and/or change the API of the security tool. The configuration can allow the security tool 802 to protect the entity again the cyberthreat. In some implementations, the analysis circuit 136 can transmit a subsequent configuration that can include the first configuration. The subsequent configuration can update the security tool 802 to protect against a subsequent cyberthreat and the first cyber threat. In this manner, the analysis circuit 136 can continuously update at least one (e.g., each) security tool 802 from at least one (e.g., each) entity to protect the respective entity from the cyberthreat.

Still referring to FIGS. 8-11, the modeler 808 can be configured to generate a decentralized identity passport (e.g., passport data package 902 and 906) for at least one (e.g., each) entity (or sub-entity, such as group or subsidiary of an entity or company). The generation by the modeler 808 can include collecting and integrating cybersecurity-related actions and measures performed and executed by these entities into their respective identity passports. These actions can be encapsulated in proofs of control, which demonstrate the adherence of the entity to prescribed cybersecurity practices and measures. Once generated, these proofs are linked with the decentralized identity passport of the entity and recorded on a distributed ledger or data source. Accordingly, the cybersecurity action by an entity can be transparently and immutably documented.

Upon attaching or embedding the proofs of control to the decentralized identity passports, the modeler 808 can validate the cybersecurity measures for at least one (e.g., each) entity. This validation process determines the efficacy and adherence of the implemented cybersecurity actions against established benchmarks or standards. After successful validation, the modeler 808 can record this validation as a new exchange on the distributed ledger or data source, linked to the decentralized identity passport. This recorded validation acts as a verifiable badge of cybersecurity compliance, enhancing the credibility and trustworthiness of the entity within a digital ecosystem. Continuously monitoring environmental data across computing systems of the registered entities, the modeler 808 can uphold one or more cybersecurity standards. This monitoring can be used to identify deviations or non-compliance with cybersecurity parameters. In response to any detected discrepancies, the modeler 808 can issue alerts to the entities involved, advising them on updating their cybersecurity measures.

In some implementations, the modeler 808 can identify a plurality of first-level configurations corresponding to operational or security actions performed on computing systems of an entity. The modeler 808 can encrypt or tokenize these configurations and record them on a distributed ledger or data source. For example, the modeler might encrypt network settings adjustments made to enhance security, such that such changes are securely documented and verifiable. That is, the verifiable configurations can be stored in a ConfigLock data package 904. For example, ConfigLock data package 904 can be encrypted and compartmentalized into segments, at least one (e.g., each) representing different dimensions or areas of the cybersecurity framework of the entity, such as network configurations, access controls, and/or endpoint security settings. Furthermore, the ConfigLock data package 904 can then be indexed and timestamped. This process verifies that changes to configurations are auditable and resistant to tampering.

In some implementations, the modeler 808 can provide a recovery key to the entity, allowing for the recovery of encrypted or tokenized first-level configurations. For example, a client device 110 (particularly the security tool 802) can use the recovery key to receive the first-level configurations from the distributed ledger based on decrypting or detokenizing with the recovery key by the modeler 808. The modeler 808 can regenerate the recovery key upon detecting a potential compromise or at predefined intervals. For example, in the case of a security breach, the modeler 808 can regenerate the recovery key to maintain the integrity of the stored configurations.

In some implementations, the configurations of the plurality of first-level configurations can be system-level operations or security actions, while a plurality of second-level configurations pertain to secondary or maintenance operations. For example, the modeler differentiates between the application of a security patch (first-level) and routine software updates (second-level), such that at least one (e.g., each) is appropriately categorized and documented. In some implementations, the first-level configurations include network settings, security tool settings, access control lists, endpoint protection settings, and/or encryption keys. For example, the modeler 808 can record changes to firewall rules or the deployment of new antivirus definitions, capturing data for security management.

In some implementations, the configurations can be a level of configuration such as, cryptographic proof of provenance (e.g., Level 4 or L4), with subsequent levels corresponding to validations (e.g., Level 3 or L3), documented evidence of actions (e.g., Level 2 or L2), and/or commitments made by the entity (e.g., Level 1 or L1). For example, the modeler 808 can verify provenance of the new encryption key through digital signatures, then document its deployment across the network as an action taken. It should be understood the various levels of configuration are described herein but should not be limited to hierarchical categorizations, as configurations can also be interdependent or require cross-validation for security assessments. In particular, the flexibility of the modeler 808 allows for dynamic adaptation to emerging security challenges and technological advancements, verifying that the modeler 808 remains effective in a rapidly evolving cybersecurity landscape.

In some implementations, the highest or best configuration level can be for cryptographic proof of provenance obtained by the modeler 808 from the entity and programmatically. For example, the modeler 808 can derive and encode the cryptographic proof of provenance for software updates from development logs and code repositories, such that that verified updates are applied to the systems of the entity. In another example, the modeler 808 can programmatically attest to the integrity of third-party components by validating their cryptographic signatures against trusted certificate authorities, bolstering supply chain security.

In some implementations, the second highest or second best configuration level can be validation by one or more authorized entities. For example, validation can include cross-referencing the digital signatures of installed applications with a database of verified publishers to confirm authenticity. In another example, validation might include checking the conformity of network configuration changes against industry-standard security protocols, verifying that the network of the entity remains resilient against known vulnerabilities.

In some implementations, the third highest or third best configuration level can be documented evidence of an action. For example, documented evidence can include logging the sequence of steps taken to apply a security patch, complete with timestamps and system snapshots. In another example, it might involve retaining change logs that include the rationale and implementation data of new access control policies, providing a clear audit trail for security audits.

In some implementations, the fourth highest or fourth best configuration level can be commitments made by the entity. For example, commitments made by the entity can be encapsulated in a policy document that outlines the approach to data encryption of the entity, specifying the algorithms and key management practices to be adhered to. In another example, commitments might be demonstrated through the publication of a regular security newsletter that includes the ongoing efforts of the entity to maintain and enhance its cybersecurity posture, fostering transparency and accountability.

In some implementations, the identifying process includes acquiring and verifying cryptographic proof of provenance based on digital signatures and transaction records. For example, the modeler 808 can use digital signatures to confirm the authenticity of a newly implemented access control list before recording it. In some implementations, the modeler 808 updates second, third, and/or fourth-level configurations in response to updates in operational or security actions. For example, if an entity revises its data retention policy, the modeler 808 can update the relevant configurations to reflect this change, such that the ledger remains current and accurate.

In some implementations, the passport and controls (PC) system 806 can prepare and report cyber incidents according to various governmental regulations. In some implementations, the PC system 806 can determine when a cyber incident is substantial based on a government regulation, which can range from significant losses in the confidentiality, integrity, and/or availability of information systems, to serious impacts on operational safety, disruptions in business activities, and/or unauthorized access stemming from third-party compromises. Upon identifying such incidents, the PC system 806 can gather a set of data for reporting. This data collection can encompass correspondence with threat actors, indicators of compromise, relevant log entries, forensic artifacts, network data, and/or information on how the threat actor compromised the system, among others. Additionally, the PC system 806 can track and document data related to any ransom payments, including the amount, the decision process, and/or the aftermath of the payment.

For example, a substantial cyber incident can lead to one or more of the following: a substantial loss of confidentiality, integrity or availability of an information system or network of a covered entity, a serious impact on the safety and resiliency of an operational systems and processes of a covered entity, a disruption of an ability to engage in business or industrial operations of a covered entity, and/or deliver goods or services, unauthorized access to an information system or network of a covered entity, and/or any nonpublic information included therein, that is facilitated through or caused by a: compromise of a cloud service provider, managed service provider, and/or other third-party data hosting provider; or supply chain compromise.

Furthermore, in some implementations, the PC system 806 can also be configured to manage and submit follow-up reports dynamically. This can include generating supplemental reports when new or different information about a cyber incident becomes available or if additional ransom payments are made. Thus, the PC system 806 can provide relevant data such that it is accurately preserved and maintained for a minimum period (e.g., set at two years), following the submission of the most recent report. This data preservation can include the initial detection of a compromise to the full resolution and analysis of the incident, including any payments made and the identification of exploited vulnerabilities.

In some implementations, the operational framework of the PC system 806 aligns with timely and incident reporting and data preservation to assist organizations in maintaining compliance with regulatory requirements. By automating the process of collecting, preserving, and/or reporting information about cyber incidents and ransom payments, the PC system 806 reduces manual effort and enhances the accuracy of the information reported. This approach can be used to fulfil legal and regulatory obligations and strengthen the overall cybersecurity posture of organizations by providing a structured response to incidents and facilitating continuous improvement through incident analysis and feedback.

In some implementations, the preservation requirement of the PC system 806 can include correspondence with the threat actor, regardless of the forum or method; indicators of compromise; relevant log entries; relevant forensic artifacts; network data; data and information that can help identify how a threat actor compromised or potentially compromised an information system; system information that can help identify exploited vulnerabilities; information about exfiltrated data; data or records related to the disbursement or payment of any ransom payment; and any forensic or other reports concerning the incident, whether internal or prepared for the covered entity by a cybersecurity company or other third-party vendor.

Verified Intelligence

Figure 10:
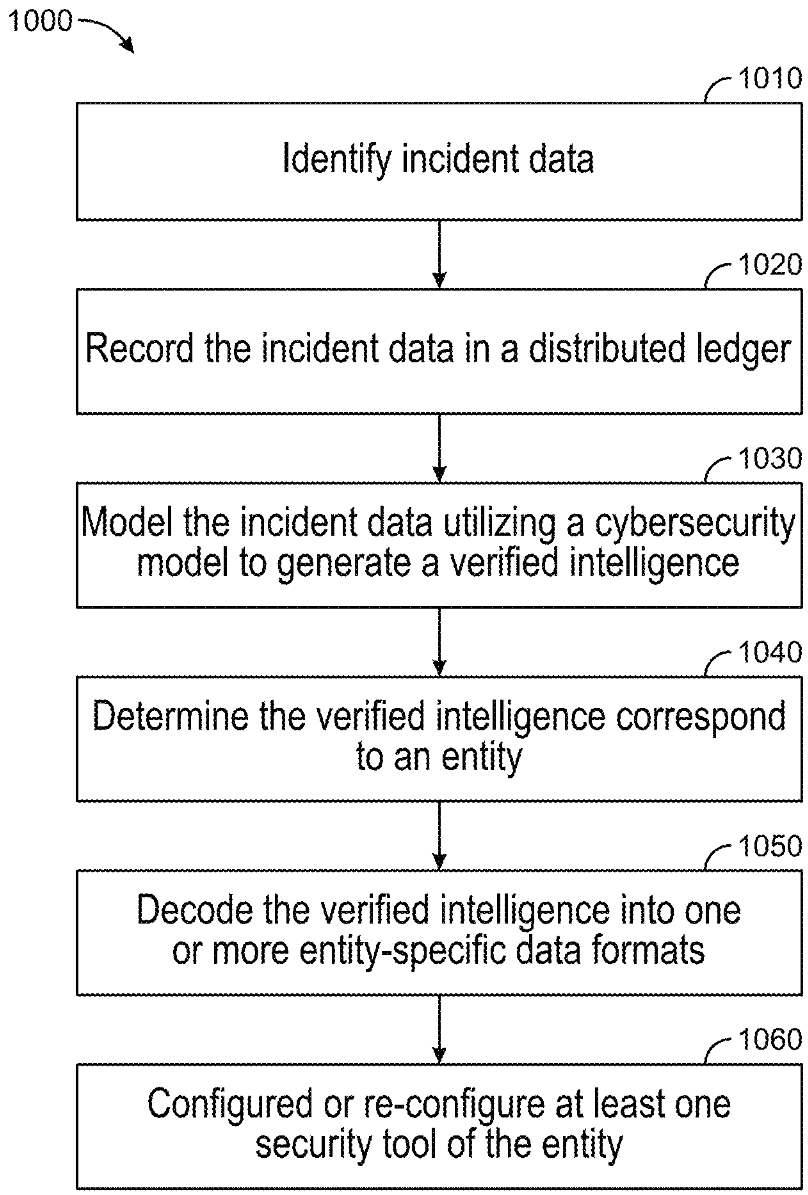
FIG. 10 depicts a flowchart of a method for improving cybersecurity protections across the plurality of entities, according to some implementations.

FIG. 10 depicts a flowchart of a method 1000 for improving cybersecurity protections across the plurality of entities. At least the computing/security architecture shown and described regarding FIG. 8 can perform method 1000 according to present implementations.

In a broad overview of method 1000, at block 1010, the one or more processing circuits (e.g., response system 130 of FIG. 8) can identify incident data. At block 1020, the one or more processing circuits can record incident data in a distributed ledger. At block 1030, the one or more processing circuits can model the incident data utilizing a cybersecurity model to generate a verified intelligence. At block 1040, the one or more processing circuits can determine the verified intelligence correspond to an entity. At block 1050, the one or more processing circuits can decode the verified intelligence into one or more entity-specific data formats. At block 1060, the one or more processing circuits can configure or re-configure at least one security tool of the entity. In some implementations, some, and/or all operations of method 1000 can be performed by one or more processors executing on one or more computing devices, systems, and/or servers. In various implementations, at least one (e.g., each) operation can be re-ordered, added, removed, and/or repeated.

At block 1010, the processing circuits identify or collect incident data corresponding with a cybersecurity incident. In some implementations, the processing circuits can scan network traffic and log files for abnormal patterns. For example, identifying can include parsing security logs for unauthorized access attempts. In another example, collecting can include aggregating data from intrusion detection systems. Furthermore, the cybersecurity incident can include a detected breach or unauthorized data access attempt.

At block 1020, the processing circuits record the incident data in a distributed ledger or data source. In some implementations, the processing circuits can record the incident data in the distributed ledger (e.g., WEB3 data source) by encrypting and hashing the data to provide integrity and confidentiality. For example, the process can include generating a unique cryptographic hash for at least one (e.g., each) incident record. In some implementations, the processing circuits can record the incident data in the data source (e.g., WEB2 data source) by structuring the data into predefined formats for consistency and easy retrieval. For example, the data can be formatted according to JSON or XML schemas. Furthermore, recording can include timestamping at least one (e.g., each) incident entry to establish a chronological order of events.

At block 1030, the processing circuits can analyze the incident data utilizing a cybersecurity model to generate one or more verified intelligences corresponding to at least one cybersecurity threat. In some implementations, the cybersecurity model includes at least one of heuristic analysis, pattern identification, anomaly identification, and/or threat projections. For example, the processing circuits can apply machine learning techniques to the incident data to identify patterns indicative of types of cyber threats. For example, heuristic analysis can be employed to compare incident data against known threat signatures. In another example, anomaly detection algorithms might identify deviations from baseline network behavior as potential threats. In yet another example, threat projections can be generated by extrapolating current data trends. The cybersecurity model can be executed by processing circuits in response to the cybersecurity incident. That is, the model can dynamically adjust its parameters based on the nature and severity of the incident. For example, the model can prioritize incident data indicating a zero-day vulnerability.

In some implementations, the one or more verified intelligences include at least one of threat indicators, vulnerability patches, and/or mitigation strategies corresponding to the at least one cybersecurity threat. For example, the verified intelligence might include a digital signature of a malware file for antivirus software to block. In another example, it can recommend configuration changes to firewall rules to prevent similar incidents. Additionally, the firmographic data, the identified security gaps, and/or the existing protection guards can correspond to an entity profile of at least one (e.g., each) of the plurality of entities. In some implementations, an entity profile can include the technological infrastructure and software dependencies of an entity. For example, it can list network endpoints and their respective security statuses. Furthermore, the verified intelligences can guide the refinement of entity-specific cybersecurity measures. For example, they might suggest enhancements to encryption practices based on identified vulnerabilities.

At block 1040, the processing circuits can determine the one or more verified intelligences corresponds to at least one of the plurality of entities based on at least one of firmographic data, identified security gaps, and/or existing protection guards. In some implementations, the generated verifiable intelligence can be cross-referenced and analyzed against entity data to determine, for example, if the cybersecurity threat is exploitable or can present a cyber vulnerability to one or more entities. For example, matching the threat indicators to network architectures or operating systems prevalent within the target entities. In another example, correlating vulnerability patches to software versions identified in the firmographic data of entities. That is, the processing circuits can use incident data collected during the claims process with a distributed ledger and automation to automatically determine the correct verified intelligence for the correct businesses, based on firmographic, gaps, and/or safeguard matching, with technology translated and usable data that can auto-change configurations of security tools to defend against these verified relevant threats. For example, automation to automatically determine can include analyzing historical breach data against current entity profiles to predict susceptibility. That is, determining the correct business includes evaluating entity-specific IT environments against the threat model to verify relevance. For example, comparing the unique digital footprint of at least one (e.g., each) entity against the incident pattern to identify potential targets.

In some implementations, the firmographics of the entity can include, but is not limited to, industry sector, size, geographical location, and/or technology stack. For example, the verified intelligence can be determined for an entity using the firmographics when matching industry-specific threats to entities within the same sector. Additionally, the gaps of the entity can include, but is not limited to, outdated software, missing patches, and/or weak encryption protocols. For example, the verified intelligence can be determined for an entity using the gaps when identifying entities running software versions vulnerable to a newly discovered exploit. Furthermore, the safeguards of the entity can include, but is not limited to, firewalls, antivirus software, and/or intrusion detection systems. For example, the verified intelligence can be determined for an entity using the safeguard when matching mitigation strategies to existing security infrastructure. Accordingly, the various data of the entity can be matched to the verified intelligence to customize cybersecurity advice and action plans, such that recommendations are actionable and address the security gaps of the entity.

At blocks 1050 and 1060, the processing circuits can decode the one or more verified intelligences into one or more entity-specific data formats of the at least one of the plurality of entities and configure or re-configure at least one security tool of the at least one of the plurality of entities. For example, configuration or re-configuration can include protecting the at least one of the plurality of entities from the at least one cybersecurity threat. Additionally, decoding into the one or more entity-specific data formats can include translating the one or more verified intelligences into formats compatible with the at least one security tool of the at least one of the plurality of entities. For example, decoding can include converting threat indicators into firewall rule updates to block malicious IP addresses. In another example, decoding can include translating vulnerability patches into update commands for antivirus software. That is, decoding transforms threat data into actionable security measures tailored to at least one (e.g., each) system and protection tool of the entity.

In some implementations, configuring the security tool of an entity can include setting up intrusion detection systems to monitor for patterns of malicious activity identified in the verified intelligence. For example, adjusting sensitivity levels of the detection algorithms based on the severity of the threat. In another example, configuring can include updating access control lists to restrict traffic from suspect sources. In some implementations, re-configuring the security tool of an entity can include modifying existing firewall rules to address new vulnerabilities revealed by the verified intelligence. For example, adding or removing rules to better protect against the identified threats.

In some implementations, the processing circuits can automatically generate and apply patches or updates to the at least one security tool. Generating can include creating custom patches for proprietary software based on the vulnerabilities identified. For example, compiling code changes that neutralize a newly discovered exploit. In some implementations, applying the patches or updates can include remotely pushing updates to endpoint protection tools across the network of the entity. For example, automating the deployment of patches during off-peak hours to reduce disruption. That is, the security tool can be kept up-to-date with the latest defenses against emerging threats, verifying that devices and software within the network of the entity are equipped with the latest protective measures.

Passport Data Package

In some implementations, method 1000 can further include a method for generating passport data packages (e.g., passport data package 902 and 906 of FIG. 9) with decentralized proof of controls attached for the entities proof of performance. It should be understood that the generation of passport data packages described with reference to method 1000 can be executed and completed independently of method 1000. For ease of understanding, the generation of passport data packages will be referred to in steps.

Generally, the passport data package can be a digitally encrypted file encapsulating the identity of the entity and its cybersecurity practices. For example, the passport data package can include embedded digital certificates and cryptographic proofs. Furthermore, the passport data package can be used as a verifiable credential for demonstrating compliance with cybersecurity standards and practices to partners and regulators.

In some implementations, at step 1, the processing circuit can generate a decentralized identity passport for at least one (e.g., each) of a plurality of entities. Generation can include compiling a record of the cybersecurity protocols of the entity and identity verification documents. For example, incorporating business registration documents and cybersecurity policy documents into the passport. Alternatively or in combination, generation can include digitally signing the compiled documents to provide authenticity and integrity. For example, using SHA-256 for hashing and RSA for digital signatures. In some implementations, generating the decentralized identity passport includes using a public-private key pair unique to at least one (e.g., each) entity of the plurality of entities. For example, the public key can be recorded on the distributed ledger and the private key remains confidential to the entity.

At step 2 of the generation of the passport data package, the processing circuits can attach or embed a plurality of proof of controls to the decentralized identify passport of an entity of the plurality of entities, the plurality of proof of controls corresponding to one or more cybersecurity protection actions implemented by the entity. In some implementations, attaching can include digitally linking cybersecurity protection actions documentation to the passport. For example, appending metadata of security audits and certifications to the passport. Furthermore, the processing circuits can sign the plurality of proof of controls using a digital signature scheme before attaching the plurality of proof of controls to the decentralized identity passport. For example, employing ECDSA for digital signatures. In some implementations, embedding can include integrating QR codes or unique identifiers that link to proofs of control hosted securely online. For example, QR codes that direct to encrypted online repositories including audit logs. The cybersecurity protection actions can include network encryption enhancements and multi-factor authentication implementation. That is, the entity can demonstrate compliance with industry security standards. Furthermore, the proofs of control are verified and timestamped.

In some implementations, the processing circuits can validate the one or more cybersecurity protections of at least one (e.g., each) of the plurality of entities and record the validation on the distributed ledger or data source as a new exchange linked to the decentralized identity passport. That is, validating the one or more cybersecurity protections can include comparing the one or more cybersecurity protection actions to a predefined set of security standards or benchmarks. In some implementations, the predefined set of security standards or benchmarks can include ISO/IEC 27001 and NIST cybersecurity frameworks. For example, comparing cybersecurity measures of the entity against these frameworks to facilitate compliance. In some implementations, recording can include encrypting and hashing the validation data before storage. For example, using blockchain technology to immutably store the validation results. That is, the new exchange linked to the decentralized identity passport can include a timestamped record of the validation, along with references to the standards or benchmarks used for validation. For example, a blockchain transaction including validation metadata and outcomes.

At step 3 of the generation of the passport data package, the processing circuits can record the plurality of proof of controls on a distributed ledger or data source as one or more exchanges linked to the decentralized identity passport. In some implementations, recording the proof of controls on the distributed ledger can include creating a smart contract for at least one (e.g., each) proof of control, providing traceability and non-repudiation. For example, deploying smart contracts on Ethereum to represent at least one (e.g., each) proof of control. In some implementations, recording the proof of controls on the data sources can include utilizing secure cloud storage services with access control lists tailored for privacy and security. For example, storing proofs of control in buckets with encrypted data transfer. Additionally, linking to the decentralized identity passport can include assigning a unique identifier to at least one (e.g., each) proof of control that corresponds to the passport digital identity. For example, using UUIDs to link proofs of control to the passport within the distributed ledger. In another example, creating hyperlinks within the passport document that lead to the recorded proofs of control on the ledger.

In some implementations, the processing circuits can monitor environmental data of a plurality of computing systems of the plurality of entities with the decentralized identity passport. For example, utilizing network monitoring tools to detect and record changes in firewall settings or antivirus software updates. That is, the decentralized identity passport can be used by the processing circuits to authenticate and authorize access to monitored data. For example, the environmental data can correspond to the decentralized identity passport by mapping network traffic patterns and system performance metrics to the passport unique identifier. The environmental data monitored can include at least one, but is not limited to, network traffic, system performance metrics, software integrity, and/or security event logs corresponding with the plurality of computing systems. For example, monitoring can include analyzing logs for indicators of compromise or unauthorized access attempts.

In some implementations, in response to determining at least one of the plurality of entities out of compliance with a cybersecurity parameter, the processing circuits can issue an alert to at least one of the plurality of entities including a recommendation to update the one or more cybersecurity protection actions. In some implementations, the alert can specify the non-compliance issue and provide steps for remediation. Furthermore, the recommendation can include best practices for updating security protocols or installing software patches. For example, the recommendation can be generated based on real-time threat intelligence and tailored to the infrastructure of the entity and previously recorded cybersecurity actions.

In some implementations, the processing circuits can update the decentralized identity passport to include additional proof of controls based on successful validation of a newly implemented cybersecurity protection actions by the entity of the plurality of entities. In some implementations, an update to the decentralized identity passport can include appending new proofs of control and re-validating the overall security status of the passport. For example, adding digital records of recently passed security audits or newly implemented security measures. Additionally, the additional proof of controls can be determined by assessing the impact and effectiveness of the newly implemented measures. For example, successful validation of a newly implemented cybersecurity protection actions by the entity of the plurality of entities can include conducting a thorough review of the updated security protocols, supported by external audit findings and internal performance metrics. In another example, updating the cybersecurity profile of the entity within the passport to reflect the latest security posture and compliance status.

In some implementations, the passport data package can serve as a dynamic, verifiable credential for entities to demonstrate their cybersecurity posture and compliance with relevant standards. Entities can present the passport data package, which includes digital certificates, cryptographic proofs, and/or a record of cybersecurity controls, to partners, regulators, and/or clients. Upon presentation, the recipient can verify the authenticity and integrity of the passport using public keys recorded on a distributed ledger, such that the digital signatures and cryptographic hashes match the reported cybersecurity measures of the entity. Verification can involve checking the digital signatures against the public keys such that the cryptographic proofs align with the stated security controls and actions. This process can be facilitated by software or digital platforms capable of reading and validating the contents of the passport data package, such that the entity adheres to the claimed security practices and standards. Such verification can support trust in digital transactions, facilitate secure partnerships, and/or streamline compliance audits by providing a transparent, immutable record of cybersecurity efforts of the entity.

ConfigLock Data Package

In some implementations, method 1000 can further include a method for generating ConfigLock data packages (e.g., ConfigLock data package 904 of FIG. 9) to store configs decentralized to recover, for example during an incident affecting the entities computing structure or network. It should be understood that the generation of ConfigLock data packages described with reference to method 1000 can be executed and completed independently of method 1000. For ease of understanding, the generation of ConfigLock data packages will be referred to in steps.

Generally, the ConfigLock data package can be a secure, encrypted container for storing various configuration settings and proofs of compliance. For example, the ConfigLock data package can include embedded digital signatures and cryptographic hashes to verify the integrity and authenticity of the data. Furthermore, the ConfigLock data package can be used as a means to quickly restore system configurations to a known secure state in the event of a cybersecurity incident, facilitating rapid recovery and minimizing downtime.

In some implementations, at step 1, the processing circuit can identify a plurality of first level configurations corresponding to at least one of an operational or security action performed on the plurality of computing systems of an entity of a plurality of entities. Identifying can include scanning and analyzing system logs and configuration files for changes. For example, an operational action can be an update to server software. In another example, a security action can be the application of a new firewall rule.

In some implementations, identifying of step 1 can include (1) accessing one or more data channels of a plurality of computing systems of an entity of a plurality of entities, (2) identifying, by the one or more processing circuits, at least one of an operational or security action performed on the plurality of computing systems of the entity of the plurality of entities, and/or (3) modelling the at least one of an operational or security action using a cryptographic proof of provenance model to generate a plurality of first level configurations. Specifically, accessing can include connecting to system and application logs, network traffic analyses, and/or security event management systems. For example, aggregating data from endpoint detection and response (EDR) systems and security information and event management (SIEM) solutions. Additionally, identifying the operation or security action can include parsing and categorizing event logs based on predefined criteria. For example, classifying actions as routine maintenance or security enhancements or verifying the cryptographic proof of provenance based on one or more digital signatures. Furthermore, modeling can include applying algorithmic analysis to establish the chronological sequence and interdependencies of actions. That is, employing data science techniques to discern patterns that validate the authenticity and integrity of the actions. For example, utilizing blockchain technology to create an immutable record of configurations. In another example, applying machine learning models to predict the impact of configuration changes on system security. In some implementations, the cryptographic proof of provenance model can be a heuristic algorithm or artificial intelligence model that evaluates the reliability and security implications of at least one (e.g., each) action. For example, assessing the compatibility of new software updates with existing security protocols. In some implementations, the cryptographic proof of provenance model can be a statistical analysis algorithm configured to identify outliers in configuration changes that can indicate unauthorized or malicious alterations. In some implementations, the cryptographic proof of provenance model can be a cybersecurity analysis algorithm configured to assess the efficacy of new security configurations against emerging threat vectors. For example, simulating attack scenarios to evaluate the resilience of firewall settings.

In some implementations, a first level configuration can be system-level operations or security actions performed on the plurality of computing systems, and/or a second level configurations can be secondary or maintenance operations or security actions on the plurality of computing systems. For example, a first level configuration can be the implementation of a new network encryption protocol. That is, the first level configurations can include at least one of network settings, security tool settings, access control lists, endpoint protection settings, and/or encryption keys. In another example, a second level configuration can pertain to the scheduling of regular system backups. Accordingly, the configurations can provide security and operational efficiency across the computing systems of the entity.

Alternatively or in combination, the configurations can be hierarchical according to the type of proof provided by the entity. For example, a first level configuration can be cryptographic proof of provenance obtained by the one or more processing circuits from the entity and programmatically. In this example, the proof of provenance might verify the source and integrity of a new software application before installation. Additionally, a second level configuration can be a validation by one or more authorized entities, for example, through third-party security audits. Furthermore, a third level configuration can be documented evidence of an action, for example, logs showing the successful application of a security patch. Moreover, a fourth level configuration can be commitments made by the entity, for example, a pledge to adhere to data protection standards. Generally, the processing circuits can prioritize or weigh the first level or better level configurations to emphasize their importance in maintaining system integrity. That is, configurations at higher levels can receive more scrutiny during the verification process.

In some implementations, the processing circuits can verify the cryptographic proof of provenance based on one or more digital signatures and transaction records stored within the distributed ledger or data source. For example, verifying the digital signature of a software update to confirm its authenticity. Furthermore, the processing circuits can generate the cryptographic proof of provenance for the plurality of first level configurations. That is, the generation can include creating a secure hash of the software package. For example, using SHA-256 to verify the integrity of the configuration data.

In some implementations, the processing circuits can update at least one of the plurality of second level configurations, the plurality of third level configurations, and/or the plurality of fourth level configurations, in response to an update in the operational or security action performed on the plurality of computing systems of the entity. For example, adjusting firewall settings in response to new threat intelligence. In another example, updating access control lists to restrict access to sensitive data following a policy change. That is, updates can include the recalibration of security measures to align with the latest security landscape and entity policies.

At step 2 of the generation of the ConfigLock data package, the processing circuits can encrypt or tokenize the plurality of first level configurations. In some implementations, encrypting can include using AES-256 to secure configuration data against unauthorized access. For example, encrypting network configuration settings to prevent tampering. In some implementations, tokenizing can include converting configuration settings into tokens stored on the blockchain, providing confidentiality and integrity. For example, representing access control settings as tokens. Accordingly, the ConfigLock data package can be securely stored and readily accessible by entities possessing the correct decryption or detokenization keys.

At step 3 of the generation of the ConfigLock data package, the processing circuits can record the plurality of first level configurations on the distributed ledger or data source. For example, recording the configurations on a distributed ledger can include hashing at least one (e.g., each) configuration setting and storing it on a blockchain to provide tamper-proof records. In another example, recording the configurations on a data source can include saving them in a secure, encrypted database with restricted access.

In some implementations, the processing circuits can provide a recovery key to the entity. For example, the recovery key can be configured to allow the recovery of the encrypted or tokenized plurality of first level configurations by the entity. That is, the recovery key can facilitate secure and controlled access to the stored configurations. For example, a recovery key can be generated by the processing circuits by employing a secure key generation algorithm. For example, using RSA encryption to create a unique recovery key for at least one (e.g., each) entity. In another example, distributing the recovery key to authorized personnel through a secure channel.

In response to receiving the recovery key, the processing circuits can provide the plurality of first level configurations from the distributed ledger or data source based on decrypting or detokenizing the plurality of first level configurations using the recovery key. In some implementations, providing or transmitting the configurations can include securely sending the decrypted or detokenized configurations over a secure communication channel. For example, using TLS to protect the transmission of configuration data. That is, the configurations allow the entity to restore its systems to a secure state following an incident. In some implementations, the processing circuits can regenerate the recovery key based on a detection of a potential compromise or at predefined intervals. For example, automatically updating the recovery key annually or following the detection of a security breach. In another example, implementing a multi-factor authentication process for recovery key regeneration to enhance security.

In some implementations, to restore from a ConfigLock data package, the entity can first authenticate using a predetermined recovery key to access the encrypted package. Upon successful authentication, the entity can decrypt the package, which includes serialized configuration settings, digital signatures, and/or cryptographic hashes of the original state of system configurations. These configurations can include network settings, firewall rules, access control lists, and/or software version information. The restoration process can include deserializing the configuration data and programmatically applying it to the respective systems and devices, such that at least one (e.g., each) component is reverted to its verified secure state. This process can include automated scripts or configuration management tools that validate at least one (e.g., each) integrity of a setting using the included cryptographic hashes before applying them, such that the restoration does not inadvertently introduce vulnerabilities.

In some implementations, an NFT can be minted for at least one (e.g., each) Passport Data Package or ConfigLock Data Package, encapsulating a unique digital representation of a cybersecurity credentials or configuration settings of an entity. The minting process can include the processing circuits generating a digital hash of the package contents, including digital certificates, cryptographic proofs, and/or configuration data, and/or embedding this hash within the NFT. Following the minting, the processing circuits can record the NFT on a distributed ledger, assigning a unique identifier to at least one (e.g., each) NFT that correlates with the respective Passport or ConfigLock Data Package. Furthermore, the processing circuits facilitate the verification of the NFT by external parties, allowing for the authentication of the encapsulated data against the blockchain to confirm its validity and integrity. This mechanism facilitates entities to prove compliance with cybersecurity standards and the secure status of their system configurations in a decentralized, tamper-proof manner. Accordingly, by integrating NFT technology with the method 1000 framework and leveraging insights from FIG. 11, the processing circuits can utilize blockchain to enhance cybersecurity management.

In some implementations, generative AI can be employed in creating and validating both Passport Data Packages and ConfigLock Data Packages within the framework of method 1000. Initially, generative AI can automate the compilation of cybersecurity protocols and identity verification documents of an entity. This automation can include parsing through databases to extract relevant information, synthesizing cybersecurity policy documents, and/or integrating business registration documents. Furthermore, generative AI can assist in digitally signing these compiled documents, employing cryptographic algorithms to verify their authenticity and integrity. During the second steps, generative AI can be used in attaching or embedding a plurality of proof of controls to the decentralized identity passport. The generative AI can analyze the cybersecurity protection actions implemented by the entity, generating metadata for at least one (e.g., each) action. This metadata can then be digitally linked to the passport or embedded as QR codes or unique identifiers, directing to encrypted online repositories including audit logs and certifications. Moreover, generative AI can optimize the digital signature process, selecting a secure and efficient digital signature scheme based on the latest advancements in cryptographic technology. The AI can also dynamically update these proofs of control based on new cybersecurity actions or validations, such that the passport data package remains current and reflective of the compliance status of an entity. In validating the cybersecurity protections of entities, generative AI can compare the documented cybersecurity protection actions against a predefined set of security standards or benchmarks, such as ISO/IEC 27001 and NIST frameworks. This can include an analysis of the cybersecurity measures of an entity, utilizing machine learning algorithms to identify discrepancies or areas of non-compliance. Following validation, GAI can automate the recording of this data on a distributed ledger or data source, encrypting and hashing the validation results for security.

To safeguard the integrity and confidentiality of Passport Data Packages and ConfigLock Data Packages against potential future quantum computing threats, the processing circuits can implement quantum-resistant cryptographic algorithms. These algorithms can be designed to withstand the decryption capabilities of quantum computers, using digital signatures, cryptographic proofs, and/or the encryption of data to maintain security. By incorporating post-quantum cryptography into the encryption process, the processing circuits secure the data against advanced computational attacks, maintaining the long-term viability and security of the stored information. The processing circuits can also integrate decentralized identity verification mechanisms to enhance the security and efficiency of verifying Passport Data Packages. Utilizing blockchain technology, this approach can be used by entities to prove their identity and the authenticity of their digital credentials autonomously, without centralized verification authorities. Through this mechanism, the processing circuits facilitate a secure, privacy-preserving method of identity verification, allowing entities to manage their digital identities and associated proofs of control on a blockchain. In some implementations, the processing circuits can use machine learning and statistical modeling to improve anomaly detection capabilities within the cybersecurity framework. These systems can be used to analyze datasets in real time, detecting unusual patterns that can indicate cybersecurity threats or vulnerabilities. By employing algorithms that learn from historical data, the processing circuits equip entities with dynamic monitoring tools that adapt to new and evolving threats.

Figure 11:
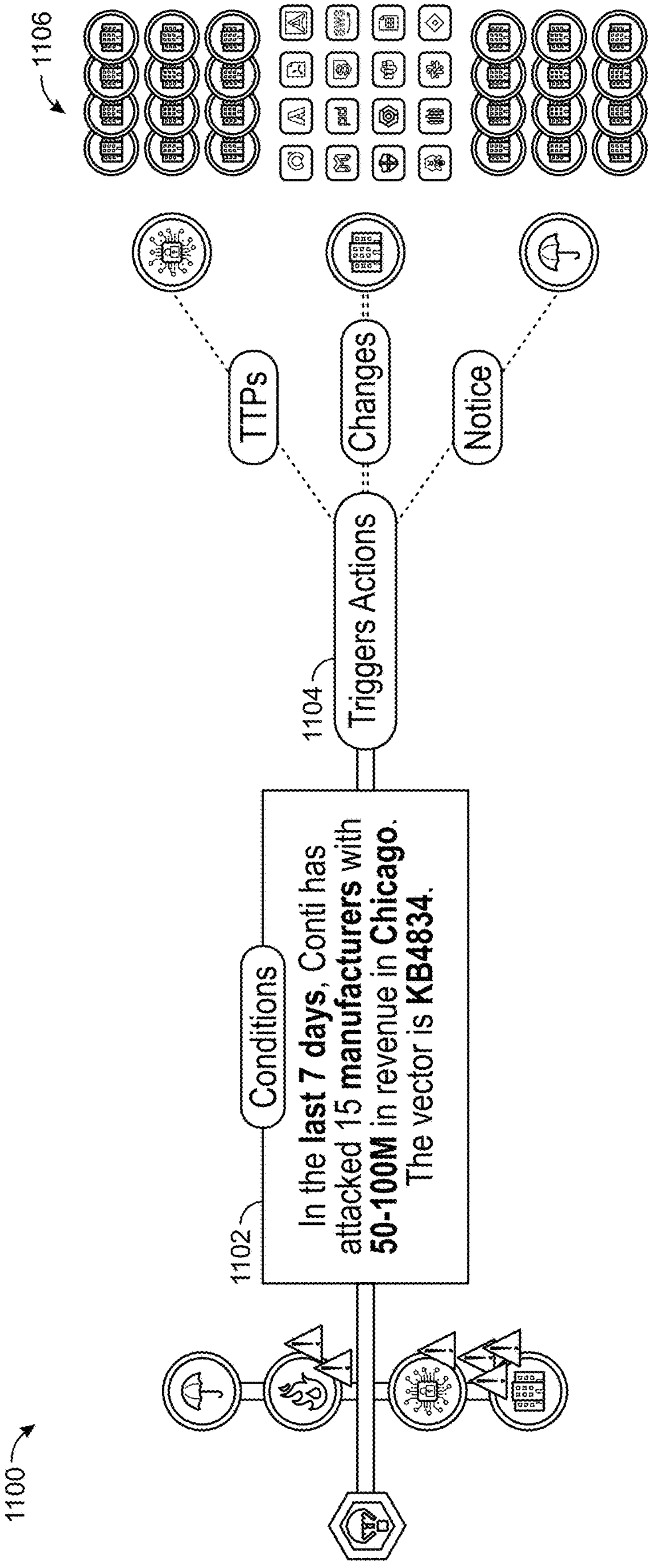
FIG. 11 depicts a block diagram of another architecture of certain systems or devices of FIG. 8, according to some implementations.

Referring now to FIG. 11, a block diagram depicting a cyber threat intelligence (CTI) model 1100 to modify security tools, according to some implementations. The response system 130 of FIG. 8 can be configured to perform the various actions and functions described herein. At block 1102, a processing circuit of the response system 130 can be configured to determine various cyber threats such as phishing attacks, ransomware, and/or DDoS attacks. For example, the depiction of a locked processor with an explanation point can indicate. Additionally, the processing circuits can determine one or more conditions. For example, the cyber threat intelligence (CTI) model 1100 depicts the condition that "In the last 7 days, Conti has attached 15 manufacturers with 50-100M in revenue in Chicago. The vector is KB4B4834." In this example, the affected sector is manufacturing, and/or the impact location is Chicago. In particular, the vector can be a malware signature or attack methodology.

Next, at block 1104, the processing circuits of the response system 130 of FIG. 8 can determine or model one or more trigger actions to perform on the security tools of companies, security vendors, and/or insurers/brokers. The security tools can be firewalls, intrusion detection systems, and/or antivirus software. In some implementations, the trigger actions can be, but are not limited to, TTPs, changes, notices, and/or so on. The processing circuit of the response system 130 can model and determine trigger actions by analyzing threat intelligence and predicting likely attack vectors. For example, the processing circuits can determine TTPs of the security tools to address emerging threats identified through real-time data analysis. In another example, the processing circuit can determine changes of the security tools to enhance their responsiveness to threat indicators. In yet another example, the processing circuits can generate notices to be provided to the security to inform about updates or patches. At block 1106, the security tools of the various entities can implement the trigger actions. For example, automatic updates to threat definitions. In yet another example, configuration changes to optimize threat detection and response. In some implementations, the TTPs can be provided to an entity, the changes can be provided to a vendor, and/or notices can be provided to a protection entity.

For example, in the context of the scenario of the CTI model, Conti, a cybercriminal group, has launched targeted attacks against 15 manufacturing companies within the Chicago area, all of which report revenues between 50 to 100 million dollars. This selection indicates preference of a Conti for industries with significant financial turnovers but potentially weaker cybersecurity measures compared to larger conglomerates. The vector, identified as KB4B4834, would indicate a malware or attack methodology that has been previously associated with operations of the Conti, for example, exploiting vulnerabilities that these mid-sized entities have overlooked. This incident can be modeled by the processing circuits to customize cybersecurity responses that are predictive, leveraging real-time threat intelligence to anticipate and mitigate such targeted attacks. The use of a vector such as KB4B4834 can allow cybersecurity systems (e.g., response system 130 of FIG. 8) to trace the attack pattern back to its source, allowing for a more directed and efficient countermeasure implementation. In this example, the cybersecurity model can be used to provide actionable intelligence based on firmographic data and threat vectors for the affected manufacturing entities in Chicago.

In some implementations, the CTI model 1100 of FIG. 11 can be incorporated into various methods through its functionality for dynamically adapting security tools in response to cyber threat intelligence. For example, the CTI model 1100 can be incorporated into a process for capturing, verifying, and/or updating the cybersecurity capabilities of an organization, including configurations and technologies in use. The CTI model 1100, as part of this method, can determine the nature of cyber threats (e.g., phishing, ransomware) and model trigger actions for security tool adjustments. This is similar to steps of receiving capabilities, verifying their state, and/or adjusting configurations based on identified gaps. Further, the CTI model 1100 can be shown in the analysis and application phases where cyber threats are analyzed, and/or appropriate responses are formulated. For example, the CTI model 1100 can provide real-time threat intelligence that informs the process of verifying the state of cybersecurity capabilities and deciding on adjustments. When the CTI model 1100 identifies a threat, such as a malware vector, mechanisms for changing state or configuration can be executed, providing an immediate and informed response to the identified threat. Thus, the integration of CTI model 1100 within the broader scope of other cybersecurity processes and methods improves the capability of the disclosed systems and methods to dynamically adapt cybersecurity measures to respond to threats. That is, by leveraging threat intelligence to inform verification and adjustment steps of cybersecurity capturing, updating, and/or verification methods, the CTI model 1100 can facilitate the use of security configurations and technologies that remain effective against current cyber threats.

Graph-Based Security Modeling

Figure 12:
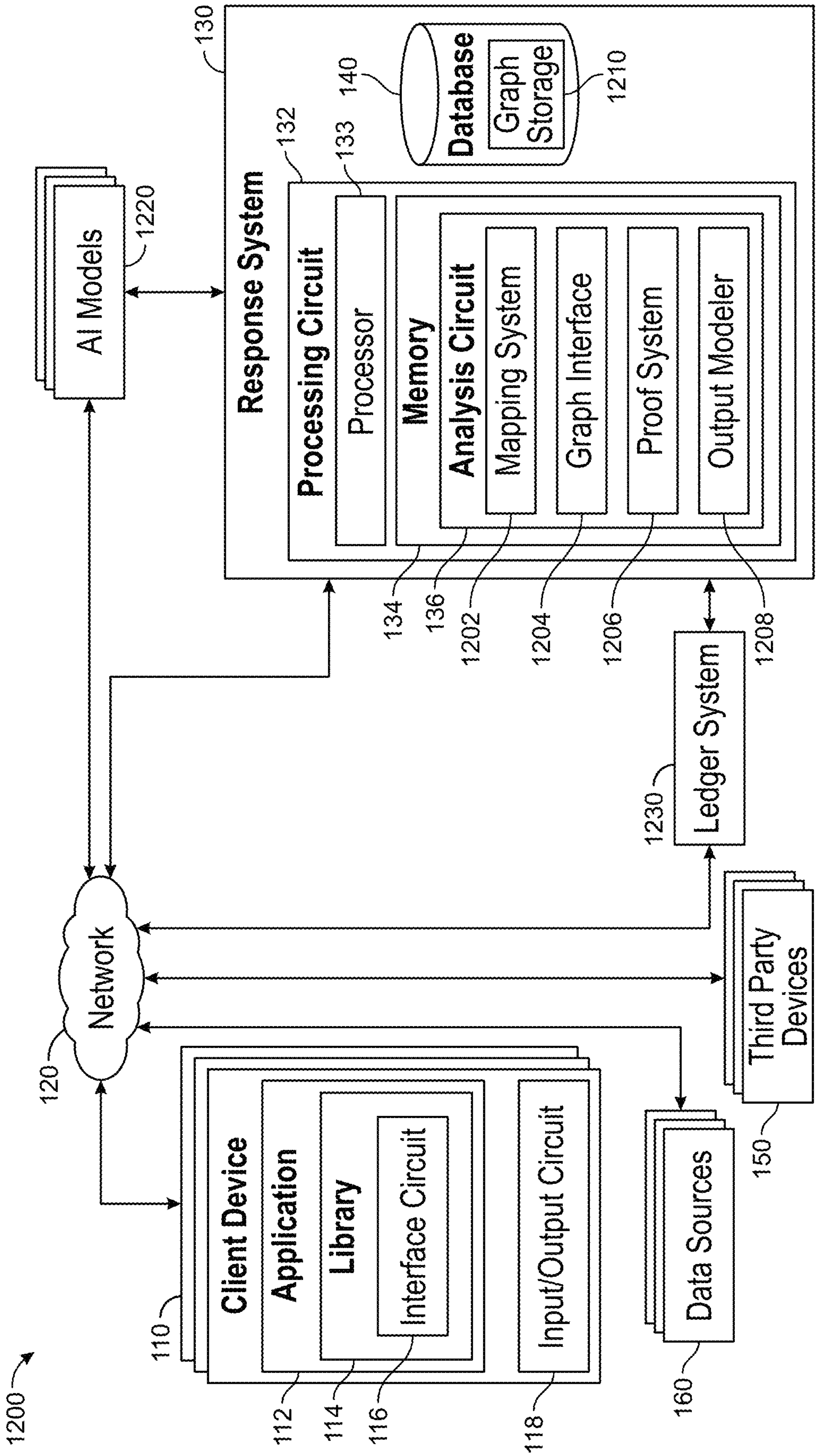
FIG. 12 depicts a block diagram of an example system for graph-based security modeling, according to some implementations.

Referring now to FIG. 12, a block diagram of an example system 1200 for graph-based security modeling is shown, according to some implementation. The system 1200 can include one or more client devices 110, a response system 130, one or more AI model(s) 1220, a ledger system 1230, one or more third party device(s) 150, and one or more data source(s) 160. The one or more client devices 110 can include an application 112, a library 114, an interface circuit 116, and an input/output circuit 118. The response system 130 can include a processing circuit 132, an analysis circuit 136, and a database 140. The processing circuit 132 can include a processor 133 and memory 134. The response system 130 can include a mapping system 1202, a graph interface 1204, a proof system 1206, an output modeler 1208, and graph storage 1210. The system 1200 can include a network 120 to facilitate communications between various systems or devices of FIG. 12.

At least one (e.g., each) system or device of FIG. 12 can include one or more processors, memories, network interfaces (sometimes referred to herein as a "network circuit") and user interfaces. The memory can store programming logic that, when executed by the processor, controls the operation of the corresponding computing system or device. The memory can also store data in databases. For example, memory can store programming logic that when executed by a processor within a processing circuit, causes a database to update or store data. For example, the memory can include any non-transitory computer-readable medium (CRM). The network interfaces can allow the computing systems and devices to communicate wirelessly or otherwise. The various components of devices in FIG. 12 can be located within a computing environment and can be implemented via hardware (e.g., circuitry), software (e.g., executable code), and/or any combination thereof. Devices, systems, and/or components in FIG. 12 can be added, deleted, integrated, separated, and/or rearranged in various implementations of the disclosure.

The system 1200 can include one or more client devices 110. In some implementations, the one or more client devices 110 can be computing devices operated by an entity or organization. For example, the computing devices can include devices used to access or interact with the response system 130 for graph-based security modeling. In some implementations, the one or more client devices 110 can transmit data to the response system 130. For example, the data can include requests for evaluation of security controls and associated deployment parameters and/or updates to security controls and associated deployment parameters, among others. In some implementations, the one or more client devices 110 can outputs from the response system 130. For example, the output can include structured data that indicates a compliance status of evaluated nodes (e.g., stored in graph storage 1210) and/or associations to corresponding proof identifiers (e.g., stored in ledger system 1230).

In some implementations, the one or more client devices 110 can generate user interfaces or displays via the application 112. The application 112 can be software executed by the one or more client devices 110. That is, the application 112 can include executable software to facilitate communications, such as the transmission of user interface inputs and receipt/presentation of outputs from systems, sub-systems, or components of FIG. 12 (e.g., response system 130). For example, communications can include transmission of evaluation requests or associated inputs over the network 120, and the presentation can include rendering of textual or graphical data via user interface components (e.g., tables, charts, dashboards, status panels). The application 112 can be a web-based application or a native application installed on the one or more client devices 110. That is, the application 112 can be accessed through a browser or executed as a standalone software package.

The application 112 can receive user input and format the user input into requests. That is, the user input can specify security controls or deployment parameters to be evaluated, and the application 112 can transform the user input into structured evaluation requests. For example, the free-form textual input can originate from questionnaires or policy frameworks. For example, the questionnaires can include security assessment forms, and the policy frameworks can include regulatory control statements (e.g., NIST Cybersecurity Framework requirements, CIS Controls, ISO 27001 clauses) that the response system 130 normalizes into canonical identifiers. The application 112 can parse structured output received from the response system 130. That is, the application 112 can extract compliance status indicators, proof references, or other information from the structured output.

The one or more client devices 110 can include a library 114. The library 114 can be a software component that provides reusable code for the application 112. For example, the reusable code can include code for operations related to compliance evaluation, data processing, and output rendering. In some implementations, the library 114 can include cryptographic libraries for verifying proof artifacts. In some examples, the library 114 can include code to execute data transformation operations. For example, the data transformation operations can include operations to convert between different data formats, such as converting JSON objects received from the response system 130 into in-memory data structures used by the application 112. The library 114 can provide utility functions for temporal operations. For example, the utility functions can include functions for timestamp parsing, temporal metadata comparison, or calculation of time intervals used in evaluating time-based compliance requirements.

The one or more client devices 110 can include an interface circuit 116. The interface circuit 116 can be a hardware or software component that establishes and maintains communication channels with other systems or components via the network 120. That is, the interface circuit 116 can facilitate data exchange between the one or more client devices 110 and other networked entities. For example, the communication channels can include bidirectional data paths that facilitate transmission of evaluation requests and reception of structured output (e.g., HTTP connections, WebSocket sessions, REST API endpoints). The interface circuit 116 can include network interface hardware or protocol implementations. For example, the network interface hardware can include network interface cards, wireless communication modules, or cellular modems that facilitate physical connectivity to the network 120. That is, the protocol implementations can include software stacks that execute network protocols (e.g., TCP/IP stack implementations, HTTP client libraries, TLS encryption modules). The interface circuit 116 can buffer incoming data received from the response system 130. For example, the interface circuit 116 can store data temporarily before passing to the application 112 (e.g., memory buffers, receive queues, packet reassembly buffers). That is, the interface circuit 116 can pass the buffered data to the application 112 for subsequent processing operations or presentation to users via user interface components (e.g., parsing of JSON objects, extraction of compliance status indicators, rendering of evaluation results in graphical displays, etc.).

The one or more client devices 110 can include an input/output circuit 118. The input/output circuit 118 can be a hardware or software component that facilitates user interaction with the application 112. That is, the input/output circuit 118 can facilitate interaction through input devices and output devices coupled to the one or more client devices 110. For example, the input devices and output devices can include keyboard interfaces, mouse interfaces, touchscreen controllers, display controllers, and/or audio output interfaces (e.g., audio jacks, speaker circuits, Bluetooth audio transmitters, etc.) that capture user input and present visual or auditory output to users. The input/output circuit 118 can capture user input and can pass the user input to the application 112. For example, the user input can specify security controls, deployment parameters, and/or compliance requirements to be evaluated by the response system 130. That is, the user input can include textual descriptions, selection actions, or configuration parameters (e.g., free-form text describing managed detection and response requirements, dropdown menu selections of decorator nodes, form submissions specifying temporal intervals for verification) that the application 112 transforms into structured requests.

In some implementations, the input/output circuit 118 can render graphical user interface elements. For example, the graphical user interface elements can display security control inputs for transmission to the response system 130 or compliance evaluation results received from the response system 130. That is, the graphical user interface elements can include node-level status indicators, temporal metadata, and proof references (e.g., color-coded pass or fail icons for primitive nodes, timestamp values representing lastVerifiedDate fields, data indicative of proof identifiers in the ledger system 1230) presented in content fields, text boxes, images, tables, charts, or dashboards. The input/output circuit 118 can execute rendering operations to display structured output. For example, the structured output can be displayed in user-readable formats. That is, the user-readable formats can include tables, charts, graphs, and/or textual reports (e.g., JSON-formatted evaluation results parsed and rendered as HTML tables, pie charts showing compliance percentages across decorator nodes, timeline graphs illustrating verification history for security controls) that communicate evaluation results to users.

Generally, the temporal metadata can encode, in machine-readable fields associated with each primitive node and decorator node, one or more timestamps and derived time values that the analysis circuit 136 and the graph interface 1204 use during compliance evaluation and rendering of structured output 1316. That is, the temporal metadata can include fields such as lastVerified, lastUpdated, createdAt, and/or verificationWindowEnd stored as integer epoch values, ISO 8601 strings, and/or any normalized time representation in the graph storage 1210. In some implementations, the analysis circuit 136 can compute low-level time deltas by subtracting a stored lastVerified value from a currentTime value to obtain an elapsedSeconds value and can compare elapsedSeconds against a thresholdSeconds value derived from a decorator node condition (e.g., 30 days expressed as 30×24×3600 seconds) to determine whether a temporal requirement is satisfied. For example, the analysis circuit 136 can read a lastVerified field equal to 1,700,000,000 from a decorator node representing a vulnerability scan interval, can read a currentTime value equal to 1,700,250,000, can compute an elapsedSeconds value of 250,000, and can compare elapsedSeconds to a thresholdSeconds value of 2,592,000 to determine that the decorator node remains within a thirty-day interval. In some implementations, the temporal metadata can include precomputed fields such as daysSinceVerification and hoursSinceUpdate that the analysis circuit 136 updates when a new proof object 1312*a* is recorded in the ledger system 1230 so that node-level compliance status evaluation can use integer comparisons without recomputing raw time differences. For example, the input/output circuit 118 can render, in a table cell of a dashboard, a lastVerified ISO 8601 string such as "2024-01-15T12:34:56Z" together with a derived daysSinceVerification value such as "12" and can apply a color mapping that sets the cell background to green when daysSinceVerification≤30, yellow when 30<daysSinceVerification≤60, and red when daysSinceVerification>60, among others.

The system 1200 can include a network 120. The network 120 can include a communications infrastructure. That is, the communications infrastructure can facilitate data transmission between networked components. For example, the data transmission can include routing or facilitating network traffic involving the one or more client devices 110, the response system 130, the one or more AI model(s) 1220, the ledger system 1230, the one or more third party device(s) 150, and/or the one or more data source(s) 160 (e.g., bidirectional request-response exchanges, streaming data flows, event notifications). The network 120 can include various network types. That is, the network types can be wired and/or wireless network infrastructure. For example, the network infrastructure can include local area networks, wide area networks, the Internet, cellular networks, and/or wireless networks (e.g., WiFi networks, LTE networks, 5G networks, etc.). The network 120 can implement network protocols. That is, the network protocols can include routing mechanisms and reliability features. For example, the reliability features can include protocols and routing mechanisms to deliver data packets between distributed components of the system 1200 (e.g., TCP retransmission protocols, IP routing tables, packet acknowledgment mechanisms). The network 120 can include security features. That is, the security features can protect transmitted data. For example, the protection can include encryption, authentication, and/or access control mechanisms to protect data transmitted between components of the system 1200 (e.g., TLS encryption, certificate-based authentication, firewall rules, etc.).

The system 1200 can include one or more AI model(s) 1220. In some examples, the one or more AI model(s) 1220 can be machine learning models or natural language processing models. For example, the machine learning models or natural language processing models can process free-form textual input to extract or normalize canonical identifiers for security controls and deployment parameters. That is, the free-form textual input can include unstructured data received from various sources (e.g., questionnaire responses, policy framework control statements, regulatory compliance documents, user-submitted text fields). In some examples, the one or more AI model(s) 1220 can include model architectures. For example, the model architectures can include transformer-based language models, named entity recognition models, or text classification models trained to identify or generate data (e.g., to normalize security control references and safeguard conditions in unstructured text). That is, the model architectures can be trained on domain-specific corpora (e.g., cybersecurity framework documents, compliance policy libraries, security control taxonomies).

In some examples, the one or more AI model(s) 1220 can receive textual input and decompose the textual input. For example, the one or more AI model(s) 1220 can receive free-form textual input from questionnaires or policy frameworks and can decompose the textual input into primitives and decorators representing security controls and safeguard conditions. That is, the decomposition can involve extraction of control entities and parameter entities (e.g., extracting security control names such as managed detection and response, extracting safeguard conditions such as escalation contacts updated within thirty days). In some examples, the one or more AI model(s) 1220 can execute inference operations. For example, the one or more AI model(s) 1220 can execute inference operations on input text to identify mentions of security controls such as managed detection and response, multifactor authentication, or vulnerability management, and can map the identified mentions to globally unique primitive identifiers.

The system 1200 can include a ledger system 1230. The ledger system 1230 can be a data storage system. That is, the ledger system 1230 can operate as a data repository accessible by the response system 130 via the network 120. In some examples, the ledger system 1230 can include distributed storage architectures (e.g., clustered databases, replicated storage nodes, geographically distributed ledgers, etc.). The ledger system 1230 can record and maintain proof data, such as cryptographic proof artifacts. That is, the cryptographic proof artifacts can include verifiable data associated with security controls and deployment parameters evaluated by the response system 130. For example, the proof data can include verifiable data records such as digital signatures, hash-based proofs, or timestamped attestations (e.g., cryptographically signed configuration snapshots, blockchain transaction records, tamper-evident audit trail entries, etc.).

In some implementations, the ledger system 1230 can be implemented as a distributed ledger, blockchain service, or tamper-evident log. That is, the ledger system 1230 can provide immutable storage and cryptographic verification capabilities. For example, the distributed ledger can store cryptographically signed proof records with unique proof identifiers (e.g., blockchain-based ledger entries with transaction identifiers, distributed ledger nodes storing hashed proof artifacts, tamper-evident log systems maintaining sequential proof records, etc.). The ledger system 1230 can store proof artifacts. That is, the proof artifacts can represent verification events, configuration snapshots, or evidence of compliance. For example, the verification events can include timestamped records of security control validations (e.g., automated response activation or verification events, escalation contact update confirmation events, vulnerability scan completion records, etc.). Various systems or devices of FIG. 12 can access data stored via the ledger system 1230 for verification or other purposes. In some examples, the ledger system 1230 can include a public ledger or a private ledger.

In some implementations, the ledger system 1230 can receive queries. That is, the queries can be received from the response system 130 to retrieve the status or state of proof identifiers. For example, the queries can identify proof identifiers associated with nodes in the graph storage 1210 (e.g., proof identifier lookup requests, state verification queries, encoded state retrieval operations, etc.). The ledger system 1230 can return encoded states or status indicators. In some examples, the ledger system 1230 can record new proof artifacts. That is, the new proof artifacts can be recorded when security controls or deployment parameters are added or updated.

The system 1200 can include a response system 130. The response system 130 can include a combination of hardware and/or software to execute various operations for graph-based security modeling. In some implementations, the response system 130 (and/or other systems or devices of FIG. 12 such as the analysis circuit 136, mapping system 1202, graph interface 1204, proof system 1206, output modeler 1208, etc.) can include one or more processing circuits, including processor(s) and memory. The memory can have instructions stored thereon that, when executed by processor(s), cause the one or more processing circuits to perform the various operations described herein. The operations described herein can be implemented using software, hardware, and/or a combination thereof. The processor(s) can include a microprocessor, ASIC, FPGA, etc., and/or combinations thereof. In many implementations, the processor(s) can be a multi-core processor or an array of processors. Memory can include, but is not limited to, electronic, optical, magnetic, and/or any other storage devices capable of providing processor(s) with program instructions. The instructions can include code from any suitable computer programming language.

For example, the response system 130 can include a processing circuit 132. The processing circuit 132 can include at least one processor 133 and memory 134. The memory can include an analysis circuit 136, which can include the mapping system 1202, graph interface 1204, proof system 1206, and output modeler 1208. The response system 130 and/or analysis circuit 136 can perform various operations using one or more processors and/or included systems or components, such as mapping system 1202, graph interface 1204, proof system 1206, output modeler 1208, and/or database 140.

In some examples, response system 130 can be a computing system including one or more servers, processors, and data storage components that implement graph-based security modeling and compliance evaluation operations. For example, the computing system can include cloud-based service platforms, distributed computing clusters, or on-premises server infrastructures (e.g., containerized microservice deployments, virtual machine environments, etc.) that execute the operations described herein for storing, querying, and evaluating security controls and deployment parameters.

The response system 130 can use the analysis circuit to perform various operations. For example, the analysis circuit 136 can store or access nodes via the graph storage 1210 of the database 140. That is, the analysis circuit 136 can store primitive nodes representing security controls and decorator nodes representing deployment parameters in the graph storage 1210. For example, the nodes can include primitive nodes representing security controls associated with one or more security control models or frameworks (e.g., managed detection and response systems, multifactor authentication mechanisms, vulnerability management platforms, endpoint protection services, etc.) and decorator nodes representing deployment parameters defining attributes, types, or conditions associated with deployment of the corresponding security controls (e.g., escalation contact definitions, temporal update requirements, automated response states, configuration threshold specifications, etc.). The primitive nodes can be linked to respective decorator nodes by graph-encoded relationships (e.g., edges).

In some implementations, the analysis circuit 136 can process evaluation requests from internal or external systems. That is, the analysis circuit 136 can receive evaluation requests from the one or more client devices 110 or third party devices 150, can execute graph queries against the graph storage 1210, and can return structured outputs indicating compliance status and proof references.

The analysis circuit 136 can link nodes with proof data or temporal data. That is, the analysis circuit 136 can associate each primitive node and each decorator node with cryptographic proof identifiers recorded in the ledger system 1230 and with temporal metadata representing times of verification. The analysis circuit 136 can evaluate compliance conditions using retrieved data. That is, the analysis circuit 136 can execute compliance evaluation logic that compares temporal metadata and proof data against policy requirements (e.g., parameters of a security control model) to determine whether security controls and deployment parameters satisfy such requirements. For example, the compliance evaluation logic can include different evaluation operations (e.g., temporal interval comparisons, proof state verifications, parameterized condition assessments, policy requirement validations, etc.) that process temporal metadata fields and proof artifact states retrieved from the ledger system 1230 to generate compliance status indicators for security controls and deployment parameters.

In some examples, the analysis circuit 136 can use the mapping system 1202, graph interface 1204, proof system 1206, output modeler 1208, and/or graph storage 1210 to perform various operations. For example, the analysis circuit 136 and/or mapping system 1202 can store, in a graph structure, at least one primitive node representing a security control deployed in a network infrastructure of an entity. The at least one primitive node can be stored in association with a first canonical identifier corresponding with the security control. In some implementations, the analysis circuit 136 and/or mapping system 1202 can perform the storing by writing data to a graph database, assigning identifiers to nodes, and associating the node identifiers with corresponding metadata and/or proof data. In some implementations, the security control represented by the primitive node can correspond to a technical or administrative safeguard implemented in a computing environment of the entity, such as endpoint protection platforms (e.g., antivirus agents, endpoint detection and response agents), managed detection and response services (e.g., outsourced security operations centers, managed security monitoring), authentication mechanisms (e.g., multifactor authentication systems, single sign-on services), vulnerability management tools (e.g., network vulnerability scanners, application vulnerability scanners), network protection components (e.g., intrusion detection systems, firewalls, secure web gateways), and data protection services (e.g., backup and recovery systems, encryption key management services), among various other types of cybersecurity data or information.

In some examples, the network infrastructure of the entity can include computing and communication resources that the analysis circuit 136 and/or mapping system 1202 model as part of the entity environment, such as on-premises networks, cloud-hosted environments, hybrid deployments, and associated devices and workloads (e.g., corporate local area networks, virtual private cloud deployments, data center networks, container orchestration clusters, software-as-a-service applications). The at least one primitive node can be stored in association with a first canonical identifier corresponding with the security control. In some implementations, the analysis circuit 136 and/or mapping system 1202 can associate the first canonical identifier with the primitive node by writing the canonical identifier as a node property, indexing the canonical identifier in the graph storage 1210, and/or using the canonical identifier to resolve references from external framework mappings or evaluation requests that identify the security control in a framework-agnostic manner. For example, the first canonical identifier associated with the primitive node can correspond to a normalized, framework-agnostic identifier usable to recognize the same security control across different data sources or frameworks (e.g., a globally unique identifier or namespace string for managed detection and response, a canonical identifier for multifactor authentication, a canonical identifier for endpoint protection, a canonical identifier for vulnerability management, etc.)

For example, the analysis circuit 136 and/or mapping system 1202 can store, in the graph structure, at least one decorator node representing a deployment parameter corresponding with the security control. The at least one decorator node can be stored in association with a second canonical identifier corresponding with the deployment parameter and linked to the at least one primitive node by an edge indicating the deployment parameter is applied to the security control in the network infrastructure. In some implementations, the analysis circuit 136 and/or mapping system 1202 can perform the storing by creating a node record in the graph database for the decorator node, assigning a node identifier to the decorator node, writing one or more properties representing the deployment parameter, and persisting the decorator node in association with an edge record that references the primitive node identifier and the decorator node identifier. In some examples, the deployment parameter represented by the decorator node can correspond to a configuration, operational, or temporal attribute of the security control that the analysis circuit 136 and/or mapping system 1202 track as a safeguard condition, such as escalation contact configuration (e.g., escalation contacts defined for incident handling, escalation contact records maintained for specific systems or business units), temporal update requirements (e.g., escalation contacts updated within a specified time interval, vulnerability scans performed according to a defined schedule), response capabilities (e.g., automated response actions activated for particular alert types, playbooks configured for incident categories), logging or retention characteristics (e.g., log retention durations meeting a minimum threshold, logging activated for specified event types), or other deployment characteristics that qualify or constrain the operation of the underlying security control. In some implementations, the analysis circuit 136 and/or mapping system 1202 can use the second canonical identifier to represent the deployment parameter in a framework agnostic manner across multiple security controls and frameworks, such that the same decorator can be reused to represent a common safeguard condition applied to different primitive nodes or different regulatory frameworks.

In some examples, the analysis circuit 136 and/or mapping system 1202 can associate the at least one primitive node and the at least one decorator node with (i) at least one cryptographic proof recorded on a distributed ledger or blockchain storage and (ii) temporal metadata representing a time of verification of the security control or the deployment parameter. In some implementations, the analysis circuit 136 and/or mapping system 1202 can perform the associating by writing, for each node, one or more proof identifiers as node properties that reference corresponding records in the distributed ledger or blockchain storage, such that the proof identifiers can be used to retrieve encoded proof states or other proof data from the proof system 1206. In some examples, the cryptographic proofs recorded on the distributed ledger or blockchain storage can include verifiable records generated by the proof system 1206 that attest to the state or configuration of the security control or deployment parameter, such as digitally signed configuration snapshots (e.g., signed firewall rule sets, signed endpoint protection policies), timestamped attestations (e.g., notarized statements that a control was activated at a particular time, attestations issued by an identity provider or monitoring service), or hash-based integrity proofs (e.g., Merkle tree roots or hash digests corresponding to configuration files, policy documents, or audit logs). In some implementations, the analysis circuit 136 and/or mapping system 1202 can generate and/or update the temporal metadata by storing timestamp values as node properties that indicate when a corresponding cryptographic proof was last recorded, verified, or refreshed, such as lastUpdated timestamps, lastVerifiedDate timestamps, or other verification time fields that allow the analysis circuit 136 to evaluate whether a given security control or deployment parameter satisfies expected parameters (e.g., that a safeguard be reviewed, updated, or re-verified within a specified interval).

In some examples, the analysis circuit 136 and/or graph interface 1204 can execute a graph query against the graph structure, and the graph query can include at least one of the first canonical identifier or the second canonical identifier. In some examples, the graph query can be executed responsive at least in part to a request for a status of the security control or the deployment parameter. In some implementations, the analysis circuit 136 and/or graph interface 1204 can construct the graph query by embedding the first canonical identifier and/or the second canonical identifier as query parameters and submitting the query to the graph storage 1210 using a graph query language or application programming interface, such as a traversal-based query language (e.g., that matches nodes having a canonical identifier property equal to the first canonical identifier or the second canonical identifier) or a pattern-matching query language (e.g., that selects primitive nodes and decorator nodes based on canonical identifier properties and edge relationships). In some examples, the request for a status of the security control or the deployment parameter can be received by the analysis circuit 136 from an internal or external device (e.g., client device 110 or third party device 150). The request can include textual information that directly or indirectly references one or more canonical identifiers to identify which primitive nodes and/or decorator nodes are to be evaluated. In some examples, the request can originate from user interfaces (e.g., administrative dashboards, compliance reporting tools), automated workflows (e.g., scheduled compliance assessments, continuous monitoring pipelines), or programmatic integrations (e.g., third-party risk management platforms, security orchestration systems).

In some implementations, the analysis circuit 136 and/or graph interface 1204 can execute the graph query as a traversal that starts from at least one primitive node and/or at least one decorator node identified by the first canonical identifier and/or the second canonical identifier and follows edges in the graph structure to obtain connected nodes and associated properties (e.g., canonical identifiers, proof identifiers, and/or temporal metadata). That is, the analysis circuit 136 and/or graph interface 1204 can use the graph query to obtain, from the graph storage 1210, node attributes of the at least one primitive node and the at least one decorator node, edge attributes of edges linking the at least one primitive node and the at least one decorator node, and identifiers of additional nodes that are reachable from the at least one primitive node and the at least one decorator node (e.g., additional decorator nodes, additional primitive nodes, and/or any related intermediate nodes). In some implementations, the analysis circuit 136 and/or graph interface 1204 can constrain the graph query to a subset of node types and/or edge types so that the graph query returns only primitive nodes and decorator nodes that participate in evaluation of the status of the security control or the deployment parameter (e.g., nodes that store proof identifiers, nodes that store temporal metadata, and/or nodes that store parameterized conditions). For example, the analysis circuit 136 and/or graph interface 1204 can execute the graph query to obtain, in a single operation, the at least one primitive node, the at least one decorator node, and proof identifiers and temporal metadata stored as properties of the at least one primitive node and the at least one decorator node, among others.

In some examples, the analysis circuit 136 and/or proof system 1206 can access, based at least in part on execution of the graph query, the temporal metadata representing the time of verification and the at least one cryptographic proof from the distributed ledger or blockchain storage. For example, the analysis circuit 136 and/or proof system 1206 can process results of the graph query to identify primitive nodes and decorator nodes that include temporal metadata fields and proof identifiers, and can provide the use the proof identifiers to obtain corresponding cryptographic proof data from the ledger system 1230. In some examples, the analysis circuit 136 and/or proof system 1206 can interact with a distributed ledger or blockchain storage by executing lookup operations or transaction queries that return encoded proof records linked to the proof identifiers, such as records that include block timestamps, digital signatures, and hash values associated with configuration snapshots, policy attestations, or other evidence artifacts. For example, the analysis circuit 136 and/or proof system 1206 can use a proof identifier associated with a decorator node representing a "vulnerability scans performed within thirty days" deployment parameter to retrieve, from the distributed ledger or blockchain storage, a cryptographically signed record indicating verifying a last time a vulnerability scan completed, can read the timestamp representing the last time the vulnerability scan was completed from that node metadata, and can determine whether the vulnerability scan was performed within the specified thirty-day interval.

In some examples, the analysis circuit 136 and/or output modeler 1208 can generate a structured output corresponding to the request, the structured output indicating the status of the security control or the deployment parameter and an association to the at least one cryptographic proof In some implementations, the analysis circuit 136 and/or output modeler 1208 can generate the structured output by constructing a machine-readable data object that includes fields representing evaluation results for primitive nodes and decorator nodes (e.g., pass or fail indicators, compliance or non-compliance flags, informational or warning states) and by embedding, for each evaluated node, one or more proof identifiers that reference corresponding cryptographic proof artifacts obtained via the proof system 1206. In some examples, the analysis circuit 136 and/or output modeler 1208 can format the structured output as a JSON object or other structured representation that can be consumed by client applications or downstream services, such as including a status field summarizing the evaluated state of the security control or deployment parameter, an array of entries representing node-level evaluations, and proof identifier fields that facilitate retrieval of underlying evidence from the distributed ledger or blockchain storage.

For example, the analysis circuit 136 and/or output modeler 1208 can expose the structured output for internal security or compliance systems of an entity to support continuous control monitoring, internal attestation workflows, and preparation of audit evidence packages (e.g., generating near real-time views of which safeguards are currently verified, identifying safeguards with stale verification timestamps or missing proofs, assembling machine-readable evidence bundles for specific regulatory assessments). In some implementations, audit tooling or assurance platforms used by internal auditors or external auditors can use the structured output to programmatically evaluate selected sets of primitive nodes and decorator nodes, retrieve associated proof identifiers, and obtain corresponding cryptographic proof artifacts from the ledger system 1230 for sampling, validation, or traceability purposes during audit engagements. In some examples, third-party systems such as cyber insurance underwriting platforms, vendor risk management systems, or customer-facing security posture portals can consume the structured output to obtain verified, framework-agnostic views of an entity's implemented safeguards, facilitating risk scoring, coverage determination, or vendor due diligence based on evaluated control states rather than static questionnaires or self-reported control inventories.

In some implementations, the database 140 can be a data storage system. That is, the data storage system can store various data records, structures, or objects used for graph-based security modeling. For example, the database 140 can store data such as policy framework data (e.g., parameters of the NIST Cybersecurity Framework, CIS Controls, ISO 27001 standards, etc.), current or historical entity data (e.g., safeguard implementation records, demographic data, network settings or logs, etc.) compliance data (e.g., time-based compliance thresholds, verification frequency requirements, safeguard update intervals, etc.), modeling data (e.g., AI training datasets, operational or error logs), mapping data (e.g., canonical identifier mappings, framework control mappings, decorator condition mappings, etc.), or any type of cybersecurity-related data or information. In some implementations, the database 140 can store canonical identifier mappings. That is, the canonical identifier mappings can be used by the mapping system 1202 to normalize textual input. For example, the textual input that the mapping system 1202 normalizes can include free-form textual input (e.g., questionnaire responses, policy framework control statements, regulatory compliance text, etc.) normalized into primitive identifiers and decorator identifiers.

In some implementations, the database 140 can store historical data. That is, the historical data can include evaluation results, audit trail records, or versioning information. For example, the evaluation results, audit trail records, or versioning information can include data that tracks changes to primitive nodes and decorator nodes (e.g., temporal metadata history, proof identifier update records, node attribute modification logs, etc.). In some implementations, the database 140 can store access control data. That is, the access control data can include policies, credentials, or rules. For example, the policies, credentials, or rules can include access control policies (e.g., role-based access policies, permission models, authorization rules, etc.), authentication credentials (e.g., user credentials, service account credentials, cryptographic keys, etc.), or authorization rules (e.g., resource access rules, operation permission rules, proof artifact access restrictions, etc.) that the response system 130 enforces to restrict access to compliance evaluation operations and sensitive proof artifacts.

The system 1200 can include one or more third party device(s) 150. The one or more third party device(s) 150 can be external computing systems that request or provide data, services, or verification functions to the response system 130. That is, the external computing systems can be operated by third-party entities such as regulatory authorities, certification services, audit platforms, or external verification services. For example, the data, services, or verification functions can provide compliance frameworks (e.g., NIST Cybersecurity Framework definitions, CIS Controls specifications, ISO 27001 control mappings, etc.), request proof validation operations (e.g., cryptographic signature verification, blockchain transaction validation, distributed ledger state queries, etc.), or attestation services (e.g., third-party certification attestations, audit report generation, regulatory compliance verification, etc.). In some implementations, the one or more third party device(s) 150 can transmit data to the response system 130. For example, the data transmitted can include policy framework definitions, compliance requirement specifications, or control mapping data transmitted via the network 120. That is, the transmitted data can include framework control language (e.g., free-form textual control statements from NIST, CIS, or ISO frameworks, regulatory requirement descriptions, policy specifications, etc.).

In some implementations, the one or more third party device(s) 150 can receive output from the response system 130. For example, the received output can include structured output generated by the output modeler 1208 for downstream processing, audit reporting, or compliance certification workflows. That is, the downstream processing can include operations performed by external systems (e.g., GRC platform integrations, compliance management system ingestion, regulatory reporting automation, etc.), audit reporting operations (e.g., audit trail generation, evidence compilation, regulatory submission preparation, etc.), or certification workflows (e.g., third-party certification processes, attestation generation, compliance badge issuance, etc.).

In some implementations, the one or more third party device(s) 150 can transmit updates to the response system 130. For example, the updates can include updates or modifications to policy requirements or compliance parameters that the response system 130 applies to subsequent evaluation operations. That is, the updates can include policy changes (e.g., revised safeguard condition definitions, updated temporal verification intervals, modified proof validation criteria, etc.), parameter adjustments (e.g., time window specifications, verification frequency requirements, threshold value modifications, etc.), or compliance threshold changes (e.g., proof state validation rules, encoded state verification parameters, policy requirement updates, etc.).

The system 1200 can include one or more data source(s) 160. In some implementations, the one or more data source(s) 160 can be internal or external systems that provide data to the response system 130. For example, the data provided by the one or more data source(s) 160 can include security control state information, configuration parameters, and/or verification event records transmitted via the network 120. In some implementations, the one or more data source(s) 160 can include monitoring systems that track security controls in network infrastructure. For example, the monitoring systems that track security controls can include security information and event management systems, network monitoring platforms, configuration management databases, and/or asset inventory systems deployed in the network infrastructure of the entity. That is, the monitoring systems can execute detection operations (e.g., security control state polling, configuration change monitoring, event log aggregation, etc.), data collection operations (e.g., telemetry stream capture, log file retrieval, state snapshot generation, etc.), and/or notification operations (e.g., state change event transmission, verification event broadcasting, configuration update signaling, etc.).

In some implementations, the one or more data source(s) 160 can transmit data to the response system 130. For example, the data transmitted to the response system 130 can include security control deployment records, configuration change notifications, and/or verification event indicators transmitted via the network 120 to the response system 130. In some implementations, the one or more data source(s) 160 can trigger updates to nodes in the graph storage 1210. For example, the updates to nodes can include primitive node modifications and/or decorator node modifications triggered when the one or more data source(s) 160 detect changes to security controls and/or deployment parameters in the network infrastructure. In some implementations, the one or more data source(s) 160 can stream real-time data to the response system 130. For example, the real-time data streamed can include telemetry data, log events, and/or state change notifications that the response system 130 processes to maintain current temporal metadata and proof artifact associations for nodes in the graph storage 1210.

Figure 13:
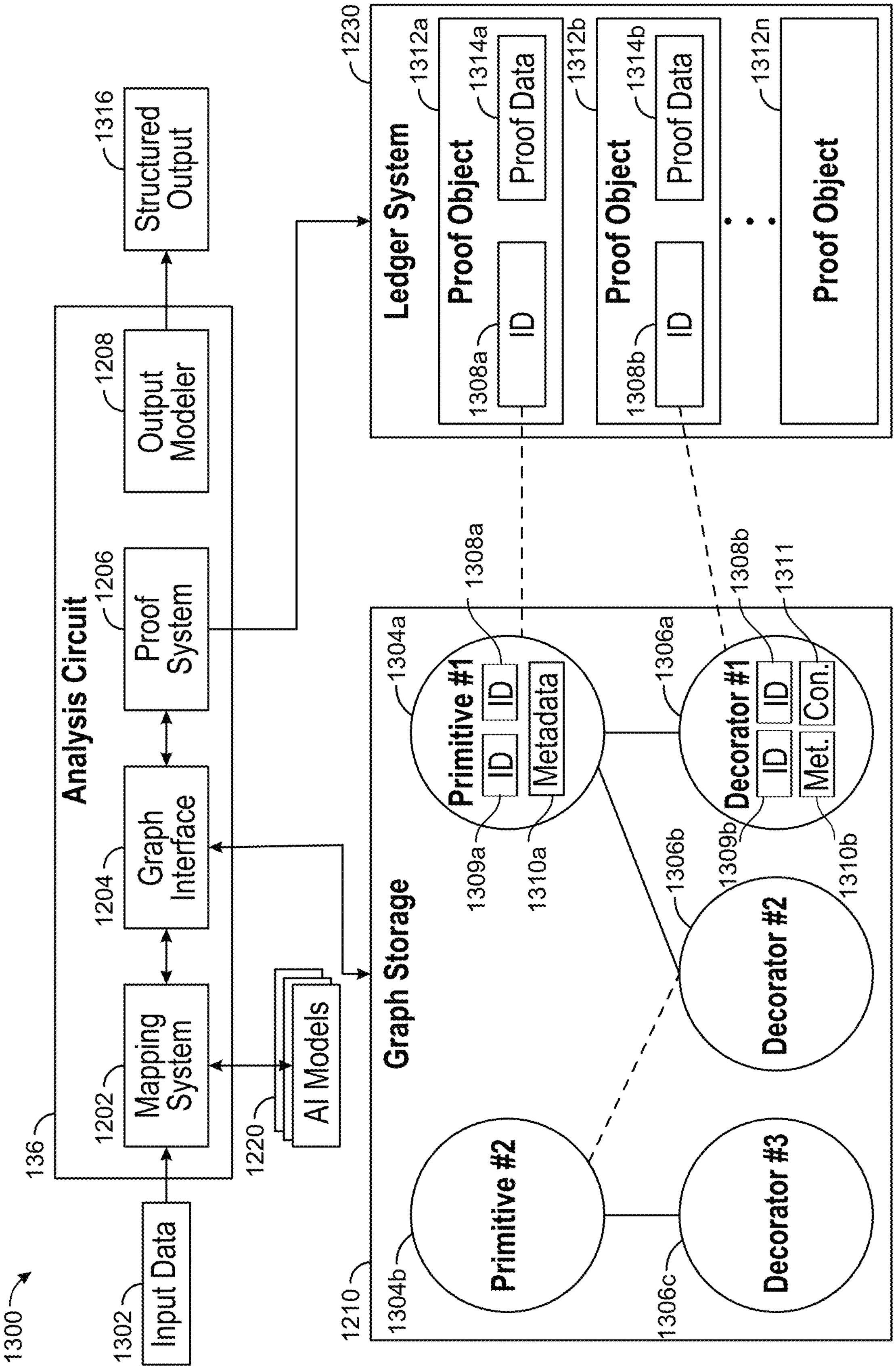
FIG. 13 depicts a block diagram of an example system for graph-based security modeling, according to some implementations.

Generally, referring to both FIGS. 12 and 13, the analysis circuit 136 can receive, from a client device 110 executing the application 112, a request that includes unstructured input describing a managed detection and response security control deployed in a virtual private cloud of the entity and a deployment parameter specifying that escalation contacts are to be updated within thirty days for all critical alerts, and the analysis circuit 136 can provide the unstructured input to the one or more AI model(s) 1220 to obtain a first canonical identifier for a primitive node representing the managed detection and response security control and a second canonical identifier for a decorator node representing the escalation contact temporal requirement. That is, the mapping system 1202 can use the first canonical identifier and the second canonical identifier to store, in the graph storage 1210 of the database 140, a primitive node that represents the managed detection and response security control deployed across monitored endpoints and cloud workloads of the network infrastructure of the entity and a decorator node that represents the escalation contact temporal requirement, and the graph interface 1204 can create an edge between the primitive node and the decorator node that indicates that the escalation contact temporal requirement is applied to the managed detection and response security control in the network infrastructure.

In some implementations, the data acquisition engine 180 can configure a data channel over the network 120 to a third party computing system 150 that operates the managed detection and response platform and can periodically obtain configuration snapshots that include escalation contact records and last updated timestamps, and the proof system 1206 can generate a cryptographic proof object 1312*a* for each configuration snapshot and record the cryptographic proof object 1312*a* in the ledger system 1230 as an entry in a proof ledger together with a proof identifier and an encoded state that indicates that the escalation contacts were updated at a particular time. For example, the proof system 1206 can write the proof identifier as a property of the decorator node in the graph storage 1210 and can write a lastVerified timestamp as temporal metadata 1310*a* of the decorator node, and the proof system 1206 can write a second proof identifier as a property of the primitive node to reference a separate cryptographic proof object 1312*b* that encodes that the managed detection and response security control is active on a specified set of endpoints and cloud accounts, among others. In some implementations, a compliance reporting tool executed by the client device 110 can transmit, over the network 120, a status request that references the first canonical identifier and the second canonical identifier to the analysis interface exposed by the output modeler 1208 as a microservice endpoint, and the analysis circuit 136 and/or graph interface 1204 can execute a graph query against the graph storage 1210 that matches the primitive node and the decorator node based on the first canonical identifier and the second canonical identifier and traverses edges to obtain all decorator nodes linked to the primitive node, including decorator nodes that represent additional deployment parameters such as log retention thresholds and automated response activation.

The proof system 1206 can read the proof identifiers from the primitive node and the decorator nodes, can query the ledger system 1230 using the proof identifiers to obtain encoded states and ledger timestamps, and can provide the encoded states and ledger timestamps to the analysis circuit 136 together with the temporal metadata 1310*a* and 1310*b* stored on the primitive node and the decorator nodes. In some implementations, the analysis circuit 136 can evaluate, for the decorator node that represents the escalation contact temporal requirement, a parameterized condition 1311 that specifies a thirty day temporal interval by computing a difference between a current time and the lastVerified timestamp stored in the temporal metadata 1310*a* and by comparing the difference to the thirty day interval, and the analysis circuit 136 can determine that the decorator node is compliant when the difference is less than or equal to thirty days and that the decorator node is non compliant when the difference exceeds thirty days. For example, the analysis circuit 136 can perform similar evaluations for decorator nodes that represent log retention thresholds and automated response activation by comparing encoded states of corresponding proof identifiers and associated temporal metadata against parameters of a security control model stored in the database 140, and the analysis circuit 136 can determine node level compliance statuses for each decorator node and an aggregate compliance status for the primitive node that represents the managed detection and response security control.

In some implementations, the output modeler 1208 can generate structured output 1316 as a JSON object that includes a status field that represents the aggregate compliance status of the managed detection and response primitive node, an array of entries that represent evaluations for the primitive node and each decorator node, canonical identifiers for the primitive node and the decorator nodes, temporal metadata values for each node, and proof identifiers that can be accessed by the client device 110 or a third party computing system 150 to obtain corresponding cryptographic proof objects 1312*a* and 1312*b* from the ledger system 1230. For example, the client device 110 can present, in a dashboard generated by the content management circuit 135, a view that shows the managed detection and response primitive node as a central element, decorator nodes for escalation contacts, log retention, and automated response as connected elements, node level compliance statuses derived from the structured output 1316, and links that cause the client device 110 to access the ledger system 1230 using the proof identifiers to display underlying cryptographic proof objects 1312*a* and 1312*b* for audit review, among others.

The analysis circuit 136 can include one or more artificial intelligence models, rules, heuristics, algorithms, or functions configured to perform operations including mapping unstructured security control descriptions to canonical identifiers, extracting deployment parameters, and/or generating graph query parameters. For example, model AI model(s) 1220 can be a neural network trained to receive free-form textual descriptions of security controls and safeguards and output corresponding first canonical identifiers for primitive nodes and second canonical identifiers for decorator nodes. In some implementations, the analysis circuit 136 can generate canonical identifier pairs, parameterized conditions, and/or confidence scores as output. The output can include, for example, a first canonical identifier for a security control, a second canonical identifier for a deployment parameter, a temporal interval value, and/or a confidence value associated with each mapping. The canonical identifier pairs can be input to the analysis circuit 136 to perform storage of primitive nodes and decorator nodes in the graph storage 1210 and to perform construction of graph queries for subsequent compliance evaluation.

In some implementations, the analysis circuit 136 can maintain, execute, train, or update one or more artificial intelligence (AI) models during the graph-based security modeling stage. The AI model(s) can include transformer-based models such as generative pre-trained transformers (GPT) or bidirectional encoder representations from transformers (BERT). The analysis circuit 136 can execute the AI model(s) to produce outputs based on input data including regulatory control statements, questionnaire responses, policy documents, security tool configuration exports, and/or historical mappings between textual descriptions and canonical identifiers.

In some implementations, the analysis circuit 136 can execute one or more AI models using a modeling framework. The framework can include techniques such as gradient descent, backpropagation, and distributed training. The AI model(s) can incorporate L1 and/or L2 regularization and weight pruning to maintain computational efficiency. The analysis circuit 136 can interface with hardware accelerators such as GPUs or TPUs to meet computational requirements.

In some implementations, the analysis circuit 136 can evaluate trained models using metrics such as precision, recall, or F1 score. Evaluation can include analysis of model performance on validation datasets or test datasets to verify consistency. The analysis circuit 136 can compare model outputs with ground truth canonical identifiers and parameterized conditions to compute accuracy or error rates. The analysis circuit 136 can generate performance metrics to guide retraining or fine-tuning if criteria are unmet.

In some implementations, the analysis circuit 136 can include at least one AI model featuring an input layer, an output layer, and one or more intermediate layers. Each layer includes a set of nodes. The input layer can receive tokenized representations of security control text, deployment parameter descriptions, and/or contextual metadata such as framework identifiers or control family identifiers. The output layer can generate canonical identifiers, temporal interval values, and/or classification labels that indicate parameter types for decorator nodes. The intermediate layers can transform the tokenized representations into latent embeddings that capture relationships between security control terminology, safeguard conditions, and graph node semantics.

In some implementations, the system can configure model AI model(s) 1220 by modifying parameters such as weights or biases. These modifications are based on evaluation of estimated outputs generated in response to training inputs. The analysis circuit 136 can include neural network models configured for operating on or generating data including canonical identifiers, decorator parameter values, graph traversal hints, and/or confidence scores for mappings between unstructured text and graph node attributes.

In some implementations, the analysis circuit 136 can be trained or updated based on at least one training dataset. Training features of the dataset are provided as inputs to the analysis circuit 136 to produce estimated outputs. These outputs are compared to labeled canonical identifiers, labeled deployment parameter types, and/or labeled temporal intervals corresponding to the inputs. Parameters of model AI model(s) 1220 are updated based on the differences.

In some implementations, the analysis circuit 136 can perform pre-training of model AI model(s) 1220 on large-scale, unstructured datasets to learn foundational representations. Pre-training can use self-supervised techniques such as masked token prediction or next-token prediction. Model AI model(s) 1220 can be trained on large corpora of cybersecurity documentation, regulatory standards, security tool manuals, incident reports, and/or configuration guides to identify statistical or structural patterns. Outputs from pre-training can be used to initialize model AI model(s) 1220 for downstream fine-tuning.

In some implementations, the analysis circuit 136 can perform fine-tuning to adapt model AI model(s) 1220 to specific tasks using domain-specific datasets. The fine-tuning process can include supervised learning or reinforcement learning to refine pre-trained representations. Model AI model(s) 1220 can be updated by modifying weights or layer-specific parameters using task-specific loss functions that penalize incorrect canonical identifier assignments or incorrect parameter extractions. Techniques such as low-rank adaptation (LoRA) or adapter layers can reduce compute costs during this process.

In some implementations, the analysis circuit 136 can use retrieval-augmented generation (RAG) to incorporate external data sources into the output. The RAG model includes a retrieval system and a generation system. The retrieval system identifies documents or embeddings from knowledge sources such as the database 140, the graph storage 1210, and/or external repositories of security control definitions. The generation system produces outputs using the retrieved data to generate canonical identifiers, decorator parameter values, and/or explanatory text aligned with the retrieved security control definitions.

In some implementations, the analysis circuit 136 can apply a sparse expert-based architecture using a Mixture of Experts (MoE) model. The MoE model includes specialized sub-networks and a gating module. The gating module selects a subset of expert networks to activate per input. Model AI model(s) 1220 can include local attention for token-level dependencies and global attention for long-range dependencies in security control descriptions and deployment parameter narratives.

In some implementations, the analysis circuit 136 can execute model AI model(s) 1220 as an autonomous agent configured to decompose a task into a sequence of sub-tasks. The analysis circuit 136 can select and trigger external functions or tool interfaces based on the sub-tasks, such as calling the graph interface 1204 to store nodes or calling the proof system 1206 to obtain proof states. Model AI model(s) 1220 can monitor the state of an environment to determine subsequent operations, such as whether additional decorator nodes are to be generated for a given primitive node. The analysis circuit 136 can apply a feedback loop to verify that the output of a sub-task satisfies a completion criterion, such as successful resolution of canonical identifiers or successful validation of graph query results.

In some implementations, the analysis circuit 136 can perform multi-step reasoning using a chain-of-thought configuration. Model AI model(s) 1220 generates a series of intermediate logic steps prior to generating a final output. The analysis circuit 136 can store these intermediate steps in a data structure to guide the derivation of a solution, such as a sequence of transformations from raw text to canonical identifiers, parameterized conditions, and graph query templates. This configuration allows the analysis circuit 136 to identify and prune incorrect logical pathways during the generation process.

Referring now to FIG. 13, a block diagram of an example system 1300 for graph-based security modeling is shown, according to some implementation. The system 1300 can include input data 1302, one or more primitive nodes 1304a-1304b, one or more decorator nodes 1306a-1306c, one or more proof identifiers 1308a-1308b, one or more canonical identifiers 1309a-1309b, metadata 1310a-1310b, conditions 1311, one or more proof objects 1312a-1312n, proof data 1314a-1314b, and structured output 1316. The system 1300 can include an analysis circuit 136, a mapping system 1202, a graph interface 1204, a proof system 1206, an output modeler 1208, graph storage 1210, one or more AI model(s) 1220, and a ledger system 1230.

The system 1300 can include input data 1302. In some examples, the input data 1302 can be textual input received from internal or external sources. For example, the textual input can include free-form textual input received from questionnaires, policy frameworks, user interfaces, and/or external systems that describes security requirements, compliance controls, and/or safeguard conditions. That is, the external sources can include regulatory frameworks (e.g., NIST Cybersecurity Framework, CIS Controls, ISO 27001, HIPAA security rule, PCI DSS requirements, etc.), questionnaire platforms (e.g., security assessment questionnaires, vendor risk assessment forms, third-party audit questionnaires, compliance self-assessment tools, etc.), and/or user interface components (e.g., web-based form fields, mobile application text inputs, etc.).

In some examples, the input data 1302 can be provided to processing components for identifier extraction. For example, the input data 1302 can be transmitted to the mapping system 1202 for normalization into canonical primitive identifiers and canonical decorator identifiers that correspond to nodes stored in the graph storage 1210. That is, the normalization can include parsing operations (e.g., tokenization of input text, entity recognition of security control mentions, relationship extraction between controls and safeguards, temporal parameter identification, etc.), mapping operations (e.g., alignment of framework control language to primitive identifiers, matching of safeguard descriptions to decorator identifiers, resolution of synonym variations, disambiguation of multi-sense terms, etc.), and/or validation operations (e.g., verification of identifier uniqueness, confirmation of node existence in graph storage 1210, consistency checking across identifier mappings, error detection for unrecognized control references, etc.).

In some implementations, the input data 1302 can be generated through user interaction mechanisms. For example, the input data 1302 can be generated by users interacting with one or more client devices via user interface components that capture free-form text describing security controls to be evaluated and/or compliance requirements to be assessed. That is, the user interaction mechanisms can include text entry fields (e.g., multi-line text boxes, rich text editors, plain text input areas, auto-completing search fields, etc.), selection interfaces (e.g., dropdown menus for control selection, checkbox lists for safeguard specification, radio button groups for requirement prioritization, tag selection components, etc.), and/or import mechanisms (e.g., file upload controls for policy documents, copy-paste input areas for framework excerpts, API endpoints for programmatic submission, batch import interfaces for bulk assessment requests, etc.).

In some implementations, the input data 1302 can be processed through machine learning or natural language processing models for entity extraction. For example, the input data 1302 can be processed by the one or more AI model(s) 1220 to extract mentions of security controls and safeguard conditions, which the mapping system 1202 maps to globally unique identifiers representing primitive nodes and decorator nodes. In other examples, the input data 1302 can be processed using rule-based or deterministic parsing techniques, such as pattern matching or regular expression rules.

In some implementations, the mapping system 1202 can execute decomposition operations on the input data 1302. For example, the mapping system 1202 can decompose the input data 1302 into discrete primitives and decorators by applying natural language processing operations to identify security control references and associated deployment parameters embedded in the unstructured text. That is, the decomposition operations can include parsing activities (e.g., sentence segmentation of control statements, clause separation within complex requirements, phrase extraction from policy language, token classification for entity boundaries, etc.), classification activities (e.g., categorization of text spans as primitive references, labeling of phrases as decorator conditions, distinction between control descriptions and safeguard specifications, identification of temporal constraint expressions, etc.), and/or normalization activities (e.g., conversion of synonym variants to canonical terms, standardization of temporal expressions to interval parameters, mapping of vendor-specific terminology to generic identifiers, resolution of ambiguous control references, etc.).

The analysis circuit 136 can provide the identifier or other information from the input data 1302 to the mapping system 1202 and/or graph interface 1204 to store one or more primitive nodes 1304a-1304b and one or more decorator nodes 1306a-1306c in the graph storage. The one or more primitive nodes 1304a-1304b can be node records stored in the graph storage 1210 that represent security controls deployed in network infrastructure of an entity, each primitive node having a globally unique primitive identifier. That is, each primitive node can represent a discrete security control type such as managed detection and response, multifactor authentication, vulnerability management, or endpoint protection, and can be assigned a canonical identifier that uniquely identifies the security control across the graph storage 1210. For example, the primitive node 1304a can represent a managed detection and response control deployed in the network infrastructure, and can be stored with a canonical identifier 1309a that uniquely identifies the managed detection and response control, while the primitive node 1304*b* can represent a multifactor authentication control deployed in the network infrastructure, and can be stored with a canonical identifier that uniquely identifies the multifactor authentication control. The one or more primitive nodes 1304*a*-1304*b* can also include metadata 1310*a*-1310*b* representing temporal information, and the one or more proof identifiers 1308*a*-1308*b* that reference cryptographic proof objects stored in the ledger system 1230. For example, the graph interface 1204 can store the one or more primitive nodes 1304*a*-1304*b* by executing graph database insertion operations that create node records in the graph storage 1210 and assign globally unique identifiers to each primitive node based on the input data 1302.

In some implementations, the one or more primitive nodes 1304*a*-1304*b* can be linked to one or more decorator nodes 1306*a*-1306*c* by graph edge relationships that indicate deployment parameters applied to the security controls represented by the primitive nodes. That is, each decorator node can represent a discrete safeguard condition, constraint, or quantifier associated with a particular security control, and can be assigned a globally unique decorator identifier that uniquely identifies the deployment parameter across the graph storage 1210. For example, the decorator node 1306*a* can represent an escalation contacts defined parameter, the decorator node 1306*b* can represent an escalation contacts updated within thirty days parameter, and the decorator node 1306*c* can represent an automated response activated parameter, where each decorator node can be stored with a respective canonical identifier and linked to corresponding primitive nodes via graph edges. The one or more decorator nodes 1306*a*-1306*c* can also include metadata (e.g., metadata 1310*a*-1310*b*) representing temporal information and/or conditions (e.g., conditions 1311) that specify parameterized constraints, and proof identifiers that reference cryptographic proof objects in the ledger system 1230. The graph interface 1204 can store the one or more decorator nodes 1306*a*-1306*c* by executing graph database insertion operations that create node records in the graph storage 1210, assign globally unique identifiers to each decorator node, and establish edge relationships between decorator nodes and primitive nodes.

In some implementations, the one or more decorator nodes 1306*a*-1306*c* can be composable. For example, a decorator nodes can be linked to multiple primitive nodes by graph edge relationships, such that a single decorator node representing a deployment parameter can be reused across multiple security controls without creating duplicate representations (e.g., the decorator node 1306*b* can be linked to both the primitive node 1304*a* and the primitive node 1304*b* by respective edges). The graph interface 1204 can query the one or more decorator nodes 1306*a*-1306*c* by canonical identifier during compliance evaluation operations, can traverse graph edges to identify all decorator nodes associated with a given primitive node, and can retrieve node attributes including proof identifiers, temporal metadata, and parameterized conditions to determine compliance status. The one or more decorator nodes 1306*a*-1306*c* can be updated by the proof system 1206 when new proof artifacts are recorded in the ledger system 1230, such that temporal metadata fields in the decorator nodes reflect current verification times for the deployment parameters.

In some examples, the one or more proof identifiers 1308*a*-1308*b* can be unique identifiers that reference cryptographic proof artifacts for respective primitive or decorator nodes. That is, the unique identifiers can reference proof artifacts stored in the ledger system 1230 and associated with corresponding primitive nodes or decorator nodes in the graph storage 1210. In some examples, the one or more proof identifiers 1308*a*-1308*b* can be retrieved for proof verification operations. That is, the retrieval can be performed by the proof system 1206 to query the ledger system 1230 and obtain encoded states or status indicators (e.g., proof data 1314*a*-1314*b*). For example, the encoded states or status indicators can include proof artifact states (e.g., valid proof states, expired proof states, revoked proof states, pending verification states, etc.), temporal information (e.g., proof creation timestamps, proof expiration timestamps, last verification timestamps, proof update timestamps, etc.), and/or cryptographic verification results (e.g., digital signature validation results, hash digest comparison results, certificate chain verification outcomes, etc.) for evaluation against policy requirements to determine compliance status.

In some implementations, the one or more proof identifiers 1308*a*-1308*b* can be stored as attributes within nodes. That is, attributes can be stored in the primitive nodes 1304*a*-1304*b* and the decorator nodes 1306*a*-1306*c* such that each node maintains a reference to a corresponding proof object. For example, each node can include a proof identifier field (e.g., a proof identifier string stored in a node attribute, a proof identifier pointer stored in a node property, a proof identifier reference stored in a node metadata field, etc.) that links the node to a proof object 1312*a*-1312*n* in the ledger system 1230, allowing the proof system 1206 to retrieve the proof object by reading the proof identifier from the node record and querying the ledger system 1230 using the proof identifier.

In some examples, the one or more proof identifiers 1308*a*-1308*b* can be used for compliance determination operations. That is, the compliance determination can be performed by the analysis circuit 136 by verifying whether the states of the proof identifiers satisfy policy conditions. For example, the policy conditions can include temporal interval requirements (e.g., proof verification within thirty days, proof update within ninety days, proof expiration before a specified date, etc.), proof state requirements (e.g., proof is to be in a valid state, proof is not to be in a revoked state, proof is to have been verified by an authorized entity, etc.), and/or cryptographic validation requirements (e.g., proof is expected have a valid digital signature, proof is expected to have a matching hash digest, proof is to be signed by a trusted certificate authority, etc.).

In some examples, the proof system 1206 can receive updated proof identifiers for node updates. That is, the updated proof identifiers can be received when new proof artifacts are recorded in the ledger system 1230, and the proof system 1206 can update corresponding nodes in the graph storage 1210. For example, the update can include modifying node attributes to reflect new verification times and proof references (e.g., updating a lastVerifiedDate timestamp in the metadata 1310*a*-1310*b*, replacing a previous proof identifier with a new proof identifier, recording a proof artifact creation timestamp, updating a proof state indicator, etc.), such that the node records in the graph storage 1210 maintain current associations with the recent proof artifacts stored in the ledger system 1230.

The system 1300 can include one or more canonical identifiers 1309*a*-1309*b*. In some examples, the one or more canonical identifiers 1309*a*-1309*b* can be identifiers that reference nodes stored in the graph storage 1210. That is, the one or more canonical identifiers 1309*a*-1309*b* can be assigned to primitive nodes and decorator nodes to uniquely identify security controls and deployment parameters. For example, the identifiers can be globally unique identifiers that provide unambiguous references to security controls or associated parameters across multiple regulatory frameworks In some examples, the one or more canonical identifiers 1309*a*-1309*b* can include identifier types. That is, the identifier types can include standardized identifier strings, universally unique identifiers, and/or namespace-qualified identifiers that provide unambiguous references. For example, the standardized identifier strings can be alphanumeric strings (e.g., UUID strings, GUID strings, hash-based identifiers, namespace-prefixed identifiers, etc.), universally unique identifiers can be RFC 4122 UUIDs (e.g., version 4 random UUIDs, version 5 namespace-based UUIDs, timestamp-based UUIDs, etc.), and/or namespace-qualified identifiers can be hierarchical identifiers (e.g., dotted-notation identifiers, URN-format identifiers, fully-qualified domain names, hierarchical namespace paths, etc.).

In some implementations, the one or more canonical identifiers 1309*a*-1309*b* can support multi-framework referencing. That is, the one or more canonical identifiers 1309*a*-1309*b* can be model-agnostic identifiers that are operable to allow a single primitive node or decorator node to be referenced by multiple regulatory frameworks or compliance models without creating duplicates to represent the same meaning.

Generally, model-agnostic identifiers can encode security control semantics and deployment parameter semantics in a format that does not embed framework-specific numbering or naming so that the same canonical identifier value can be used across different security control models such as NIST Cybersecurity Framework, CIS Controls, and ISO 27001. That is, model-agnostic identifiers can decouple internal graph node identity from external framework identifiers by representing each security control and each deployment parameter with a stable canonical identifier 1309*a*-1309*b* while storing framework-specific control identifiers and clause references as additional attributes or mappings associated with the corresponding primitive nodes 1304*a*-1304*b* and decorator nodes 1306*a*-1306*c*. In some implementations, model-agnostic identifiers can follow a namespace scheme that encodes a control family and a control function in a provider-neutral syntax (e.g., "ctrl.mdr.global" for a managed detection and response primitive node or "dec.scan.30d" for a thirty-day scan interval decorator node) and separate mapping tables in the database 140 can relate those canonical identifiers 1309*a*-1309*b* to framework-specific identifiers such as "NIST-CSF:DE.CM-7" or "CIS: 8.2.1", among others. For example, the analysis circuit 136 can receive a request that references a NIST control identifier, can look up the corresponding canonical identifier 1309*a* in a mapping table, can use the canonical identifier 1309*a* to query the graph storage 1210 for the associated primitive node 1304*a*, and can evaluate decorator nodes 1306*a*-1306*c* linked to that primitive node 1304*a* without requiring separate node instances for each framework.

In some examples, the one or more canonical identifiers 1309*a*-1309*b* can be used in query execution operations. That is, the graph interface 1204 can execute graph queries using the one or more canonical identifiers 1309*a*-1309*b* to locate specific primitive nodes and decorator nodes. For example, the graph queries can locate primitive nodes (e.g., primitive node 1304*a* representing managed detection and response, primitive node 1304*b* representing multifactor authentication, etc.) and decorator nodes (e.g., decorator node 1306*a* representing escalation contact definitions, decorator node 1306*b* representing temporal update requirements, decorator node 1306*c* representing automated response activation, etc.), and the graph interface 1204 can traverse graph relationships to identify all decorator nodes associated with a given primitive node identified by a canonical identifier (e.g., following HAS_DECORATOR edges from a primitive node to connected decorator nodes, executing graph traversal algorithms to discover decorator node subgraphs, retrieving adjacency lists for primitive nodes, querying relationship tables linking primitive identifiers to decorator identifiers, etc.).

In some examples, the metadata 1310*a*-1310*b* can be temporal metadata maintained for nodes stored in the graph storage 1210. That is, the temporal metadata can include timestamps that record when nodes were last updated or verified, such as timestamps for primitive nodes or decorator nodes. For example, the timestamps can include update timestamps (e.g., lastUpdated fields, modification timestamps, configuration change timestamps, deployment event timestamps, etc.) or verification timestamps (e.g., lastVerifiedDate fields, proof artifact verification timestamps, compliance check timestamps, audit event timestamps, etc.) associated with security controls or deployment parameters represented by the nodes. In some examples, the metadata 1310*a*-1310*b* can be accessed during evaluation operations. That is, the metadata 1310*a*-1310*b* can be retrieved by processing components to determine whether temporal metadata satisfies time-based requirements.

In some implementations, the metadata 1310*a*-1310*b* can be updated responsive to external or internal events. That is, the metadata 1310*a*-1310*b* can be modified when proof artifacts are recorded or when verification events occur, or when security controls or deployment parameters change. For example, the updating can include modification by the proof system 1206 (e.g., writing new timestamp values, replacing previous verification timestamps, recording proof artifact creation times, updating temporal fields in node attributes, etc.) when new proof artifacts are recorded in the ledger system 1230, such that the temporal metadata reflects the most recent verification time for each security control or deployment parameter.

In some examples, the metadata 1310*a*-1310*b* can be used for temporal interval evaluation. That is, the metadata 1310*a*-1310*b* can be compared against time-based conditions to determine compliance status for a particular node or for a combination of nodes (e.g., for a portion of all of an entity network infrastructure). For example, the evaluation can include computing time differences between current time or last-verified timestamps, comparing elapsed intervals against temporal thresholds, determining whether verification times satisfy time-based requirements, or evaluating parameterized conditions in decorator nodes that specify temporal intervals (e.g., updated within thirty days requirements, verified within ninety days specifications, scanned within seven days constraints, reviewed within one year intervals, etc.). In some examples, the metadata 1310*a*-1310*b* can support historical tracking operations. That is, the metadata 1310*a*-1310*b* can be maintained as node attributes that facilitate tracking of changes overtime.

In some examples, decorator nodes (e.g., decorator node 1306*a*) can include conditions (e.g., conditions 1311). For example, the conditions 1311 can be parameterized conditions that specify temporal intervals, threshold values, or constraint expressions that define when a deployment parameter satisfies compliance requirements. In some implementations, a parameterized condition can include one or more parameters stored as properties of the decorator node, such as an interval unit and interval value for a time-based requirement (e.g., a condition expecting that vulnerability scans be performed within a specified number of days, such as thirty days, represented by parameters like intervalUnit="days" and intervalValue=30), a numeric threshold for a quantitative safeguard (e.g., a condition expecting that log retention be configured at or above a specified number of days, such as ninety days, represented by parameters like retentionDaysThreshold=90), or a constraint expression that encodes allowable values or ranges for a configuration setting (e.g., a condition expecting that multifactor authentication be activated for selected user groups or applications, represented by parameters that identify expected factors, covered user roles, or permitted authentication methods).

In some examples, the conditions 1311 can be evaluated to determine whether the difference between current time and the last-verified timestamp satisfies a temporal interval specified in the conditions 1311. For example, the evaluation can include retrieval operations (e.g., reading lastVerifiedDate fields from metadata 1310*a*-1310*b*, extracting timestamp values from node attributes, accessing temporal fields from decorator nodes, querying temporal metadata from graph storage 1210, etc.), computation operations (e.g., calculating time difference between current timestamp and last-verified timestamp, computing elapsed intervals in specified units, converting timestamps to comparable formats, normalizing time zones for comparison, etc.), or comparison operations (e.g., determining whether computed difference is less than specified interval, checking whether elapsed time exceeds threshold, evaluating whether verification timestamp falls within acceptable window, assessing whether temporal constraint is satisfied, etc.).

In some examples, the structured output 1316 can include compliance status indicators that are set by the output modeler 1208 based on evaluation of the conditions 1311 (e.g., generating pass or fail determinations for each decorator node evaluated against its parameterized conditions). For example, the pass or fail determinations can include status indicator types (e.g., pass status indicating temporal constraint satisfied, fail status indicating elapsed time exceeded threshold, pending status indicating verification approaching deadline, not applicable status indicating condition does not apply to node, etc.), status representation formats (e.g., Boolean pass or fail flags, enumerated status codes, textual status labels, numerical compliance scores, etc.), or status aggregation operations (e.g., combining node-level status indicators into overall compliance determination, computing aggregate compliance percentage across decorator nodes, identifying critical failures among evaluated nodes, generating summary status for primitive node based on linked decorator statuses, etc.).

In some examples, the one or more proof objects 1312*a*-1312*n* can be cryptographic artifacts that provide verifiable evidence for security operations. For example, the verifiable evidence provided can include implementation records, configuration data, and/or verification events (e.g., cryptographically signed configuration snapshots documenting security control deployments, audit log entries recording parameter changes, verification attestations confirming safeguard implementations, tamper-evident records preserving compliance verification timestamps, etc.). In some examples, the one or more proof objects 1312*a*-1312*n* can be stored in a proof ledger (e.g., ledger system 1230) to support immutability and facilitate access for verification.

The proof data 1314*a*-1314*b* can be data elements embedded in proof objects. That is, the data elements can be embedded in the one or more proof objects 1312*a*-1312*n* and can be accessed by processing components (e.g., the proof system 1206, the analysis circuit 136, verification services communicating with the ledger system 1230, external audit platforms querying the ledger system 1230, etc.). For example, the proof data 1314*a*-1314*b* can include encoded states (e.g., valid proof states, expired proof states, revoked proof states, pending verification states, etc.), verification timestamps (e.g., lastVerifiedDate timestamps, proof creation timestamps, proof expiration timestamps, ledger recording timestamps, etc.), cryptographic signatures (e.g., digital signature blocks, hash digest values, certificate chain references, timestamped attestations, etc.), and/or other information used by the proof system 1206 to verify compliance status. That is, the proof data 1314*a*-1314*b* can include data structures (e.g., JSON-formatted data structures, binary-encoded state values, XML documents, cryptographic hash digests, etc.) that represent the state of a security control or deployment parameter at the time the proof object was recorded in the ledger system 1230. For example, the data structures can represent states including security control deployment states (e.g., managed detection and response active states, multifactor authentication activated states, vulnerability management operational states, endpoint protection deployment states, etc.), deployment parameter states (e.g., escalation contact definition states, temporal update requirement satisfaction states, automated response activation states, configuration threshold compliance states, etc.), and/or temporal verification states (e.g., verification completion timestamps, proof artifact recording times, compliance check execution times, safeguard validation times, etc.).

The proof data 1314*a*-1314*b* can be extracted and processed by system components. That is, the proof data 1314*a*-1314*b* can be extracted by the proof system 1206 from the one or more proof objects 1312*a*-1312*n* and passed to the analysis circuit 136 for comparison against policy requirements or parameterized conditions in decorator nodes. In some implementations, the proof data 1314*a*-1314*b* can include temporal information. That is, the temporal information can include verification timestamps and/or expiration times that the analysis circuit 136 uses to evaluate time-based compliance requirements. The proof data 1314*a*-1314*b* can include cryptographic attestations. That is, the cryptographic attestations can include cryptographic signatures and/or attestations generated by external verification services or monitoring systems that can be used to verify authenticity and integrity. For example, the cryptographic attestations can include signature types (e.g., digital signature blocks generated by certificate authorities, hash digest values computed by monitoring systems, timestamped attestations from external verification services, cryptographic proof chains from distributed ledger nodes, etc.), attestation metadata (e.g., signer identity information, certificate chain references, signature algorithm identifiers, timestamp authority identifiers, etc.), and/or validation parameters (e.g., public key references, certificate validity periods, signature verification algorithms, hash comparison methods, etc.). The analysis circuit 136 can generate compliance status indicators based on evaluation of the proof data 1314*a*-1314*b*. The system 1300 can include structured output 1316.

In some examples, the structured output 1316 can be a machine-readable data object generated by the output modeler 1208 based on evaluations of metadata and/or proof data. That is, the machine-readable data object can contain compliance evaluation results, node-level status indicators, and proof references for security controls and deployment parameters. For example, the compliance evaluation results can include status field values (e.g., pass status indicators, fail status indicators, pending status indicators, not applicable status indicators, etc.), node-level status indicators can include evaluation outcomes (e.g., primitive node compliance determinations, decorator node compliance determinations, temporal requirement satisfaction indicators, proof state validation results, etc.).

In some examples, the structured output 1316 can be a JSON-formatted object. That is, the JSON-formatted object can include a final evaluation status field representing overall compliance state and an array of individual node evaluations. For example, the final evaluation status field can represent aggregate compliance states (e.g., overall pass determinations, overall fail determinations, partial compliance indicators, compliance percentage values, etc.), and the array of individual node evaluations can indicate pass or fail status for each primitive node and decorator node evaluated during a compliance assessment (e.g., primitive node evaluation entries, decorator node evaluation entries, temporal metadata compliance indicators, proof state verification results, etc.).

In some examples, the structured output 1316 can be transmitted by the output modeler 1208. That is, the transmission can be to one or more client devices or third party devices via a network, or to downstream consumers, applications, or microservices. For example, the transmission can be performed to facilitate processing operations (e.g., user interface rendering, report generation, dashboard updates, compliance visualization, etc.), audit reporting operations (e.g., audit trail generation, evidence compilation, regulatory submission preparation, certification documentation, etc.), and/or compliance certification workflows (e.g., third-party certification processes, attestation generation, compliance badge issuance, regulatory approval workflows, etc.).

In some implementations, the structured output 1316 can include proof references. That is, the proof references can link each evaluated node to corresponding proof identifiers in the ledger system 1230. For example, the linking can allow downstream systems to verify compliance determinations against cryptographically secured proof artifacts (e.g., distributed ledger queries, blockchain state reads, cryptographic signature verification, hash digest validation, etc.), the downstream systems can include external verification services (e.g., third-party audit platforms, certification authorities, regulatory compliance systems, GRC platforms, etc.), and the cryptographically secured proof artifacts can include ledger entries (e.g., timestamped attestations, digital signature blocks, hash chain records, transaction logs, etc.). In some examples, the structured output 1316 can include temporal metadata, canonical identifiers, and encoded states.

In some examples, the output modeler 1208 can format the structured output 1316. That is, the formatting can be according to API specifications or data exchange standards. For example, the API specifications can include interface definitions (e.g., RESTful API schemas, GraphQL query schemas, SOAP message formats, microservice endpoint specifications, etc.), and the data exchange standards can include interoperability protocols (e.g., JSON schema definitions, XML document type definitions, binary encoding specifications, data serialization formats, etc.) that facilitate interoperability with third-party compliance platforms (e.g., GRC systems, audit management tools, compliance reporting platforms, regulatory submission systems, etc.).

Figure 14:
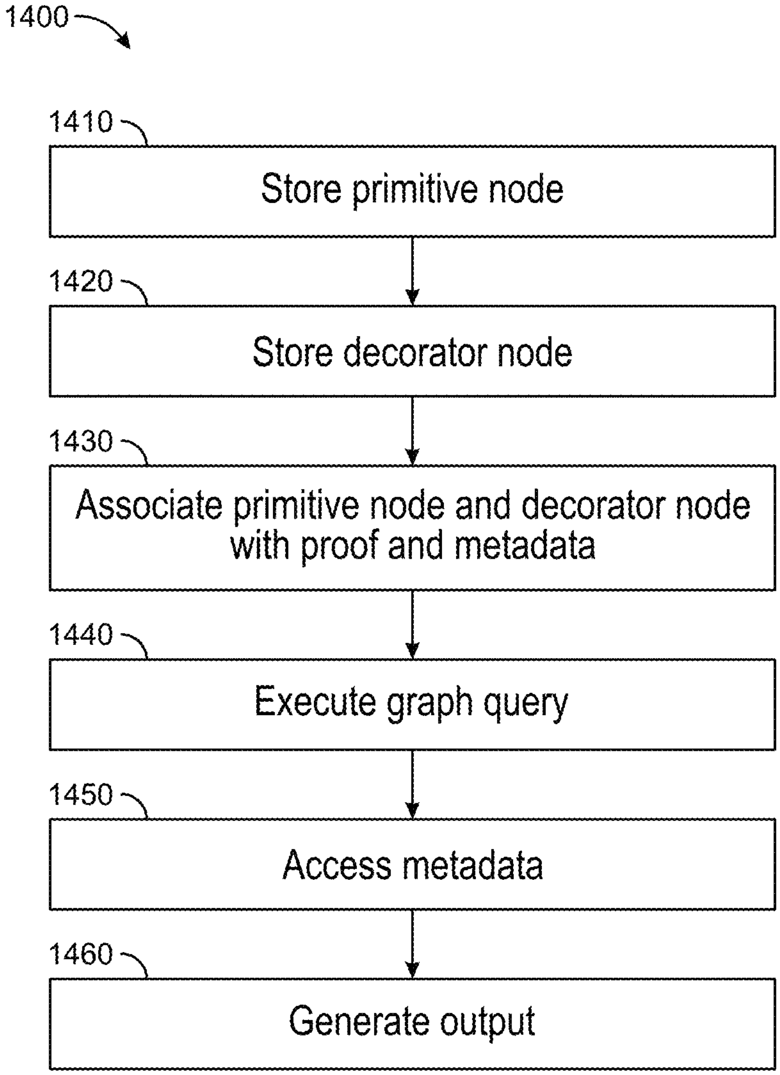
FIG. 14 depicts a flow diagram of an example method for graph-based security modeling, according to some implementations.

Referring now to FIG. 14, a flow diagram of a method 1400 for graph-based security modeling is shown. The method 1400 can be executed, performed, or otherwise carried out by various computing systems or devices described herein (e.g., the analysis circuit 136 of FIG. 12 or FIG. 13, one or more processors, etc.). In brief overview of the method 1400, the method 1400 can include storing a primitive node at block 1410, storing a decorator node at block 1420, associating the primitive node and the decorator node with proof and metadata at block 1430, executing a graph query at block 1440, accessing metadata at block 1450, and generating an output at block 1460. In some examples, the method 1400 can include additional or fewer blocks or operations, and blocks or operations can be reorganized, modified, omitted, bypassed, or added in various examples.

In some implementations, block 1410 can include generating, receiving, providing, storing, and/or otherwise processing a data element (e.g., node). For example, block 1410 can include storing, by one or more processors, in a graph structure, at least one primitive node representing a security control deployed in a network infrastructure of an entity. In some examples, storing can include the one or more processors identifying a security control to be modeled as a primitive node (e.g., a managed detection and response service, a multifactor authentication system, an endpoint protection platform, a vulnerability management scanner, etc.) based on configuration data, inventory feeds, or user input received from administrative interfaces. In some implementations, storing can include the one or more processors generating a primitive node data object in memory, assigning a unique node identifier to the primitive node (e.g., a numeric identifier, a universally unique identifier, or a structured namespace identifier), and populating one or more properties of the node data object with attributes of the security control (e.g., control name, control type, deployment scope, associated systems or applications, etc.).

In some examples, storing can include the one or more processors writing the primitive node data object and its properties to a graph database or graph storage service that maintains the graph structure, such as persisting the node to non-transitory storage, updating internal indices that map node identifiers to storage locations, and registering the node in adjacency structures used to track edges between primitive nodes and decorator nodes. In some implementations, storing can further include the one or more processors establishing relationships between the primitive node and representations of the network infrastructure of the entity, such as associating the primitive node with identifiers of networks, hosts, applications, or cloud accounts in which the security control is deployed (e.g., linking the managed detection and response primitive node to a set of monitored endpoints, linking a multifactor authentication primitive node to specific identity providers or directories, etc.), so that subsequent evaluation and reporting operations can take into account the deployment context of the security control.

The at least one primitive node can be stored in association with a first canonical identifier corresponding with the security control. In some examples, storing the primitive node in association with the first canonical identifier can include the one or more processors assigning a canonical identifier value the primitive node data object and persisting the canonical identifier value in the graph structure together with the primitive node. In some implementations, storing the primitive node in association with the first canonical identifier can include the one or more processors updating one or more indices in the graph database that map canonical identifier values to primitive node identifiers, allowing subsequent queries that reference the first canonical identifier to resolve directly to the corresponding primitive node. In some examples, storing the primitive node in association with the first canonical identifier can include the one or more processors receiving the first canonical identifier from a normalization or mapping process that converts heterogeneous control descriptions into framework-agnostic identifiers (e.g., mapping free-form text describing a security control from a questionnaire, regulatory framework, or policy document to a canonical identifier used by the graph structure) and recording the association between the normalized identifier and the primitive node representing the deployed security control.

In some implementations, block 1420 can include generating, receiving, providing, storing, and/or otherwise processing a data element (e.g., node). For example, block 1420 can include storing, by the one or more processors, in the graph structure, at least one decorator node representing a deployment parameter corresponding with the security control. In some examples, storing the at least one decorator node can include the one or more processors identifying a deployment parameter to be modeled as a decorator node (e.g., escalation contacts defined for a security control, escalation contacts updated within a specified time interval, automated response actions activated, log retention configured above a threshold, scan frequency configured to a particular cadence, etc.) based on configuration data, policy definitions, or administrative input.

In some implementations, storing the at least one decorator node can include the one or more processors generating a decorator node data object in memory, assigning a unique node identifier to the decorator node, and setting one or more properties of the decorator node to represent attributes of the deployment parameter (e.g., parameter type, parameter value, applicable scope, associated configuration keys, temporal or threshold values, etc.). In some examples, storing the at least one decorator node can include the one or more processors writing the decorator node data object and associated properties to the graph database or graph storage service used for the graph structure, including persisting the decorator node in non-transitory storage, updating indices that map decorator node identifiers and parameter attributes to storage locations, and registering the decorator node in adjacency structures that represent relationships between decorator nodes and corresponding primitive nodes.

The at least one decorator node can be stored in association with a second canonical identifier corresponding with the deployment parameter and linked to the at least one primitive node by an edge indicating the deployment parameter is applied to the security control in the network infrastructure. In some examples, storing the at least one decorator node in association with the second canonical identifier can include the one or more processors assigning a canonical identifier value the decorator node (e.g., based on a mapping from unstructured or free-form input data using a language model such as an LLM or rule-based model) and persisting the canonical identifier value in the graph structure. In some implementations, linking the at least one decorator node to the at least one primitive node by an edge can include the one or more processors creating an edge record in the graph structure that references identifiers of the primitive node and the decorator node, assigning an edge type or label that denotes application of the deployment parameter to the security control (e.g., a HAS_DECORATOR edge) and storing the edge record in the graph database so that traversal operations can follow the edge from the primitive node to the decorator node. In some examples, linking the decorator node to the primitive node can include the one or more processors updating adjacency lists or neighbor sets associated with the primitive node and the decorator node (e.g., adding the decorator node identifier to a list of deployment parameters associated with the primitive node, adding the primitive node identifier to a list of controls associated with the decorator node) to allow graph queries to discover a number of (e.g., all) deployment parameters applied to a given security control or a number of (e.g., all) security controls that use a particular deployment parameter in the network infrastructure.

In some implementations, block 1430 can include linking, associating, and/or otherwise relating data elements (e.g., nodes). For example, block 1430 can include associating, by the one or more processors, the at least one primitive node and the at least one decorator node with (i) at least one cryptographic proof recorded on a distributed ledger or blockchain storage and (ii) temporal metadata representing a time of verification of the security control or the deployment parameter. In some examples, associating the at least one primitive node and the at least one decorator node with the at least one cryptographic proof can include the one or more processors writing one or more proof identifiers as properties of each node, where each proof identifier references a corresponding record in the distributed ledger or blockchain storage (e.g., a transaction identifier, a block hash, an application-level proof key, etc.) that encodes evidence of deployment or verification of the security control or deployment parameter. In some implementations, associating the at least one primitive node and the at least one decorator node with temporal metadata can include the one or more processors writing timestamp values as node properties that represent verification times (e.g., lastVerified timestamps, lastUpdated timestamps, verificationIntervalStart and verificationIntervalEnd timestamps, etc.) derived from proof ingestion events, configuration changes, or explicit verification actions. In some examples, associating can further include the one or more processors updating the temporal metadata when new cryptographic proof records are written to or detected in the distributed ledger or blockchain storage for a given proof identifier, such as recording a new verification time when a fresh configuration snapshot is notarized, when a new attestation is submitted to the ledger, or when a monitoring system reports successful implementation of a safeguard.

In some implementations, block 1440 can include executing, using, and/or otherwise performing a command (e.g., query). For example, block 1440 can include executing, by the one or more processors, executing, by the one or more processors, a graph query against the graph structure. The graph query can be executed responsive at least in part to a request for a status of the security control or the deployment parameter, and can include at least one of the first canonical identifier or the second canonical identifier. In some examples, executing the graph query can include the one or more processors constructing a query expression that references the first canonical identifier and/or the second canonical identifier as filter criteria (e.g., selecting primitive nodes whose canonical identifier property matches the first canonical identifier, selecting decorator nodes whose canonical identifier property matches the second canonical identifier, etc.) and submitting the query expression to a graph database engine that maintains the graph structure. In some implementations, executing the graph query can include the one or more processors performing a traversal operation that locates one or more primitive nodes based on the first canonical identifier and then follows edges to associated decorator nodes, or that locates one or more decorator nodes based on the second canonical identifier and then follows edges to associated primitive nodes, depending on the content of the status request. In some examples, the request for a status of the security control or the deployment parameter can be received from a client system or subsystem (e.g., a compliance dashboard, an audit tool, an underwriting platform, a third-party risk management system, etc.), and the one or more processors can parse the request to extract canonical identifiers, construct the graph query based on the extracted identifiers, and execute the graph query to retrieve the subset of nodes in the graph structure that correspond to the security control and/or the deployment parameter identified in the request.

In some implementations, block 1450 can include identifying, receiving, accessing, and/or otherwise processing data (e.g., metadata). For example, block 1450 can include accessing, by the one or more processors, based at least in part on execution of the graph query, the temporal metadata representing the time of verification and the at least one cryptographic proof from the distributed ledger or blockchain storage. In some examples, accessing the temporal metadata can include the one or more processors reading timestamp properties stored on the primitive node and the decorator node identified by the graph query (e.g., lastVerified timestamps, lastUpdated timestamps, verification window start and end times, etc.) and loading the timestamp values into memory structures used by evaluation logic. In some implementations, accessing the at least one cryptographic proof can include the one or more processors extracting proof identifiers from properties of the primitive node and the decorator node and invoking a proof retrieval routine that communicates with the distributed ledger or blockchain storage to obtain encoded proof records (e.g., transaction payloads, block headers including timestamps and hashes, proof objects including signed configuration snapshots or attestations, etc.). In some examples, accessing can further include the one or more processors correlating the temporal metadata read from the graph structure with timestamp or validity information included in the retrieved cryptographic proof records, and preparing combined verification data for subsequent determination of whether the security control or the deployment parameter satisfies applicable time-based or state-based evaluation criteria.

In some implementations, block 1460 can include providing, constructing, and/or otherwise generating data (e.g., outputs). For example, block 1460 can include generating, by the one or more processors, a structured output corresponding to the request, the structured output indicating the status of the security control or the deployment parameter and an association to the at least one cryptographic proof In some examples, generating the structured output can include the one or more processors constructing a machine-readable data object that includes one or more status fields derived from evaluation of the temporal metadata and the cryptographic proof data (e.g., fields indicating pass or fail for a safeguard, compliant or non-compliant for a deployment parameter, informational or warning states for partially satisfied conditions, etc.) and one or more fields that encode proof associations (e.g., proof identifiers, proof types, verification timestamps, etc.). In some implementations, generating the structured output can include the one or more processors formatting the machine-readable data object according to a structured representation (e.g., a JSON document, an XML document, a protocol buffer message, etc.) that organizes evaluation results for primitive nodes and decorator nodes into arrays or collections, includes metadata about the request and evaluation context, and embeds proof identifier values that can be used by downstream systems to retrieve corresponding cryptographic proof artifacts from the distributed ledger or blockchain storage. In some examples, generating the structured output can include the one or more processors populating the structured output with node-level entries for each evaluated security control or deployment parameter, where each node-level entry includes a status indicator, a last-verified time derived from the temporal metadata, and a reference to at least one cryptographic proof, allowing consuming systems to render human-readable reports, drive automated workflows based on evaluation results, or perform independent verification of the reported status using the referenced proof artifacts.

In some implementations, the method 1400 can include configuring, by the one or more processors, a data channel or communication interface to access the network infrastructure of the entity. In some examples, configuring the data channel or communication interface can include the one or more processors establishing network connections and protocol settings that facilitate retrieval of configuration data, telemetry, or control state information from systems within the network infrastructure (e.g., configuring secure API clients to interact with security tools, setting up agent-based or agentless connectors to query endpoint protection platforms, configuring log collectors to receive event streams from intrusion detection systems, etc.). In some implementations, configuring the data channel or communication interface can include the one or more processors provisioning authentication credentials and authorization scopes used to access security control telemetry (e.g., API keys, OAuth tokens, service accounts, certificates, etc.), specifying target endpoints or resource identifiers corresponding to systems in the network infrastructure (e.g., addresses for management consoles, cloud service APIs, configuration management databases, etc.), and setting communication parameters such as encryption settings, retry policies, and rate limits. In some examples, configuring the data channel or communication interface can include the one or more processors registering callback endpoints or subscription mechanisms that allow security tools and infrastructure components to push updates about security control configurations or deployment parameters to the analysis system (e.g., webhooks for configuration changes, message queue subscriptions for scan completion events, streaming interfaces for control status changes) to allow retrieval of real-time control information from the network infrastructure of the entity.

In some implementations, the method 1400 can include monitoring, by the one or more processors, the network infrastructure of the entity using the data channel or communication interface. In some examples, monitoring can include the one or more processors periodically invoking application programming interfaces exposed by security controls or infrastructure components to retrieve configuration states, status indicators, or event summaries (e.g., polling endpoint protection platforms for current policy versions, querying vulnerability management tools for recent scan results, calling identity provider APIs for multifactor authentication configuration status, etc.). In some implementations, monitoring can include the one or more processors subscribing to event streams or log feeds delivered over the data channel or communication interface and processing received messages to detect changes in security control deployments or deployment parameters (e.g., consuming syslog events indicating rule changes on firewalls, reading audit logs indicating updates to escalation contact lists, receiving notifications that automated response capabilities have been activated or disabled, etc.). In some examples, monitoring can include the one or more processors applying filtering, normalization, and aggregation operations to raw telemetry obtained from the network infrastructure (e.g., deduplicating repeated configuration events, correlating events across multiple systems that relate to the same security control, summarizing status across clusters or regions, etc.) and generating normalized control state representations that can be used to update primitive nodes and decorator nodes in the graph structure.

In some implementations, the method 1400 can include automatically detecting, by the one or more processors, responsive at least in part to monitoring the network infrastructure, an update to at least one of the security control or the deployment parameter. In some examples, automatically detecting the update can include the one or more processors comparing newly received configuration data or telemetry with previously stored baseline values for a given security control or deployment parameter (e.g., detecting a change in a managed detection and response configuration, detecting that a vulnerability scan schedule has been modified, detecting that escalation contact information has been edited, etc.) and determining that a meaningful difference exists that constitutes an update event. In some implementations, automatically detecting the update can include the one or more processors applying change-detection logic or rules to normalized events obtained from the network infrastructure (e.g., treating a new policy version identifier, a modified configuration hash, or an updated timestamp in a control status record as an indication that the underlying control or deployment parameter has changed) and generating internal update notifications associated with the corresponding primitive node or decorator node. In some examples, automatically detecting the update can include the one or more processors correlating multiple telemetry sources related to the same security control or deployment parameter (e.g., combining events from a configuration management system, a security information and event management system, and a cloud control plane API) to determine that an update has occurred. For example, such operations can reduce false positives and verify that only substantive changes to the security control or deployment parameter trigger subsequent graph updates and proof or metadata refresh operations.

Generally, automatically detecting an update can refer to operations in which the one or more processors execute change detection logic without receiving an explicit user command for each detection cycle (e.g., without a per-scan button press, without a per-event confirmation, and/or without a manual refresh request). That is, the one or more processors can obtain configuration snapshots and/or event records from the network infrastructure according to a schedule or trigger condition (e.g., periodic polling intervals, event-driven callbacks, and/or any timer-based triggers) and can compare the configuration snapshots and/or event records against baseline values stored for each security control and deployment parameter (e.g., baseline policy versions, baseline parameter values, and/or any baseline timestamps). In some implementations, the one or more processors can evaluate a set of machine-readable predicates over normalized configuration fields to determine whether an update condition is satisfied (e.g., equality predicates, range predicates, and/or any threshold predicates). For example, the one or more processors can evaluate whether a managed detection and response policy version identifier differs from a stored baseline version identifier, whether a vulnerability scan schedule field has changed from weekly to monthly, or whether an escalation contact email address string has been replaced, among others (e.g., changes to notification channels, changes to severity mappings, and/or any changes to response playbook identifiers). In some implementations, the one or more processors can compute hashes over selected configuration fields and can compare a newly computed hash to a previously stored hash to detect that at least one field has changed (e.g., using cryptographic hashes, non-cryptographic hashes, and/or any checksum functions). For example, the one or more processors can compute a hash over a serialized firewall rule set or over a serialized multifactor authentication policy document and can detect an update when the hash value differs from the baseline hash value (e.g., indicating rule insertion, rule deletion, and/or any rule reordering). In some implementations, the one or more processors can subscribe to event streams from a configuration management system, a security information and event management system, and/or a cloud control plane API and can apply correlation rules that map specific event types and attributes to particular primitive nodes and decorator nodes (e.g., mapping policy-change events, asset-onboarding events, and/or any schedule-change events). For example, the one or more processors can detect that a decorator node representing a temporal scan interval is updated when an event indicates that a scan cadence parameter has changed from thirty days to seven days, and can detect that a primitive node representing a security control is updated when an event indicates that the control has been enabled or disabled on a new set of assets (e.g., new endpoints, new virtual machines, and/or any new cloud accounts).

In some implementations, the method 1400 can include modifying, by the one or more processors, responsive at least in part to automatic detection of the update, the at least one primitive node or the at least one decorator node by (i) recording an updated cryptographic proof in the distributed ledger or blockchain storage, and (ii) updating the temporal metadata representing the time of verification to second time corresponding with the update to the at least one of the security control or the deployment parameter. In some examples, modifying can include the one or more processors preparing a new proof payload that reflects the updated state of the security control or deployment parameter (e.g., a new signed configuration snapshot for a firewall rule set, a new signed document indicating that escalation contacts have been reviewed, a new hash of a vulnerability scan report, etc.) and submitting the proof payload to the distributed ledger or blockchain storage to obtain an updated cryptographic proof that can be referenced from the corresponding primitive node or decorator node. In some implementations, modifying can include the one or more processors writing a new proof identifier associated with the updated cryptographic proof to the primitive node or decorator node in the graph structure and removing or superseding prior proof identifiers that correspond to earlier states of the security control or deployment parameter. In some examples, modifying can further include the one or more processors updating temporal metadata properties on the primitive node or decorator node (e.g., setting a lastVerified timestamp, setting a lastUpdated timestamp, setting a verificationTime field, etc.) to the second time corresponding with the update event to allow subsequent evaluations to determine that verification of the security control or deployment parameter occurred at the second time and to compare the second time against temporal intervals or recency requirements specified by decorator node conditions or external security control models.

The updated cryptographic proof can be a ledger-resident object that encodes, in a tamper-evident format, one or more state attributes of the security control or the deployment parameter at the second time (e.g., a control activation flag, a parameter value, and/or any associated timestamp) together with cryptographic material such as a digital signature and a hash of an underlying evidence artifact. That is, the updated cryptographic proof can be a record in the distributed ledger or blockchain storage that includes a proof identifier, a reference to a block height or transaction identifier, a hash of a configuration snapshot or report, and/or a signature generated using a private key associated with a trusted signer. In some implementations, the updated cryptographic proof can encode a Merkle root that aggregates hashes of multiple evidence artifacts related to the same security control or deployment parameter so that a single proof identifier can be used to access verification information for multiple underlying artifacts. For example, the updated cryptographic proof can encode a Merkle root over hashes of a firewall configuration file, a vulnerability scan report, and a change ticket document, among others, and the proof identifier stored on the primitive node or decorator node can allow the one or more processors to access the updated cryptographic proof and verify that each underlying artifact matches the hash values included in the Merkle tree. In some implementations, the updated cryptographic proof can include one or more encoded state fields that indicate evaluation-relevant properties such as a proof status value, a proof type value, and/or a validity interval so that the one or more processors can compare the encoded state fields against parameters of a security control model during compliance evaluation.

In some implementations of the method 1400, the distributed ledger or blockchain storage includes a proof ledger, and the proof ledger stores the at least one cryptographic proof in association with a proof identifier. In some examples, including the proof ledger in the distributed ledger or blockchain storage can include the one or more processors interacting with a blockchain network or distributed ledger service that maintains a sequence of blocks or records, where each block or record includes one or more proof entries that encode evidence related to security controls and deployment parameters (e.g., entries including signed configuration data, entries including hashes of evidence files, entries including attestation statements, etc.). In some implementations, storing the at least one cryptographic proof in association with the proof identifier can include the one or more processors generating the proof identifier as a unique reference key for a given proof entry (e.g., using a transaction hash, a block hash combined with an index, an application-level identifier generated when the proof is written, etc.) and recording the proof identifier together with the proof entry in the proof ledger. In some examples, storing in association with the proof identifier can further include the one or more processors writing the proof identifier into properties of the primitive node or decorator node in the graph structure to facilitate subsequent retrieval of the cryptographic proof by supplying the proof identifier to interfaces of the proof ledger and obtaining the corresponding proof entry for verification or evaluation operations.

In some implementations of the method 1400, generating the structured output can include accessing, by the one or more processors, the proof identifier of the at least one cryptographic proof from the proof ledger, and the proof identifier can correspond with at least one encoded state. In some examples, accessing the proof identifier from the proof ledger can include the one or more processors issuing a lookup operation to an interface of the proof ledger using node-level information obtained during evaluation (e.g., requesting the most recent proof identifier associated with a particular security control, requesting some or all proof identifiers associated with a given deployment parameter, etc.) and receiving one or more proof identifiers that reference proof entries in the distributed ledger or blockchain storage. In some implementations, accessing the proof identifier can include the one or more processors reading a previously recorded proof identifier from a primitive node or decorator node in the graph structure and transmitting the proof identifier to the proof ledger to obtain the encoded state associated with the corresponding cryptographic proof (e.g., a state indicating that the proof is valid, revoked, superseded, or pending, a state indicating a particular proof type or version, etc.). In some examples, accessing the proof identifier can further include the one or more processors caching proof identifiers and associated encoded states during evaluation of multiple nodes, and reusing cached values when generating structured output for multiple security controls or deployment parameters that reference the same proof identifier, reducing repeated proof ledger lookups.

In some implementations of the method 1400, generating the structured output can include identifying, by the one or more processors, from the request for the status, at least one parameter of a security control model. In some examples, identifying the at least one parameter of the security control model can include the one or more processors parsing fields of the status request that specify evaluation criteria or policy requirements (e.g., expected temporal intervals for verification, proof types, configuration thresholds, deployment scopes, etc.) and mapping those fields to corresponding parameters within an internal representation of the security control model. In some implementations, identifying the at least one parameter can include the one or more processors selecting or loading a particular security control model based on identifiers or context provided in the request (e.g., a model corresponding to a specific regulatory framework, a model corresponding to an internal policy standard, a model corresponding to an insurer underwriting guideline, etc.) and extracting parameter values from the selected model that apply to the security control or deployment parameter identified in the request. In some examples, identifying the at least one parameter can include the one or more processors determining which aspects of the encoded state and temporal metadata should be evaluated for the security control or deployment parameter (e.g., whether to apply a "verified within thirty days" condition, whether to require that a proof be in a valid state, whether to treat certain decorator conditions as expected or recommended, etc.), based on parameter definitions in the security control model.

In some implementations of the method 1400, generating the structured output can include verifying, by the one or more processors, the at least one encoded state of the proof identifier against the at least one parameter of the security control model. In some examples, verifying the at least one encoded state can include the one or more processors comparing values included in the encoded state (e.g., proof status flags, proof type identifiers, timestamps, version identifiers, etc.) to corresponding constraints specified by the parameters of the security control model (e.g., expecting that the proof status be valid rather than revoked, expecting that the proof type match a particular evidence category, expecting that a verification timestamp fall within a specified temporal interval, etc.) and determining whether the encoded state meets those constraints. In some implementations, verifying can include the one or more processors evaluating compound conditions defined in the security control model that involve combinations of encoded state values and temporal metadata (e.g., verifying that a proof indicates successful completion of a vulnerability scan and that the associated verification timestamp is within thirty days of the current time, verifying that a proof indicates that multifactor authentication is activated for specified user groups and that the corresponding configuration has not been superseded by a more recent change, etc.). In some examples, verifying can include the one or more processors generating intermediate evaluation results for each parameter of the security control model (e.g., parameter-level pass or fail indicators for temporal requirements, proof validity requirements, configuration scope requirements, etc.) and aggregating the intermediate results to derive an overall verification outcome for the encoded state of the proof identifier relative to the security control model.

In some implementations of the method 1400, generating the structured output can include generating, by the one or more processors, the structured output indicating verification of the at least one encoded state. In some examples, generating the structured output indicating verification can include the one or more processors inserting one or more fields into the structured output that explicitly represent the verification outcome for the encoded state of the proof identifier relative to the security control model (e.g., including a Boolean field indicating verified or not verified, including a status field indicating values such as verified, partially verified, or not verified, including a result code corresponding to a particular verification outcome, etc.). In some implementations, generating the structured output indicating verification can include the one or more processors embedding, in the structured output, additional context derived from the verification process (e.g., identifiers of the parameters of the security control model that were evaluated, parameter-level pass or fail indicators, reasons for verification failures such as expired timestamps or invalid proof status values, references to the specific proof identifiers and encoded states used in the verification, etc.) to allow downstream systems to interpret and act upon the verification results. In some examples, generating the structured output indicating verification can include the one or more processors formatting the verification information within a machine-readable representation (e.g., a JSON object that includes a verification section, a list or array of verification results for multiple encoded states and proof identifiers, fields that correlate verification outcomes with corresponding primitive nodes and decorator nodes, etc.), permitting client applications, audit tools, or automated policy engines to consume the structured output and use the verification indications to drive reporting, alerting, or enforcement workflows.

In some implementations of the method 1400, the at least one decorator node includes a parameterized condition indicating a temporal interval. In some examples, the parameterized condition indicating the temporal interval can include one or more condition parameters stored as properties of the decorator node that represent a time unit and a time value (e.g., a parameter specifying an interval unit such as days, weeks, or months, and a parameter specifying an interval value such as seven, thirty, or ninety). In some implementations, the parameterized condition can include additional properties that define how the temporal interval is to be applied during evaluation (e.g., a reference to a particular temporal metadata field such as lastVerified or lastUpdated, a comparison operator indicating that verification is to occur within the interval rather than outside the interval, a flag indicating whether the temporal condition is expected for compliance, etc.). In some examples, the parameterized condition can be used by the one or more processors to evaluate time-based requirements for the deployment parameter, such as conditions expecting that escalation contacts be reviewed within a specified number of days, conditions expecting that vulnerability scans be performed within a defined cadence, or conditions expecting that configuration baselines be re-verified on a periodic schedule, where the specific temporal interval values are obtained from the parameters stored on the decorator node.

In some implementations, the method 1400 can include retrieving, by the one or more processors, from the temporal metadata associated with the at least one decorator node, the time of verification of the deployment parameter. In some examples, retrieving the time of verification can include the one or more processors reading one or more timestamp properties stored on the decorator node that correspond to verification events for the deployment parameter (e.g., a lastVerified timestamp indicating when the deployment parameter was most recently verified, a lastUpdated timestamp indicating when the deployment parameter was last changed, a verificationTime field indicating when a proof associated with the deployment parameter was recorded, etc.) and loading those timestamp values into memory structures used by evaluation logic. In some implementations, retrieving can include the one or more processors selecting a particular timestamp field from among multiple temporal metadata fields based on configuration or model parameters (e.g., using lastVerified for certain safeguards, using lastUpdated for others, selecting a timestamp associated with a specific proof identifier, etc.) to serve as the time of verification for purposes of applying the parameterized condition. In some examples, retrieving the time of verification can include the one or more processors normalizing the retrieved temporal metadata into a common time representation (e.g., converting timestamps from different time zones or formats into a unified representation, adjusting for clock skew based on ledger block times, etc.).

In some implementations, the method 1400 can include analyzing, by the one or more processors, the parameterized condition to detect that a difference between a current time and the time of verification satisfies the temporal interval. In some examples, analyzing the parameterized condition can include the one or more processors computing a time difference value by subtracting the time of verification obtained from the temporal metadata from a current system time or a current reference time (e.g., computing a difference in days, hours, or minutes between the verification time and the current time) and comparing the computed time difference to the temporal interval parameters stored in the decorator node (e.g., comparing the time difference to an intervalValue expressed in the intervalUnit such as days, weeks, or months). In some implementations, analyzing can include the one or more processors applying a comparison rule associated with the parameterized condition (e.g., determining that the temporal interval is satisfied when the time difference is less than or equal to the specified interval, determining that the condition is not satisfied when the time difference exceeds the interval, applying greater-than or less-than comparisons based on configuration flags, etc.) and generating a Boolean or status result that indicates whether the temporal requirement for the deployment parameter is met. In some examples, analyzing the parameterized condition can include the one or more processors handling additional evaluation nuances such as grace periods, multiple verification timestamps, or overlapping intervals (e.g., considering a safeguard compliant if verification occurred within an extended grace window, selecting the most recent verification time among several proofs before computing the time difference, evaluating separate temporal intervals for different environments or scopes associated with the same deployment parameter, etc.), and recording intermediate results that can be used during subsequent generation of the structured output.

In some implementations, the method 1400 can include setting, by the one or more processors, the status of the deployment parameter in the structured output based at least in part on the detection that the difference between the current time and the time of verification satisfies the temporal interval. In some examples, setting the status of the deployment parameter in the structured output can include the one or more processors assigning a status value for the deployment parameter based on the result of analyzing the parameterized condition (e.g., setting a status field to pass when the temporal interval is satisfied and to fail when the temporal interval is not satisfied, setting a status field to compliant or non-compliant, setting a state field to values such as current, stale, or expired, etc.) and writing the status value into a corresponding entry of the structured output. In some implementations, setting the status can include the one or more processors embedding, within the structured output, additional fields that provide context for the status determination (e.g., including the evaluated time of verification, including the applicable temporal interval parameters, including a flag indicating that the status is derived from a time-based decorator condition, etc.) so that downstream systems can interpret how the temporal requirement influenced the deployment parameter status. In some examples, setting the status of the deployment parameter in the structured output can include the one or more processors updating an array or collection of node-level evaluations in the structured output, where an entry corresponding to the decorator node representing the deployment parameter is populated with the status indicator, the evaluated temporal metadata, and any associated proof identifiers.

In some implementations, the method 1400 can include receiving, by the one or more processors, via a user interface, unstructured input associated with security control and the deployment parameter. In some examples, receiving the unstructured input can include the one or more processors obtaining free-form textual descriptions entered by a user into a graphical user interface or command-line interface (e.g., text describing a security control requirement, text describing how a safeguard should be configured, narrative responses to a questionnaire item, etc.) that reference security controls and deployment parameters in natural language rather than in canonical form. In some implementations, receiving the unstructured input can include the one or more processors capturing responses to assessment questionnaires, policy authoring tools, or configuration wizards that prompt users to describe implemented controls and safeguard conditions for an entity (e.g., responses describing multifactor authentication requirements, incident escalation procedures, log retention practices, vulnerability scanning cadences, etc.) and buffering the unstructured input in memory or temporary storage for subsequent processing. In some examples, receiving the unstructured input can further include the one or more processors normalizing basic formatting characteristics of the input (e.g., removing extraneous whitespace, standardizing character encodings, segmenting the input into sentences or phrases, etc.) and associating the unstructured input with contextual metadata derived from the user interface or workflow (e.g., identifiers of the framework or questionnaire section, identifiers of the entity or business unit, identifiers of the relevant system or application, etc.).

In some implementations, the method 1400 can include providing, by the one or more processors, the unstructured input to a natural language model. In some examples, providing the unstructured input to the natural language model can include the one or more processors packaging the unstructured input and any associated context metadata into a request payload (e.g., a text string or set of text segments together with identifiers of the relevant framework, control family, or system context) and transmitting the request payload to a local or remote natural language model endpoint for processing. In some implementations, providing the unstructured input can include the one or more processors invoking an application programming interface exposed by the natural language model and specifying desired extraction or classification tasks (e.g., entity extraction for security control types, intent detection for safeguard conditions, identification of temporal requirements or threshold values, etc.), and monitoring for a response that includes structured outputs derived from the unstructured input. In some examples, providing the unstructured input to the natural language model can include the one or more processors batching multiple unstructured inputs associated with different security controls or deployment parameters into a single request for efficiency, or sharding large bodies of unstructured input into smaller segments that remain within size constraints of the natural language model, while preserving identifiers that allow reconstructed mapping of model outputs back to individual questionnaire items, policy statements, or control descriptions.

In some implementations, the method 1400 can include receiving, by the one or more processors, from the natural language model, an output including the first canonical identifier of the at least one primitive node and the second canonical identifier of the at least one decorator node. In some examples, receiving the output can include the one or more processors obtaining a structured response from the natural language model that maps portions of the unstructured input to one or more canonical identifiers representing security controls and deployment parameters. In some examples, receiving the output from the natural language model can further include the one or more processors handling additional metadata included in the model output, such as confidence scores for each canonical identifier assignment, alternative candidate canonical identifiers, or annotations indicating temporal or threshold parameters, and using that metadata to drive subsequent decisions about whether to automatically create or update primitive nodes and decorator nodes, to request user confirmation, or to re-invoke the natural language model with adjusted prompts or context.

In some implementations, the method 1400 can include, responsive at least in part to the request for the status, traversing, by the one or more processors, the graph structure using a plurality of edges connecting the at least one primitive node to a plurality of decorator nodes including the at least one decorator node. In some examples, traversing the graph structure can include the one or more processors starting from a primitive node identified by the first canonical identifier and following outgoing or incoming edges of a specified edge type that represent application of deployment parameters, thereby visiting each decorator node connected to the primitive node by those edges (e.g., traversing from a managed detection and response primitive node to decorator nodes representing escalation contacts defined, escalation contacts updated within a temporal interval, automated response activated, log retention configured above a threshold, etc.). In some implementations, traversing can include the one or more processors applying traversal constraints or filters while following edges, such as limiting traversal to decorator nodes that satisfy particular criteria specified in the status request or in a security control model (e.g., only decorators that encode temporal conditions, only decorators associated with certain control categories, only decorators whose canonical identifiers match a given set of deployment parameters, etc.). In some examples, traversing the graph structure using the plurality of edges can include the one or more processors building an in-memory collection of decorator nodes associated with the primitive node and recording relationships between the primitive node and each decorator node in the collection.

In some implementations, the method 1400 can include, responsive at least in part to the request for the status, retrieving, by the one or more processors, a plurality of cryptographic proofs associated with the plurality of decorator nodes. In some examples, retrieving the plurality of cryptographic proofs can include the one or more processors reading, from properties of each decorator node visited during graph traversal, one or more proof identifiers that reference cryptographic proofs stored in the distributed ledger or blockchain data store and aggregating the proof identifiers into a list or set for retrieval. In some implementations, retrieving can include the one or more processors issuing one or more batched or parallel lookup operations to a proof retrieval interface, where each lookup operation supplies one or more proof identifiers associated with the plurality of decorator nodes and receives corresponding cryptographic proof records (e.g., records including signed configuration snapshots, records including hashes of evidence files, records including attestation payloads, etc.). In some examples, retrieving the plurality of cryptographic proofs can include the one or more processors correlating each retrieved cryptographic proof with the decorator node from which the associated proof identifier was obtained, such as by maintaining a mapping between decorator node identifiers and proof identifiers, and storing the retrieved cryptographic proofs in memory structures that pair each decorator node with the corresponding proof data for use in subsequent evaluation and status determination operations.

Generally, the blockchain data store can be the ledger system 1230 of FIG. 12 that stores cryptographic proof objects 1312*a*-1312*n* and associated proof data 1314*a*-1314*b* in a distributed, append-only record of transactions that can be accessed by the proof system 1206 using proof identifiers read from the graph storage 1210. That is, the ledger system 1230 can maintain, for each proof identifier, a corresponding proof record that includes an encoded state, one or more timestamps, and/or one or more hashes of underlying evidence artifacts, and the proof system 1206 can issue queries over the network 120 to the ledger system 1230 to obtain the proof records referenced by decorator nodes and primitive nodes stored in the graph storage 1210. In some implementations, the ledger system 1230 can be operated as a distributed ledger or blockchain service that exposes an application programming interface for proof retrieval, and the analysis circuit 136 can invoke the proof system 1206 to call the application programming interface with batched sets of proof identifiers associated with decorator nodes identified by the graph interface 1204. For example, the proof system 1206 can transmit a request that includes proof identifiers for a set of decorator nodes representing temporal scan intervals, escalation contact requirements, and log retention thresholds, among others, and can receive, from the ledger system 1230, corresponding proof objects 1312*a*-1312*n* that encode proof data 1314*a*-1314*b* used by the analysis circuit 136 to determine node-level compliance statuses and to generate structured output 1316.

A node-level compliance status can be a machine-readable value that the analysis circuit 136 assigns to a specific primitive node or decorator node based on comparison of proof data 1314*a*-1314*b* and temporal metadata stored in the graph storage 1210 against parameters of a security control model. That is, the node-level compliance status can encode, for a single node, whether one or more encoded states obtained from the ledger system 1230 and one or more timestamps associated with that node satisfy expected conditions such as proof validity, proof type, temporal interval requirements, and/or parameter thresholds. In some implementations, the analysis circuit 136 can represent the node-level compliance status as an enumerated code, a Boolean flag, and/or a numeric score that indicates compliant, non-compliant, or partially compliant states for the corresponding primitive node or decorator node. For example, the analysis circuit 136 can assign a compliant status to a decorator node that represents a temporal scan interval when proof data 1314*a*-1314*b* indicates a valid proof state and the lastVerified timestamp stored for the decorator node is within a thirty-day interval specified by a parameterized condition, and can assign a non-compliant status when the encoded state indicates an invalid proof or when the lastVerified timestamp exceeds the interval. In some implementations, the analysis circuit 136 can embed the node-level compliance status for each evaluated node into the structured output 1316 together with the canonical identifier of the node, the proof identifiers used for evaluation, and the temporal metadata values so that downstream systems that access the structured output 1316 can determine, for each primitive node and decorator node, how the underlying cryptographic proofs and timestamps relate to the applicable security control model.

A node-level compliance status can be a machine-readable value that the analysis circuit 136 derives by executing a deterministic evaluation function over a tuple that includes a node identifier, one or more encoded state fields from proof data 1314*a*-1314*b*, and one or more temporal metadata fields read from the graph storage 1210. That is, the analysis circuit 136 can construct, for each decorator node, an input tuple of the form (nodeId, proofState, proofType, proofValidFrom, proofValidTo, lastVerified, lastUpdated, conditionType, conditionValue) and can apply a set of comparison operations and bitwise operations to generate a compact status code. In some implementations, the analysis circuit 136 can map intermediate Boolean predicates to bit positions in an integer status word, such as a first bit that indicates whether proofState equals a valid state, a second bit that indicates whether proofType matches an expected type for the decorator node, a third bit that indicates whether a difference between a current time and lastVerified is less than or equal to conditionValue for a temporal interval, and a fourth bit that indicates whether proofValidFrom and proofValidTo bound the current time, among others. For example, the analysis circuit 136 can compute a 4-bit mask for a decorator node representing a thirty-day scan interval, where bit 0 is set when proofState equals VALID, bit 1 is set when proofType equals SCAN_REPORT, bit 2 is set when (currentTime−lastVerified)≤30 days, and bit 3 is set when proofValidFrom≤currentTime≤proofValidTo, and the analysis circuit 136 can compare the resulting mask against a required mask such as 0b1111 to decide that the decorator node is fully compliant or against a threshold mask such as 0b0111 to decide that the decorator node is partially compliant. In some implementations, the analysis circuit 136 can encode the node-level compliance status as a small integer or byte value that packs the compliance mask together with a severity level, and can store or emit, in the structured output 1316, both the packed status value and a decoded label such as COMPLIANT, NON_COMPLIANT, or DEGRADED for each primitive node and decorator node so that downstream systems that access the structured output 1316 can reconstruct low-level predicate outcomes while operating on a single status field per node.

In some implementations, the method 1400 can include, responsive at least in part to the request for the status, querying, by the one or more processors, the distributed ledger or blockchain data store using a plurality of proof identifiers associated with the plurality of cryptographic proofs to obtain a plurality of encoded states corresponding to the plurality of cryptographic proofs. In some examples, querying the distributed ledger or blockchain data store can include the one or more processors submitting, to a ledger access interface, a request that includes the plurality of proof identifiers and receiving, in response, encoded state information for each referenced proof (e.g., state values indicating valid, revoked, superseded, or pending, state values indicating proof type or version, state values including ledger block timestamps or sequence numbers, etc.). In some implementations, querying can include the one or more processors performing the lookup operations in a batched or parallel manner to reduce latency when obtaining encoded states for the plurality of cryptographic proofs, such as grouping proof identifiers by ledger partition, by proof type, or by associated blockchain network, and issuing multiple concurrent queries. In some examples, querying the distributed ledger or blockchain data store can include the one or more processors verifying integrity of the encoded states by checking signatures or hashes included in the ledger responses against expected values.

In some implementations, the method 1400 can include, responsive at least in part to the request for the status, determining, by the one or more processors, for at least one (e.g., each) of the plurality of decorator nodes, a node-level compliance status based at least in part on analyzing a respective encoded state of the plurality of encoded states and corresponding temporal metadata against a security control model. In some examples, determining the node level compliance status can include the one or more processors, for each decorator node, evaluating the encoded state associated with the decorator node and the temporal metadata read from the decorator node against parameters defined in the security control model (e.g., proof status requirements, proof type requirements, temporal interval requirements, configuration scope requirements, etc.) and computing a result that indicates whether the deployment parameter represented by the decorator node satisfies the requirements. In some implementations, determining the node level compliance status can include the one or more processors generating a status value for each decorator node based on the evaluation (e.g., assigning values such as compliant, non-compliant, or partially compliant, assigning Boolean pass or fail indicators, assigning enumerated states such as current, stale, or invalid, etc.) and storing the status value in an in-memory structure associated with the decorator node. In some examples, determining the node level compliance status can include the one or more processors applying additional logic from the security control model that combines encoded state attributes and temporal attributes (e.g., expecting that a proof be in a valid state and that the verification timestamp be within a specified interval, expecting that multiple proofs associated with the same decorator node each satisfy their respective conditions, etc.), and recording any reasons or contributing factors for non-compliance (e.g., proof revoked, proof missing, verification time expired, parameter not satisfied) that can later be included in the structured output for diagnostic or reporting purposes.

In some implementations, the method 1400 can include generating, by the one or more processors, the structured output as a machine-readable data object including (i) a status field representing the status of the security control or the deployment parameter, and (ii) an array representing evaluations associated with a plurality of nodes comprising the at least one primitive node and the at least one decorator node. In some examples, generating the structured output as the machine-readable data object can include the one or more processors constructing a data structure in memory that includes a top-level status field derived from evaluation results for the security control or the deployment parameter (e.g., a field indicating that the overall control is compliant or non-compliant, a field indicating an aggregated pass or fail state, a field indicating a risk level such as low, medium, or high, etc.) and an array field that includes entries for each node evaluated during processing of the request. In some implementations, generating the array representing evaluations associated with the plurality of nodes can include the one or more processors creating, for each of the at least one primitive node and the at least one decorator node, an array element that includes node-specific data such as the node identifier, the canonical identifier, the node-level compliance status, one or more verification timestamps, and one or more proof identifiers that reference cryptographic proofs used in the evaluation. In some examples, generating the machine-readable data object can include the one or more processors serializing the data structure into a format suitable for transmission to client systems or downstream services (e.g., a JSON document including a status field and an evaluations array, an XML document with corresponding elements, a protocol buffer message with fields for overall status and node-level evaluations, etc.).

In some implementations of the method 1400, the graph structure can be maintained in a graph database implemented as a managed service in a cloud environment. In some examples, maintaining the graph structure in the graph database implemented as the managed service can include the one or more processors interacting with a cloud-hosted graph database endpoint using a networked application programming interface to create, update, and delete primitive nodes, decorator nodes, and edges that represent relationships between nodes (e.g., using a managed graph database service provided by a cloud computing platform). In some implementations, maintaining the graph structure in the managed service can include the one or more processors using on cloud-provided capabilities for storage, indexing, and replication of graph data (e.g., automatic scaling of storage capacity, automatic replication of graph partitions across multiple availability zones, automatic failover and backup operations, etc.), while issuing graph queries and update commands from an analysis service that runs either within the same cloud environment or from an external environment. In some examples, maintaining the graph structure in the managed service can include the one or more processors configuring connection parameters, authentication mechanisms, and resource identifiers for the graph database (e.g., configuring endpoints, access keys, roles, or service identities) and periodically synchronizing in-memory representations of nodes and edges with persisted records in the cloud-hosted graph storage.

The cloud environment can include one or more virtual networks, compute instances, and managed storage services that host the response system 130, the graph storage 1210, and the ledger system 1230, and that are accessible over the network 120 using cloud-specific endpoints and resource identifiers. That is, the cloud environment can provide virtual machine instances and/or container orchestration services that execute the analysis circuit 136, the mapping system 1202, the graph interface 1204, the proof system 1206, and the output modeler 1208 as network-addressable services. In some implementations, the cloud environment can include a managed graph database service that exposes the graph storage 1210 as a multi-tenant endpoint, a managed key-value or document store that backs the database 140, and a managed blockchain or distributed ledger service that implements the ledger system 1230. For example, the analysis circuit 136 can run on a compute instance in a first virtual network segment, can issue graph queries to the graph storage 1210 hosted in a second virtual network segment, and can issue proof retrieval requests to the ledger system 1230 hosted in a third virtual network segment, with routing between segments controlled by cloud networking constructs such as virtual private clouds, subnets, and/or peering connections. In some implementations, the cloud environment can expose region-specific endpoints for the graph storage 1210 and the ledger system 1230, and the one or more processors can select endpoints based on deployment region metadata so that graph operations and proof retrieval operations execute against resources in a selected geographic region.

The cloud environment can be a provider-operated data center infrastructure that offers virtualized compute, storage, and networking resources on top of physical server racks, top-of-rack switches, and storage arrays, and that exposes those resources through programmable control planes. That is, the cloud environment can include hypervisors that host virtual machine instances running operating systems for the response system 130, container runtimes that host microservices implementing the analysis circuit 136, and distributed storage clusters that persist graph data for the graph storage 1210 and proof records for the ledger system 1230. In some implementations, the cloud environment can include a control plane API that accepts operations such as CreateInstance, CreateGraphCluster, and/or CreateLedgerNetwork, and a data plane that carries application traffic between the analysis circuit 136, the graph interface 1204, and the ledger system 1230 over virtual network interfaces backed by software-defined networking components. For example, the cloud environment can allocate a virtual network interface card to a compute instance that runs the analysis circuit 136, assign an IP address from a virtual subnet, and program virtual routers and security groups so that TCP connections from the analysis circuit 136 to a managed graph database endpoint for the graph storage 1210 and to a managed blockchain endpoint for the ledger system 1230 traverse only specific virtual network paths. In some implementations, the cloud environment can expose low-level configuration parameters such as instance types, storage volume types, and network bandwidth classes, and the one or more processors can select those parameters when provisioning resources so that the graph storage 1210 and the ledger system 1230 run on instances with sufficient memory, I/O throughput, and network capacity to service graph queries and proof retrieval requests generated by the response system 130.

In some implementations, the method 1400 can include exposing, by the one or more processors, an analysis interface as a microservice endpoint configured to return the structured output in real-time for a plurality of nodes including the at least one primitive node and the at least one decorator node stored in the graph database. In some examples, exposing the analysis interface as the microservice endpoint can include the one or more processors configuring a network-accessible service that accepts requests over a defined protocol (e.g., HTTP, gRPC, message-based protocols, etc.), parses request payloads that identify security controls and deployment parameters to be evaluated (e.g., requests including canonical identifiers, requests including framework or control identifiers, etc.), and invokes graph queries and evaluation logic to generate the structured output in response. In some implementations, exposing the analysis interface can include the one or more processors defining one or more endpoint paths or methods that correspond to different evaluation operations (e.g., an endpoint to evaluate a single security control and associated deployment parameters, an endpoint to evaluate a set of controls within a control family, an endpoint to evaluate some or all controls mapped to a particular framework, etc.) and returning structured output as machine-readable data objects in near real-time when requests are received. In some examples, exposing the analysis interface as the microservice endpoint can include the one or more processors implementing authentication, authorization, and rate limiting for calls to the endpoint (e.g., using API keys or tokens, enforcing per-tenant or per-client quotas, logging requests and responses for audit purposes, etc.).

Generally, the analysis interface can be a network-facing entry point of the response system 130 that couples the analysis circuit 136, the graph interface 1204, the proof system 1206, and the output modeler 1208 of FIG. 12 to external clients such as the client device 110 and the third party device 150 and exposes evaluation functionality over the network 120 using structured request and response messages. That is, the analysis interface can receive, from the application 112, requests that include canonical identifiers for primitive nodes 1304*a*-1304*b* and decorator nodes 1306*a*-1306*c* as shown in FIG. 13, can pass the canonical identifiers to the graph interface 1204 to execute graph queries against the graph storage 1210, can invoke the proof system 1206 to obtain proof objects 1312*a*-1312*n* and proof data 1314*a*-1314*b* from the ledger system 1230, and can invoke the analysis circuit 136 to compute node-level compliance statuses and generate structured output 1316. In some implementations, the analysis interface can expose one or more microservice methods that accept JSON-formatted or protocol buffer-formatted payloads that specify first canonical identifiers for primitive nodes, second canonical identifiers for decorator nodes, and/or identifiers of security control models, and can return structured output 1316 that includes status fields, arrays of node evaluations, temporal metadata, and proof identifiers for nodes stored in the graph storage 1210. For example, the analysis interface can expose a method such as/evaluateControl that accepts a request including a first canonical identifier for a managed detection and response primitive node 1304*a* and one or more second canonical identifiers for decorator nodes 1306*a*-1306*c*, and can return a response that encodes, for each node, a node-level compliance status computed by the analysis circuit 136 based on proof data 1314*a*-1314*b* retrieved by the proof system 1206 and temporal metadata stored in the graph storage 1210.

In some implementations, the analysis interface can be an HTTP-based microservice that exposes a POST endpoint at a path such as /v1/evaluate, accepts application/json request bodies, and returns application/json responses that encode the structured output 1316. That is, the analysis interface can receive a request whose body includes a JSON object with fields such as “primitiveIds” and “decoratorIds”, where “primitiveIds” is an array of first canonical identifiers for primitive nodes 1304*a*-1304*b* and “decoratorIds” is an array of second canonical identifiers for decorator nodes 1306*a*-1306*c*, and can map those identifiers to internal node identifiers in the graph storage 1210. In some implementations, the analysis interface can parse the JSON body into an in-memory structure such as a list of strings for primitive canonical identifiers and a list of strings for decorator canonical identifiers, can pass the lists to the graph interface 1204, and can receive from the graph interface 1204 a set of node records that include node identifiers, temporal metadata fields, and proof identifiers. For example, the analysis interface can receive a request body such as {“primitiveIds”: [“ctrl.mdr.global”],“decoratorIds”:[“dec.scan.30d”, “dec.escalation.24 h”]}, can cause the graph interface 1204 to resolve “ctrl.mdr.global” to a primitive node 1304*a* and “dec.scan.30d” and “dec.escalation.24 h” to decorator nodes 1306*a* and 1306*b*, and can cause the proof system 1206 to query the ledger system 1230 for proof objects 1312*a*-1312*n* whose proof identifiers match those stored on the resolved nodes. In some implementations, the analysis interface can allocate a response buffer and can write, into the buffer, a JSON object that includes a top-level “status” field, a “nodes” array, and a “timestamp” field, where each entry in the “nodes” array includes a “canonicalId” field, a “compliance Code” field, a “lastVerified” field, and a “proofId” field populated from the node-level compliance status computed by the analysis circuit 136 and from proof data 1314*a*-1314*b* returned by the proof system 1206. For example, the analysis interface can generate a response such as {“status”: “OK”,“timestamp”:1700250000,“nodes”:[{“canonicalId”: “ctrl.mdr.global”,“complianceCode”:15,“lastVerified”: 1700200000,“proofId”:“proof-abc”},{“canonicalId”: “dec.scan.30d”,“complianceCode”:15,“lastVerified”: 1700180000,“proofId”:“proof-def”},{“canonicalId”: “dec.escalation.24 h”,“complianceCode”:7,“lastVerified”: 1699900000,“proofId”:“proof-ghi”}]} and can transmit the response over the network 120 to the client device 110 for rendering by the input/output circuit 118.

In some implementations, the method 1400 can include storing, by the one or more processors, in the graph structure, a second primitive node representing a second security control deployed in the network infrastructure of the entity. In some examples, storing the second primitive node can include the one or more processors identifying a second security control that is distinct from the security control represented by the at least one primitive node (e.g., identifying a vulnerability management control in addition to a managed detection and response control, identifying a multifactor authentication control in addition to an endpoint protection control, identifying a backup and recovery control in addition to a firewall control, etc.) based on configuration data, inventory information, or administrative input.

In some implementations, the method 1400 can include linking, by the one or more processors, the at least one decorator node to the second primitive node by a second edge indicating the deployment parameter is applied to the second security control in the network infrastructure. In some examples, linking the at least one decorator node to the second primitive node can include the one or more processors creating a second edge record in the graph structure that references the node identifier of the second primitive node and the node identifier of the decorator node, assigning an edge type or label that denotes application of the deployment parameter to the second security control, and persisting the second edge record in the graph database. In some implementations, linking by the second edge can include the one or more processors updating adjacency or neighbor lists associated with the second primitive node to include the decorator node as an associated deployment parameter and updating adjacency or neighbor lists associated with the decorator node to include the second primitive node as an additional security control that uses the same deployment parameter. In some examples, linking the at least one decorator node to the second primitive node by the second edge can allow subsequent graph queries and traversal operations performed by the one or more processors to recognize that the decorator node represents a deployment parameter applied to both the first security control and the second security control (e.g., the same escalation contacts defined decorator node applied to both a managed detection and response control and a vulnerability management control), thereby supporting reuse of decorator nodes across multiple primitive nodes within the network infrastructure.

In some implementations of the method 1400, the at least one decorator node is reused to link to the second primitive node and bypasses generation and storage of at least one additional decorator node associated with the second primitive node. In some examples, reusing the at least one decorator node can include the one or more processors determining that the deployment parameter represented by the decorator node is applicable to both the security control represented by the first primitive node and the second security control represented by the second primitive node (e.g., the same escalation contacts defined condition, the same escalation contacts updated within a temporal interval condition, the same log retention threshold condition, etc.) and deciding not to create a new decorator node for the second security control. In some implementations, bypassing generation and storage of an additional decorator node can include the one or more processors omitting creation of a new decorator node data object for the second security control and instead creating only the second edge that links the existing decorator node to the second primitive node, thereby reducing duplication of node records in the graph structure. In some examples, reusing the at least one decorator node can allow the one or more processors to evaluate the deployment parameter once for the shared decorator node and apply the resulting status and proof associations to multiple primitive nodes that reference the decorator node, improving evaluation efficiency and consistency across security controls.

In some implementations of the method 1400, the first canonical identifier and the second canonical identifier include model-agnostic identifiers corresponding with at least a first security control model and a second security control model. In some examples, including model-agnostic identifiers can include the one or more processors using canonical identifier values that remain constant across different representations of security requirements, such as a first security control model corresponding to a first regulatory framework and a second security control model corresponding to a second regulatory framework (e.g., a first model based on NIST Cybersecurity Framework controls and a second model based on ISO 27001 clauses, a first model based on CIS Controls and a second model based on an internal corporate standard, etc.), while the same first canonical identifier and second canonical identifier are used to refer to the same underlying security control and deployment parameter in each model. In some implementations, including model-agnostic identifiers can include the one or more processors mapping control statements or requirements from multiple security control models to the same first canonical identifier and second canonical identifier (e.g., mapping different textual descriptions of a managed detection and response control to a single canonical identifier for that control, mapping different descriptions of an escalation contacts defined condition to a single canonical identifier for that deployment parameter, etc.). In some examples, including model-agnostic identifiers can allow the one or more processors to generate structured output that reports evaluation status for multiple security control models based on a single set of primitive nodes and decorator nodes in the graph structure, reducing duplication of evaluation logic and improving consistency of compliance determinations across heterogeneous frameworks or policies.

In some implementations, the method 1400 can include, responsive to detecting an update associated with the at least one decorator node, identifying, by the one or more processors, a subset of a plurality of nodes of the graph structured linked with the at least one decorator node by respective edges. In some examples, identifying the subset of the plurality of nodes can include the one or more processors initiating a traversal from the decorator node that has been updated and following edges in the graph structure to discover a number of (e.g., all) primitive nodes and related decorator nodes that are connected to the updated decorator node (e.g., primitive nodes representing multiple security controls that share the same deployment parameter, additional decorator nodes that participate in a composite safeguard for those security controls, etc.). In some implementations, identifying the subset can include the one or more processors applying traversal rules that limit consideration to nodes whose evaluation results depend on the updated decorator node (e.g., primitive nodes that have an edge to the updated decorator node, decorator nodes that are part of the same control family or evaluation group, nodes that are referenced in the same security control model parameter set, etc.), and collecting identifiers of those nodes into an in-memory list or set that represents the subset. In some examples, identifying the subset of the plurality of nodes can include the one or more processors excluding nodes in the graph structure that are not reachable from the updated decorator node via relevant edge types, thereby constraining subsequent evaluation operations to the subset of nodes whose status can be affected by the update and avoiding recomputation for unrelated nodes in the graph structure.

In some implementations, the method 1400 can include determining, by the one or more processors, an updated status associated with the subset of nodes, and determination of the updated status can bypass execution of additional operations associated with the plurality of nodes other than the subset of nodes. In some examples, determining the updated status associated with the subset of nodes can include the one or more processors re-evaluating encoded states of cryptographic proofs and temporal metadata only for primitive nodes and decorator nodes included in the subset (e.g., recomputing node-level compliance status for security controls that share the updated deployment parameter, recomputing status for related decorator nodes that form part of a composite safeguard, etc.) and generating new status values for those nodes based on current ledger state and metadata. In some implementations, bypassing execution of additional operations for nodes outside the subset can include the one or more processors skipping graph queries, proof ledger lookups, and evaluation logic for nodes in the graph structure that are not identified as part of the subset, and retaining previously computed status values for those nodes without modification. In some examples, determining the updated status for only the subset of nodes can allow the one or more processors to perform incremental evaluation in response to an update associated with the at least one decorator node, reducing processing time and resource consumption compared to re-evaluating the full dataset (e.g., plurality of nodes).

Generally, an updated status can be a revised machine-readable status value that the analysis circuit 136 assigns to each node in the subset after re-evaluating node-level predicates using current proof data 1314*a*-1314*b* and temporal metadata from the graph storage 1210. That is, an updated status can replace a prior compliance code, Boolean flag, or enumerated label associated with a primitive node 1304*a*-1304*b* or a decorator node 1306*a*-1306*c* when an update event associated with a decorator node causes at least one underlying predicate to change value. In some implementations, the analysis circuit 136 can recompute, for each node in the subset, a status word that encodes outcomes of low-level checks such as proof validity, proof type match, temporal interval satisfaction, and/or parameter threshold satisfaction, and can write the recomputed status word into an in-memory structure that mirrors node attributes in the graph storage 1210. For example, if a decorator node 1306*b* representing a thirty-day scan interval transitions from non-compliant to compliant after a new proof object 1312*a* is recorded in the ledger system 1230, the analysis circuit 136 can update a complianceCode field from a value such as 0b0101 to 0b1111 and can propagate the updated status to a primitive node 1304*a* that aggregates statuses of linked decorator nodes. In some implementations, the updated status can be emitted in the structured output 1316 as a new value for a node-level compliance status field while preserving prior status values in historical records so that downstream systems that access the structured output 1316 can distinguish between current compliance state and previously reported compliance state for each evaluated node.

Configuration of Exemplary Implementations

While this specification includes many specific implementation details, these cannot be construed as limitations on the scope of any of what can be claimed, but rather as descriptions of features specific to particular implementations of the systems and methods described herein. Certain features that are described in this specification in the context of separate implementations can also be implemented and/or arranged in combination in a single implementation. Conversely, various features that are described in the context of a single implementation can also be implemented and arranged in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Additionally, features described with respect to particular headings can be utilized with respect to and/or in combination with illustrative implementations described under other headings; headings, where provided, are included solely for the purpose of readability and cannot be construed as limiting any features provided with respect to such headings.

Similarly, while operations are depicted in the drawings in a particular order, this cannot be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing can be advantageous. Moreover, the separation of various system components in the implementations described above cannot be understood as requiring such separation in all implementations, and it can be understood that the described program components and systems can generally be integrated together in a single software product or packaged into multiple software products.

Having now described some illustrative implementations, it is apparent that the foregoing are illustrative and not limiting, having been presented by way of example. In particular, although many of the examples presented herein include specific combinations of method acts or system elements, those acts, and those elements can be combined in other ways to accomplish the same objectives. Acts, elements and features discussed only in connection with one implementation are not intended to be excluded from a similar role in other implementations.

The phraseology and terminology used herein is for the purpose of description and cannot be regarded as limiting. The use of "including" "containing" "having" "characterized by" "characterized in that" and variations thereof herein, is meant to encompass the items listed thereafter, equivalents thereof, and additional items, as well as alternate implementations consisting of the items listed thereafter exclusively. In one arrangement, the systems and methods described herein consist of one, each combination of more than one, or all of the described elements, acts, or components.

Any references to implementations or elements or acts of the systems and methods herein referred to in the singular can also embrace implementations including a plurality of these elements or acts, and any references in plural to any implementation or element or act herein can also embrace implementations including only a single element or act. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation can be included in at least one implementation. Such terms as used herein are not necessarily all referring to the same implementation. Any implementation can be combined with any other implementation, inclusively or exclusively, in any manner consistent with the implementations disclosed herein.

References to "and," "or," and "and/or" can be construed as inclusive so that any terms described using "and," "or," and "and/or" can indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein can be embodied in other specific forms without departing from the characteristics thereof. Although the examples provided herein relate to controlling the display of content of information resources, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system for graph-based security modeling, the system comprising:

one or more processing circuits comprising memory and at least one processor configured to:

store, in a graph structure, at least one primitive node representing a security control deployed in a network infrastructure of an entity, the at least one primitive node stored in association with a first canonical identifier corresponding with the security control;

store, in the graph structure, at least one decorator node representing a deployment parameter corresponding with the security control, the at least one decorator node stored in association with a second canonical identifier corresponding with the deployment parameter and linked to the at least one primitive node by an edge indicating the deployment parameter is applied to the security control in the network infrastructure;

associate the at least one primitive node and the at least one decorator node with (i) at least one cryptographic proof recorded on a distributed ledger or blockchain storage and (ii) temporal metadata representing a time of verification of the security control or the deployment parameter;

responsive at least in part to a request for a status of the security control or the deployment parameter, execute a graph query against the graph structure, the graph query comprising at least one of the first canonical identifier or the second canonical identifier;

access, based at least in part on execution of the graph query, the temporal metadata representing the time of verification and the at least one cryptographic proof from the distributed ledger or blockchain storage; and generate a structured output corresponding to the request, the structured output indicating the status of the security control or the deployment parameter and an association to the at least one cryptographic proof.

2. The system of claim 1, wherein the at least one processor is further configured to:

configure a data channel or communication interface to access the network infrastructure of the entity;

monitor the network infrastructure of the entity using the data channel or communication interface; and automatically detect, responsive at least in part to monitoring the network infrastructure, an update to at least one of the security control or the deployment parameter.

3. The system of claim 1, wherein the at least one processor is further configured to:

automatically detect an update to at least one of the security control or the deployment parameter; and modify, responsive at least in part to automatic detection of the update, the at least one primitive node or the at least one decorator node by (i) recording an updated cryptographic proof in the distributed ledger or blockchain storage, and (ii) updating the temporal metadata representing the time of verification to second time corresponding with the update to the at least one of the security control or the deployment parameter.

4. The system of claim 1, wherein the distributed ledger or blockchain storage comprises a proof ledger, wherein the proof ledger stores the at least one cryptographic proof in association with a proof identifier, and wherein to generate the structured output, the at least one processor is further configured to:

access the proof identifier of the at least one cryptographic proof from the proof ledger, the proof identifier corresponding with at least one encoded state;

identify, from the request for the status, at least one parameter of a security control model;

verify the at least one encoded state of the proof identifier against the at least one parameter of the security control model; and generate the structured output indicating verification of the at least one encoded state.

5. The system of claim 1, wherein the at least one decorator node comprises a parameterized condition indicating a temporal interval, and wherein the at least one processor is further configured to:

retrieve, from the temporal metadata associated with the at least one decorator node, the time of verification of the deployment parameter;

analyze the parameterized condition to detect that a difference between a current time and the time of verification satisfies the temporal interval; and set the status of the deployment parameter in the structured output based at least in part on the detection that the difference between the current time and the time of verification satisfies the temporal interval.

6. The system of claim 1, wherein the at least one processor is further configured to:

receive, via a user interface, unstructured input associated with security control and the deployment parameter;

provide the unstructured input to a natural language model; and receive, from the natural language model, an output comprising the first canonical identifier of the at least one primitive node and the second canonical identifier of the at least one decorator node.

7. The system of claim 1, wherein, responsive at least in part to the request for the status, the at least one processor is further configured to:

traverse the graph structure using a plurality of edges connecting the at least one primitive node to a plurality of decorator nodes comprising the at least one decorator node;

retrieve a plurality of cryptographic proofs associated with the plurality of decorator nodes;

query the distributed ledger or blockchain data store using a plurality of proof identifiers associated with the plurality of cryptographic proofs to obtain a plurality of encoded states corresponding to the plurality of cryptographic proofs; and determine, for each of the plurality of decorator nodes, a node-level compliance status based at least in part on analyzing a respective encoded state of the plurality of encoded states and corresponding temporal metadata against a security control model.

8. The system of claim 1, wherein the at least one processor is further configured to:

generate the structured output as a machine-readable data object comprising:

a status field representing the status of the security control or the deployment parameter; and an array representing evaluations associated with a plurality of nodes comprising the at least one primitive node and the at least one decorator node.

9. The system of claim 1, wherein the graph structure is maintained in a graph database implemented as a managed service in a cloud environment, and wherein the at least one processor is further configured to:

expose an analysis interface as a microservice endpoint configured to return the structured output in real-time for a plurality of nodes comprising the at least one primitive node and the at least one decorator node stored in the graph database.

10. The system of claim 1, wherein the at least one processor is further configured to:

store, in the graph structure, a second primitive node representing a second security control deployed in the network infrastructure of the entity; and link the at least one decorator node to the second primitive node by a second edge indicating the deployment parameter is applied to the second security control in the network infrastructure, wherein the at least one decorator node is reused to link to the second primitive node and bypasses generation and storage of at least one additional decorator node associated with the second primitive node.

11. The system of claim 1, wherein the first canonical identifier and the second canonical identifier comprise model-agnostic identifiers corresponding with at least a first security control model and a second security control model.

12. The system of claim 1, wherein the at least one processor is further configured to:

responsive to detecting an update associated with the at least one decorator node, identify a subset of nodes of a plurality of nodes of the graph structured linked with the at least one decorator node by respective edges; and determine an updated status associated with the subset of nodes, wherein determination of the updated status bypasses execution of additional operations associated with the plurality of nodes other than the subset of nodes.

13. A method for graph-based security modeling, the method comprising:

storing, by one or more processors, in a graph structure, at least one primitive node representing a security control deployed in a network infrastructure of an entity, the at least one primitive node stored in association with a first canonical identifier corresponding with the security control;

storing, by the one or more processors, in the graph structure, at least one decorator node representing a deployment parameter corresponding with the security control, the at least one decorator node stored in association with a second canonical identifier corresponding with the deployment parameter and linked to the at least one primitive node by an edge indicating the deployment parameter is applied to the security control in the network infrastructure;

associating, by the one or more processors, the at least one primitive node and the at least one decorator node with (i) at least one cryptographic proof recorded on a distributed ledger or blockchain storage and (ii) temporal metadata representing a time of verification of the security control or the deployment parameter;

responsive at least in part to a request for a status of the security control or the deployment parameter, executing, by the one or more processors, a graph query against the graph structure, the graph query comprising at least one of the first canonical identifier or the second canonical identifier;

accessing, by the one or more processors, based at least in part on execution of the graph query, the temporal metadata representing the time of verification and the at least one cryptographic proof from the distributed ledger or blockchain storage; and generating, by the one or more processors, a structured output corresponding to the request, the structured output indicating the status of the security control or the deployment parameter and an association to the at least one cryptographic proof.

14. The method of claim 13, further comprising:

configuring, by the one or more processors, a data channel or communication interface to access the network infrastructure of the entity;

monitoring, by the one or more processors, the network infrastructure of the entity using the data channel or communication interface; and automatically detecting, by the one or more processors, responsive at least in part to monitoring the network infrastructure, an update to at least one of the security control or the deployment parameter.

15. The method of claim 13, further comprising:

automatically detecting, by the one or more processors, an update to at least one of the security control or the deployment parameter; and modifying, by the one or more processors, responsive at least in part to automatic detection of the update, the at least one primitive node or the at least one decorator node by (i) recording an updated cryptographic proof in the distributed ledger or blockchain storage, and (ii) updating the temporal metadata representing the time of verification to second time corresponding with the update to the at least one of the security control or the deployment parameter.

16. The method of claim 13, wherein the distributed ledger or blockchain storage comprises a proof ledger, wherein the proof ledger stores the at least one cryptographic proof in association with a proof identifier, and wherein generating the structured output further comprises:

accessing, by the one or more processors, the proof identifier of the at least one cryptographic proof from the proof ledger, the proof identifier corresponding with at least one encoded state;

identifying, by the one or more processors, from the request for the status, at least one parameter of a security control model;

verifying, by the one or more processors, the at least one encoded state of the proof identifier against the at least one parameter of the security control model; and generating, by the one or more processors, the structured output indicating verification of the at least one encoded state.

17. The method of claim 13, wherein the at least one decorator node comprises a parameterized condition indicating a temporal interval, and the method further comprising:

retrieving, by the one or more processors, from the temporal metadata associated with the at least one decorator node, the time of verification of the deployment parameter;

analyzing, by the one or more processors, the parameterized condition to detect that a difference between a current time and the time of verification satisfies the temporal interval; and setting, by the one or more processors, the status of the deployment parameter in the structured output based at least in part on the detection that the difference between the current time and the time of verification satisfies the temporal interval.

18. The method of claim 13, further comprising:

receiving, by the one or more processors, via a user interface, unstructured input associated with security control and the deployment parameter;

providing, by the one or more processors, the unstructured input to a natural language model; and receiving, by the one or more processors, from the natural language model, an output comprising the first canonical identifier of the at least one primitive node and the second canonical identifier of the at least one decorator node.

19. The method of claim 13, further comprising, responsive at least in part to the request for the status:

traversing, by the one or more processors, the graph structure using a plurality of edges connecting the at least one primitive node to a plurality of decorator nodes comprising the at least one decorator node;

retrieving, by the one or more processors, a plurality of cryptographic proofs associated with the plurality of decorator nodes;

querying, by the one or more processors, the distributed ledger or blockchain data store using a plurality of proof identifiers associated with the plurality of cryptographic proofs to obtain a plurality of encoded states corresponding to the plurality of cryptographic proofs; and determining, by the one or more processors, for each of the plurality of decorator nodes, a node-level compliance status based at least in part on analyzing a respective encoded state of the plurality of encoded states and corresponding temporal metadata against a security control model.

20. A non-transitory computer readable storage medium (CRM) including one or more instructions stored thereon, the one or more instructions executable by one or more processing circuits to:

store, in a graph structure, at least one primitive node representing a security control deployed in a network infrastructure of an entity, the at least one primitive node stored in association with a first canonical identifier corresponding with the security control;

store, in the graph structure, at least one decorator node representing a deployment parameter corresponding with the security control, the at least one decorator node stored in association with a second canonical identifier corresponding with the deployment parameter and linked to the at least one primitive node by an edge indicating the deployment parameter is applied to the security control in the network infrastructure;

associate the at least one primitive node and the at least one decorator node with (i) at least one cryptographic proof recorded on a distributed ledger or blockchain storage and (ii) temporal metadata representing a time of verification of the security control or the deployment parameter;

responsive at least in part to a request for a status of the security control or the deployment parameter, execute a graph query against the graph structure, the graph query comprising at least one of the first canonical identifier or the second canonical identifier;

access, based at least in part on execution of the graph query, the temporal metadata representing the time of verification and the at least one cryptographic proof from the distributed ledger or blockchain storage; and generate a structured output corresponding to the request, the structured output indicating the status of the security control or the deployment parameter and an association to the at least one cryptographic proof.

* * * * *